Sept. 18, 1945.  E. P. BULLARD, 3D., ET AL  2,384,809
MACHINE TOOL
Filed May 21, 1942   33 Sheets-Sheet 5

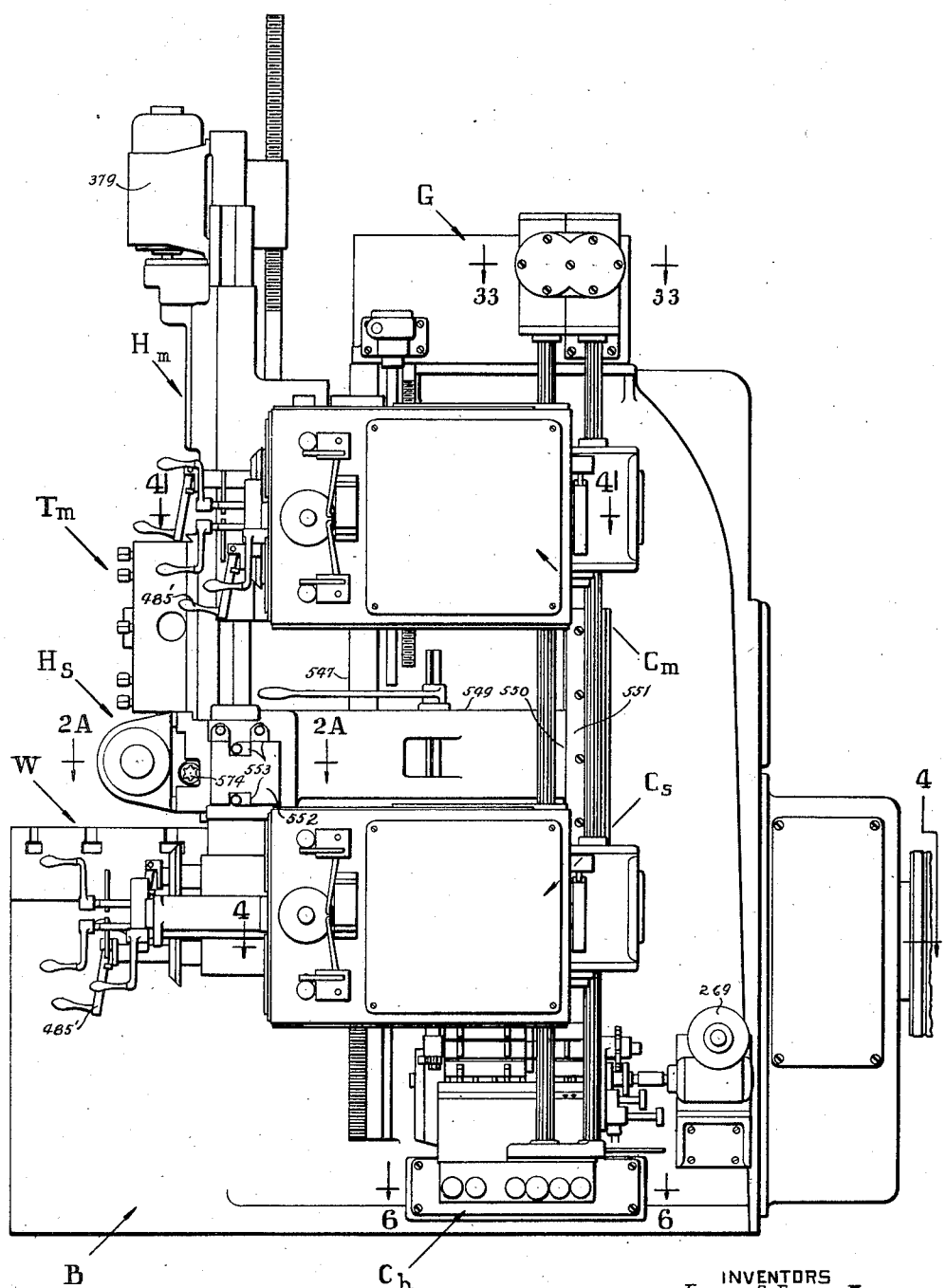

INVENTORS
Edward P. Bullard, III
LeRoy E. Alvey
Edward N. Cowell
Paul H. Lange
Frank H. Mussler
BY Paul M. Geist
ATTORNEY Sept. 18, 1945. E. P. BULLARD, 3D., ET AL 2,384,809
MACHINE TOOL
Filed May 21, 1942 33 Sheets-Sheet 6

INVENTORS
Edward P. Bullard III
Leroy E. Alvey
Edward N. Cowell
Paul H. Lange
Frank H. Mussler
BY
ATTORNEY Sept. 18, 1945.     E. P. BULLARD, 3D., ET AL     2,384,809
MACHINE TOOL
Filed May 21, 1942     33 Sheets-Sheet 9

INVENTORS
Edward P. Bullard, III
Leroy E. Alvey
Edward N. Cowell
Paul H. Lange
Frank H. Musser
BY
Paul M. Kist
ATTORNEY Sept. 18, 1945.  E. P. BULLARD, 3D., ET AL  2,384,809
MACHINE TOOL
Filed May 21, 1942  33 Sheets-Sheet 10

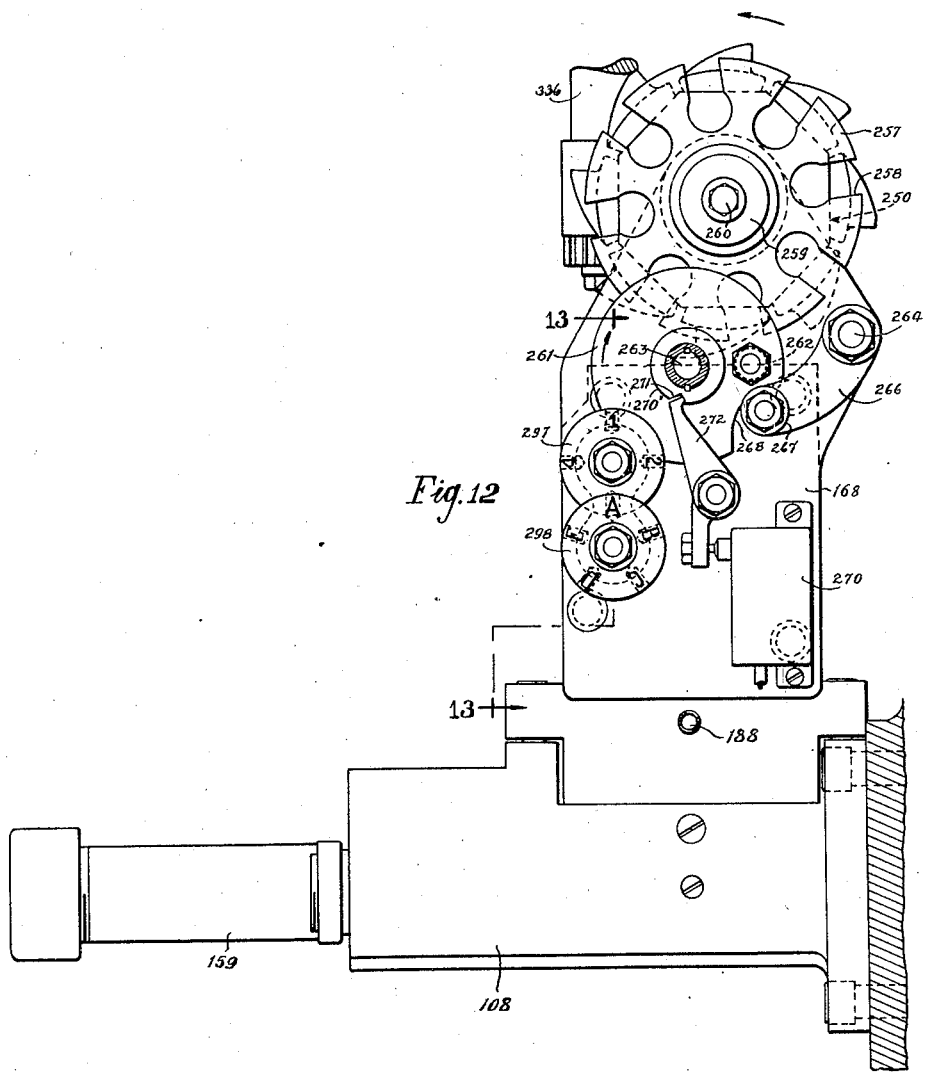

Sept. 18, 1945.  E. P. BULLARD, 3D., ET AL  2,384,809
MACHINE TOOL
Filed May 21, 1942  33 Sheets—Sheet 12
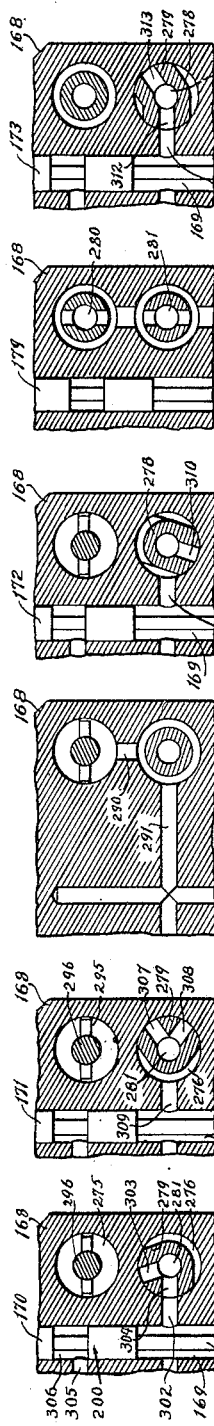
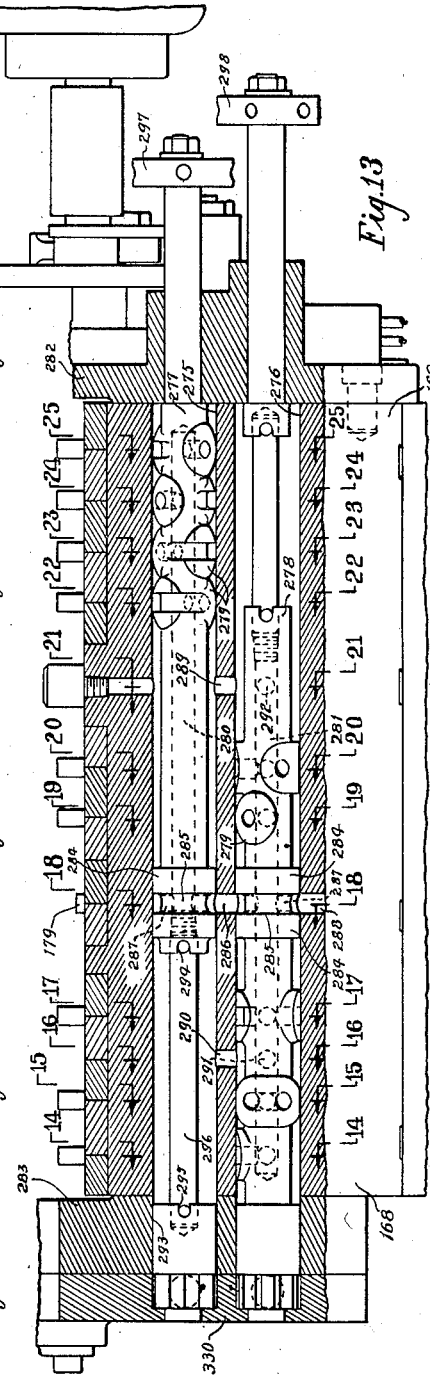
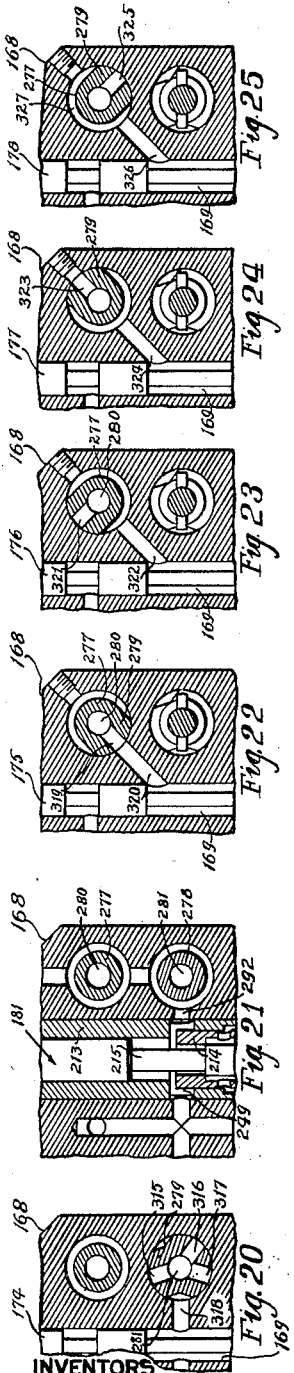
INVENTORS
Edward P. Bullard, III
Leroy E. Alvey
Edward N. Cowell
Paul H. Lange
Frank H. Mussler
BY
Paul M. Grist
ATTORNEY Sept. 18, 1945.   E. P. BULLARD, 3D., ET AL   2,384,809
MACHINE TOOL
Filed May 21, 1942   33 Sheets-Sheet 14

INVENTORS
Edward P. Bullard III
Leroy E. Alvey
Edward N. Cowell
Paul H. Lange
Frank H. Mussler BY Paul M. Geist
ATTORNEY

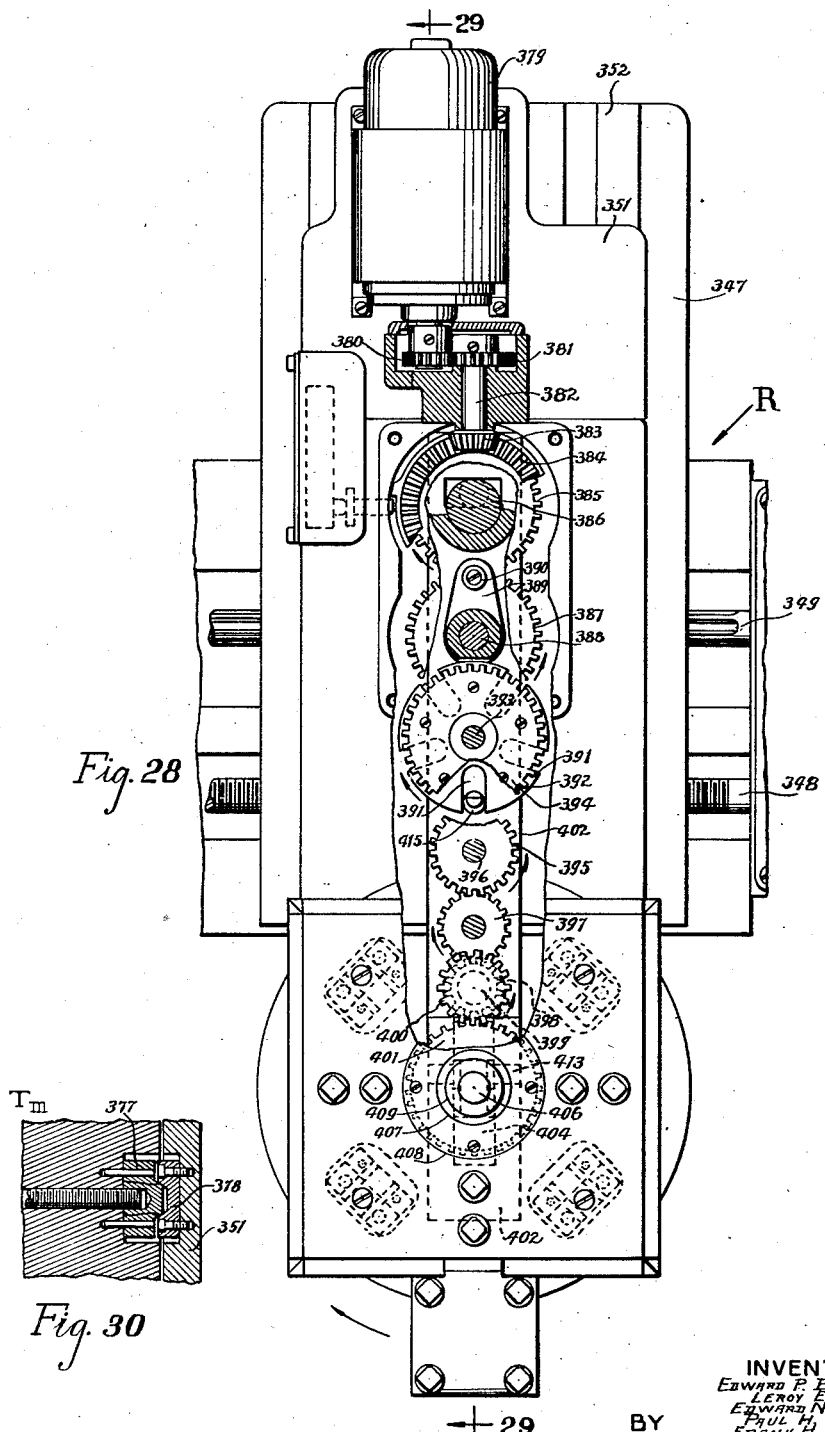

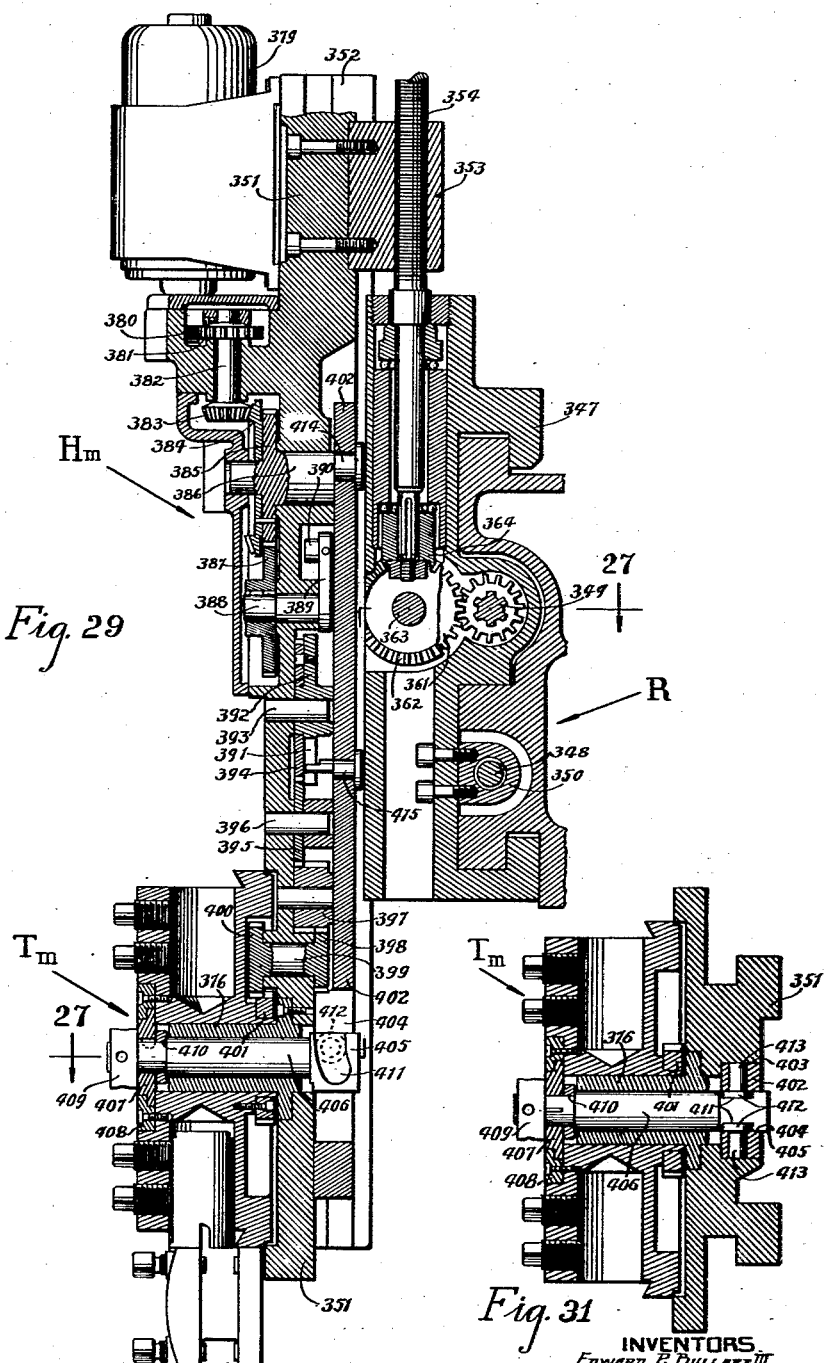

Sept. 18, 1945. E. P. BULLARD, 3D., ET AL 2,384,809
MACHINE TOOL
Filed May 21, 1942 33 Sheets-Sheet 18

INVENTORS
Edward P. Bullard III
Leroy E. Alvey
Edward N. Cowell
Paul H. Lange
Frank H. Mussler
BY
Paul M. Grist
ATTORNEY Sept. 18, 1945.  E. P. BULLARD, 3D., ET AL  2,384,809
MACHINE TOOL
Filed May 21, 1942  33 Sheets-Sheet 24

Sept. 18, 1945.  E. P. BULLARD, 3D., ET AL  2,384,809
MACHINE TOOL
Filed May 21, 1942  33 Sheets-Sheet 25

INVENTORS
Edward P. Bullard III
Leroy F. Alvey
Edward N. Cowell
Paul H. Lange
Frank H. Mussler
BY
Paul M. Gest
ATTORNEY

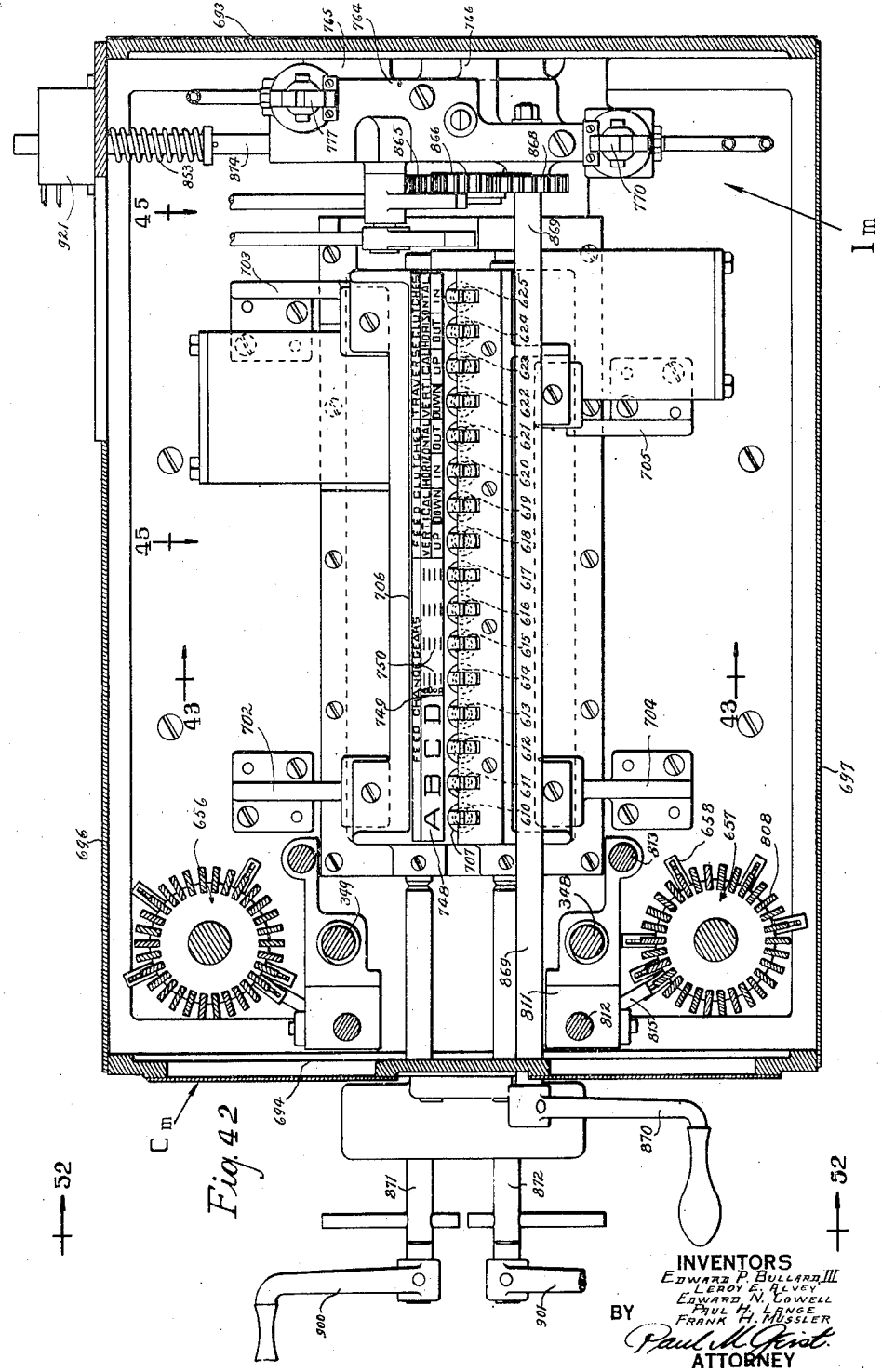

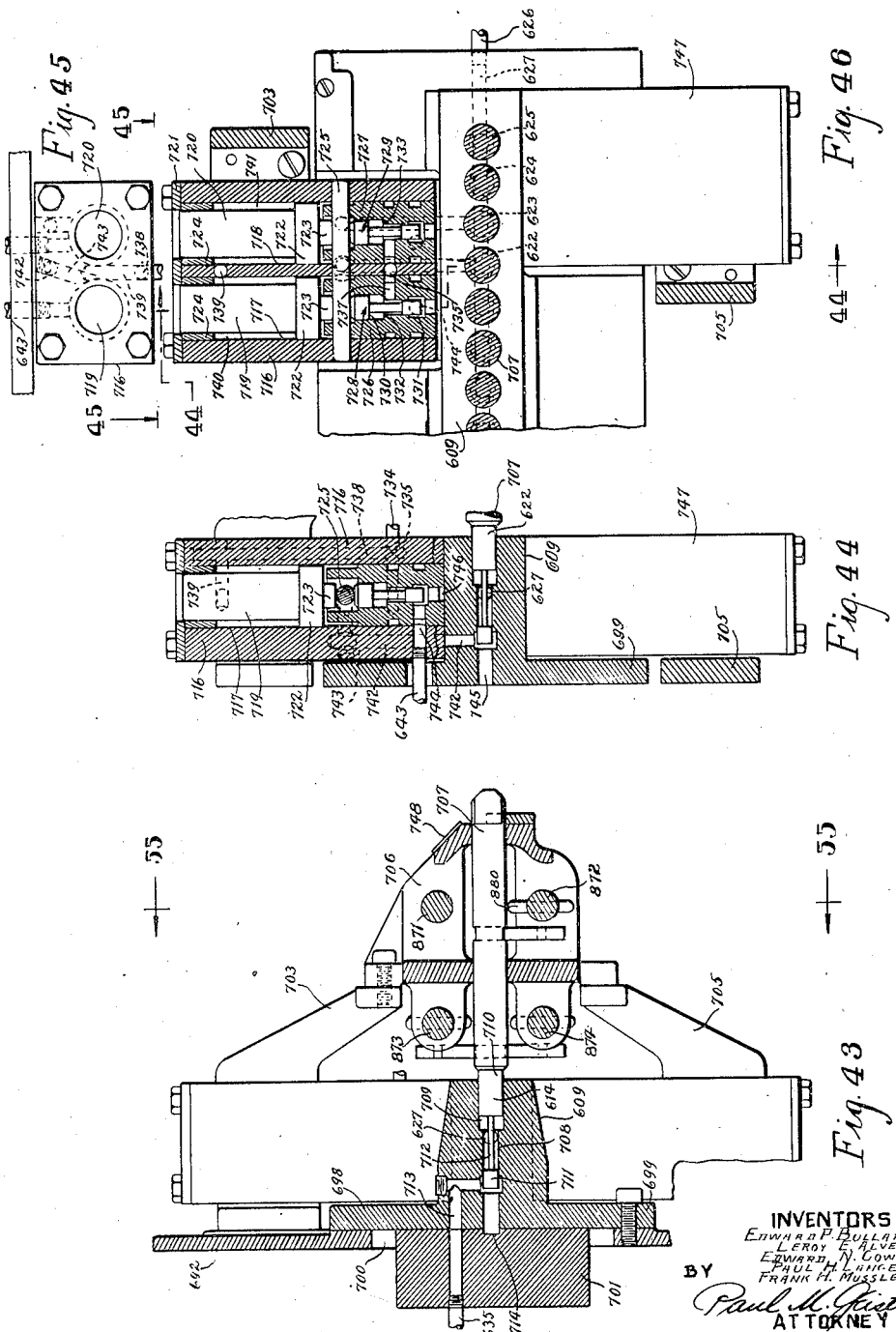

Sept. 18, 1945.　　E. P. BULLARD, 3D., ET AL　　2,384,809
MACHINE TOOL
Filed May 21, 1942　　33 Sheets-Sheet 28
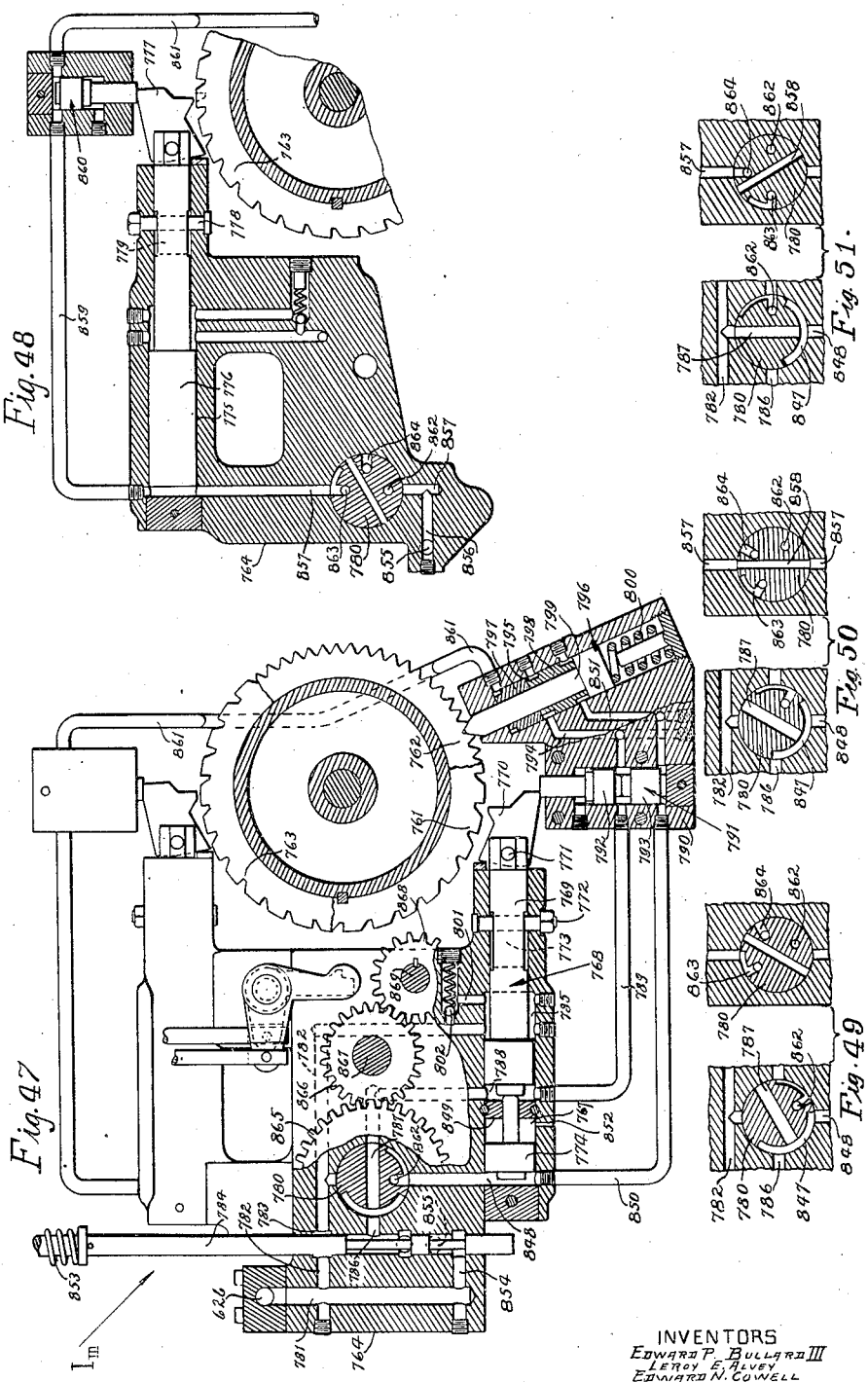
INVENTORS
EDWARD P. BULLARD III
LEROY E. ALVEY
EDWARD N. COWELL
PAUL H. LANGE
FRANK H. MUSSLER
BY Paul M. Geist
ATTORNEY

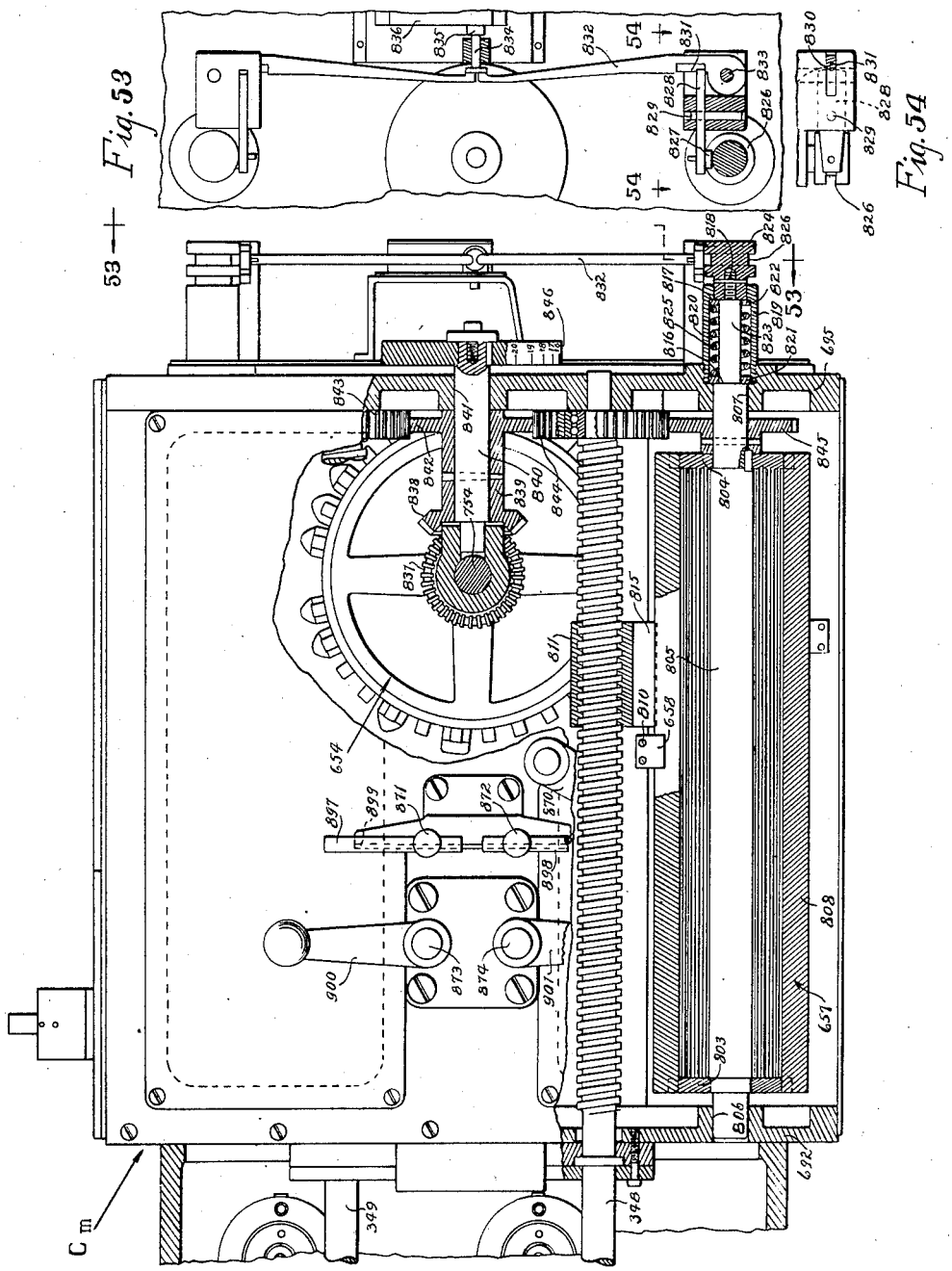

Sept. 18, 1945. E. P. BULLARD, 3D., ET AL 2,384,809
MACHINE TOOL
Filed May 21, 1942 33 Sheets-Sheet 30
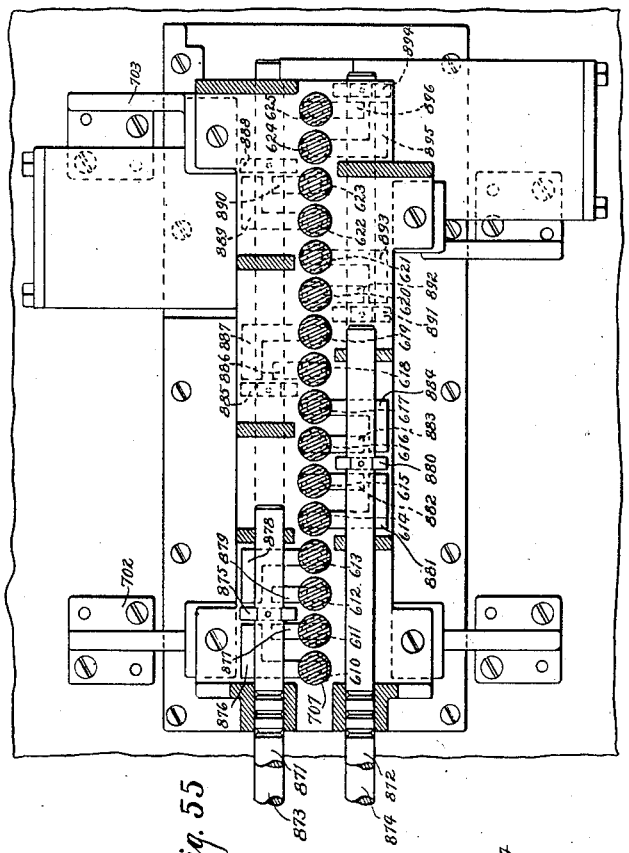
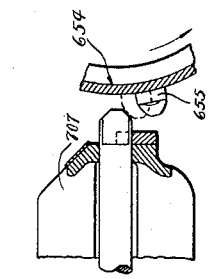
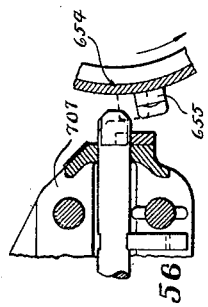
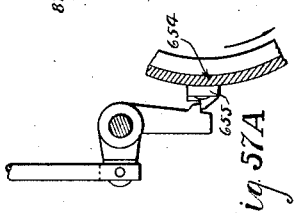
INVENTORS
Edward P. Bullard, III
Leroy E. Alvey
Edward N. Cowell
Paul H. Lange
Frank H. Mussler
BY
Paul M. Grist
ATTORNEY Sept. 18, 1945.    E. P. BULLARD, 3D., ET AL    2,384,809
MACHINE TOOL
Filed May 21, 1942    33 Sheets-Sheet 32
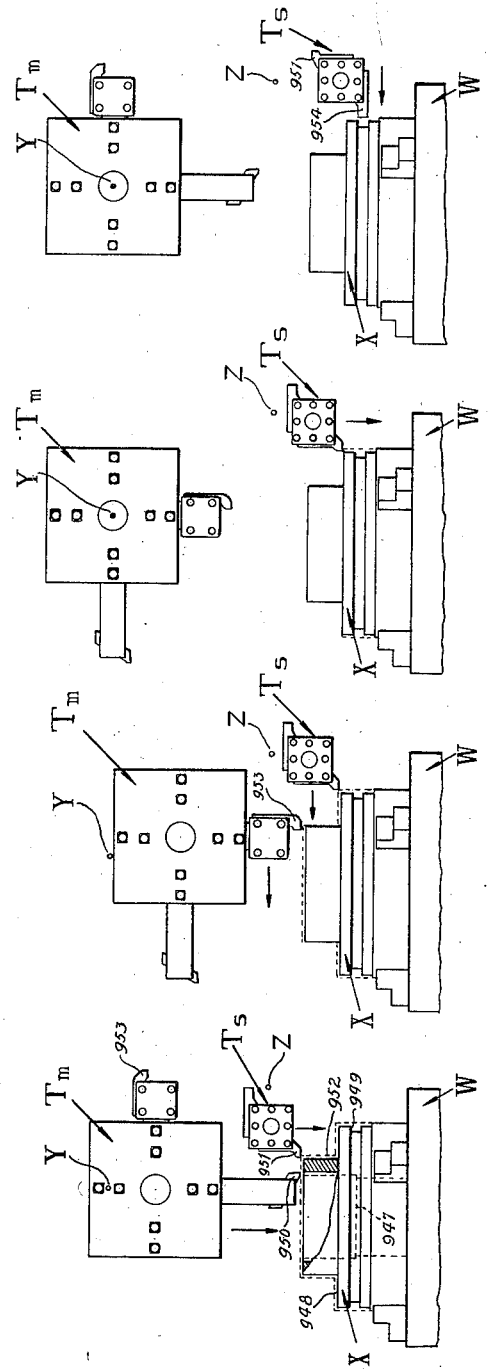
INVENTORS
Edward P. Bullard III
Leroy E. Alvey
Edward N. Cowell
Paul H. Lange
Frank H. Mussler
BY
Paul M. Gast.
ATTORNEY Sept. 18, 1945.  E. P. BULLARD, 3D., ET AL  2,384,809
MACHINE TOOL
Filed May 21, 1942  33 Sheets-Sheet 33
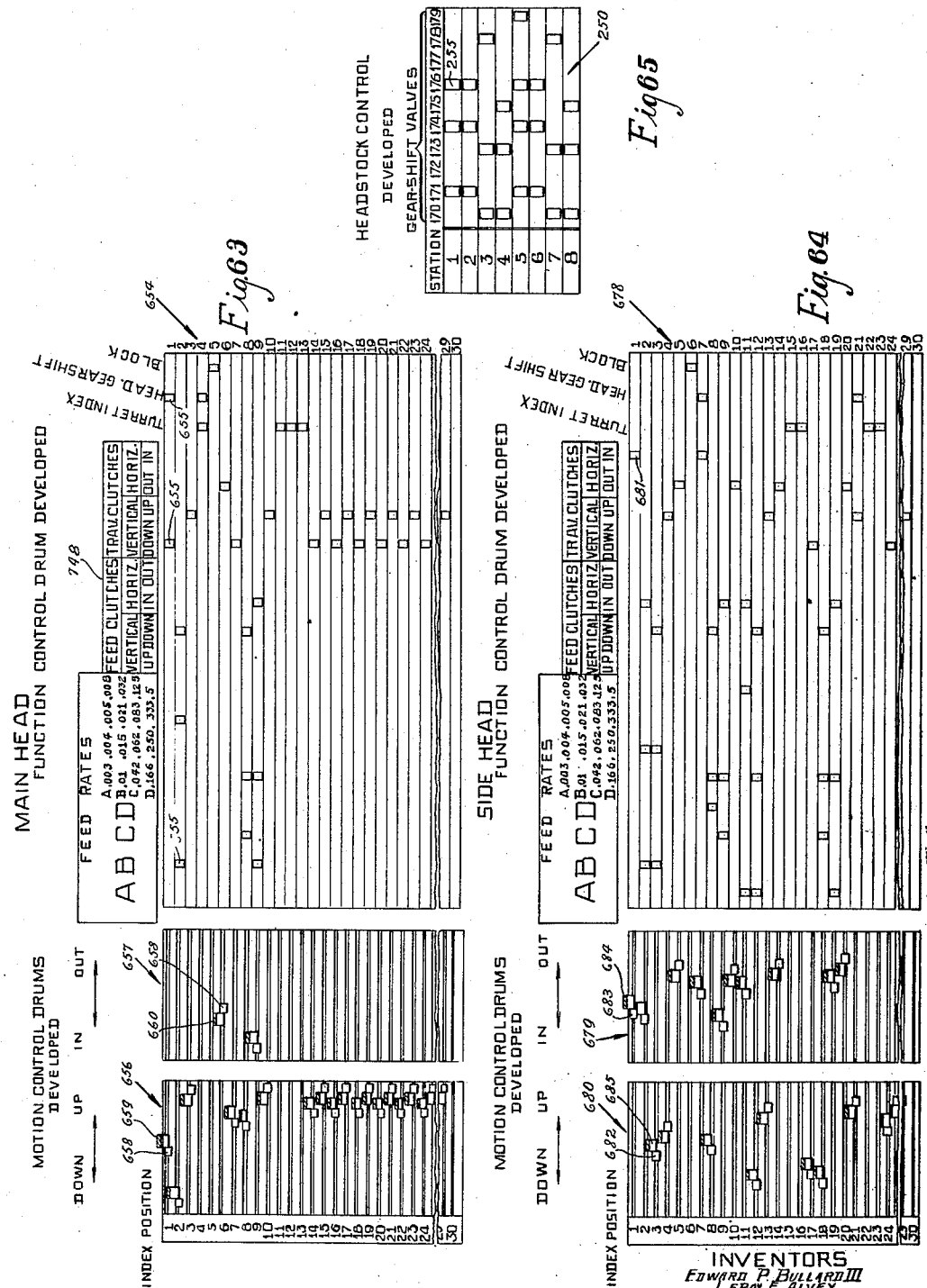
INVENTORS
EDWARD P. BULLARD III
LEROY E. ALVEY
EDWARD N. COWELL
PAUL H. LANGE
FRANK H. MUSSLER
BY Paul M. Gist.
ATTORNEY Patented Sept. 18, 1945

2,384,809

UNITED STATES PATENT OFFICE 2,384,809

MACHINE TOOL

Edward P. Bullard, III, Fairfield, Le Roy E. Alvey, Bridgeport, Edward N. Cowell, Stratford, Paul H. Lange, Bridgeport, and Frank H. Mussler, Stratford, Conn., assignors to The Bullard Company, a corporation of Connecticut Application May 21, 1942, Serial No. 443,992

63 Claims. (Cl. 29—36)

This invention relates to machine tools generally, and particularly to the type of machine tools that include one or more members, each adapted to be moved in either direction along one or more paths at a plurality of speeds, and in which variable relative rotary movement is adapted to be provided between said members and work or tool-supporting means.

An object of this invention is to provide a control mechanism for a machine tool that is capable of rendering it fully automatic and yet permitting complete manual operation of the machine tool without affecting the automatic setting of the control mechanism.

Other objects of the invention include, the provision of a machine tool comprising a plurality of members, each adapted to be moved in either direction along one or more paths at a plurality of speeds, and control mechanism for each member that can be set for automatically directing the movement of its member to produce any sequence of any of the functions of which it is capable in any pre-determined order, and in which each of said control mechanisms is under the influence of the other; the provision of such a machine tool and control mechanisms in which the movement of said members may be manually controlled without affecting the automatic setting of the control mechanisms; the provision of such a machine tool wherein the activity of the means that moves the members along their paths is initiated by a source of power separate from that incident to, but which source is adapted to be rendered effective by the motion of either of said members; the provision of such a machine tool wherein the control mechanism for each member is constructed and arranged to initiate the activity of the means that moves its member to produce a succeeding function only after the completion of the next preceding function; the provision of such a machine tool in which the activity of each of the control mechanisms is adapted to be initiated by the other; the provision of such a machine tool in which the control mechanisms for all members are adapted to be operated simultaneously or independently, and wherein either may be stopped while the other continues to function for a predetermined period, whereupon the other is adapted automatically to be re-started; the provision of such a machine tool in which each of the members may be provided with a turret adapted to be indexed from station to station by means rendered effective either manually or by the control mechanism for the member to which the turret is attached; the provision of such a machine tool in which variable relative rotary motion is adapted to be provided between said members and tool or work-supporting means, which relative rotary motion may be selected by mechanism rendered effective either manually or automatically by either of the control mechanisms for the members; the provision of such a machine toool in which the main prime mover therefor is adapted instantly to be stopped in the event the means that initiates the activity of any of the control mechanisms fails to function; and the provision of a machine tool embodying structure for accomplishing all of the aforementioned objects jointly.

The above, as well as other objects and novel features of the invention, will become apparent from the following specification and accompanying drawings, in which:

Figure 2 is a side elevational view of the machine of Figure 1;

Figure 1:
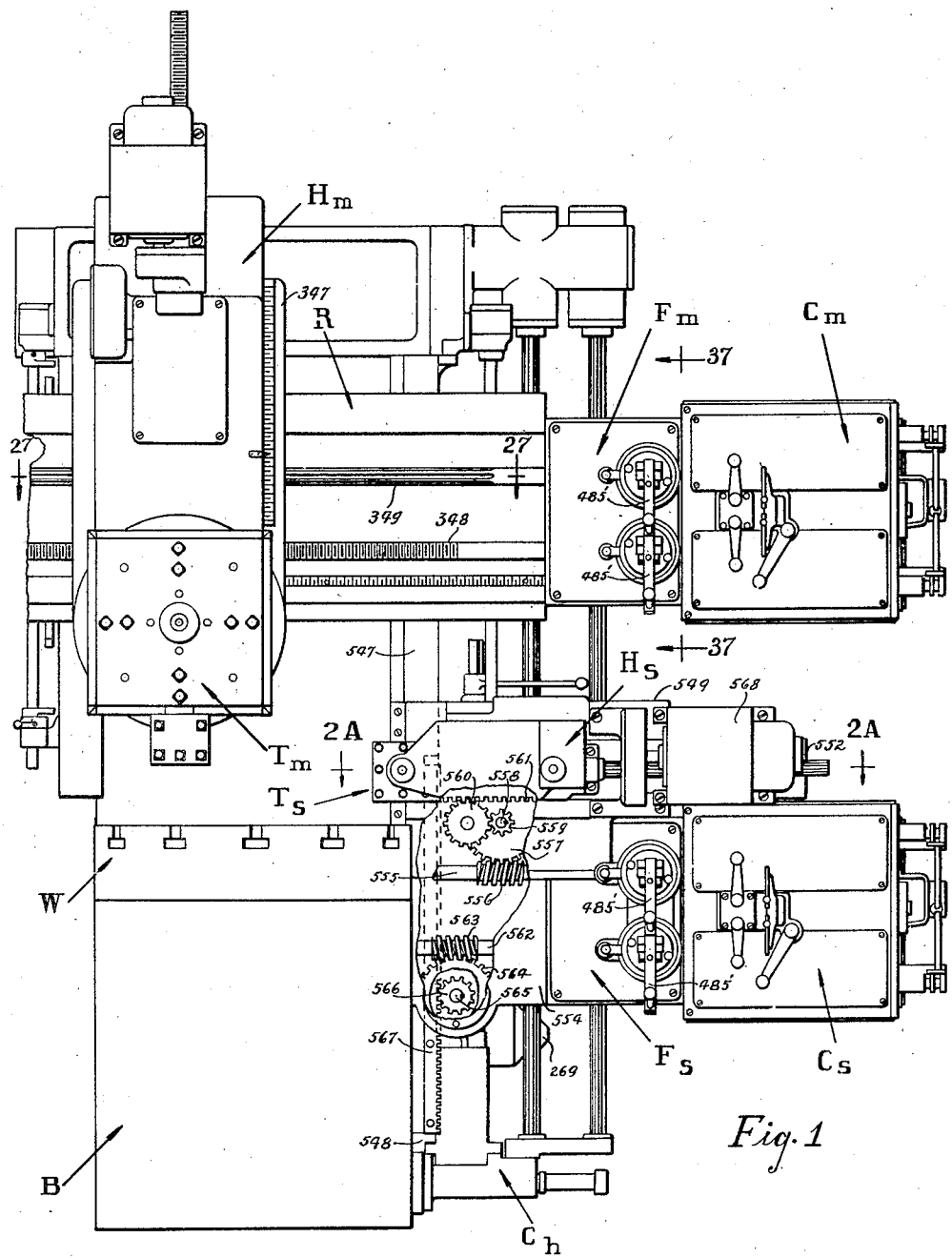
Figure 1 is a front elevational view of a machine tool embodying the principles of this invention.
Figure 4:
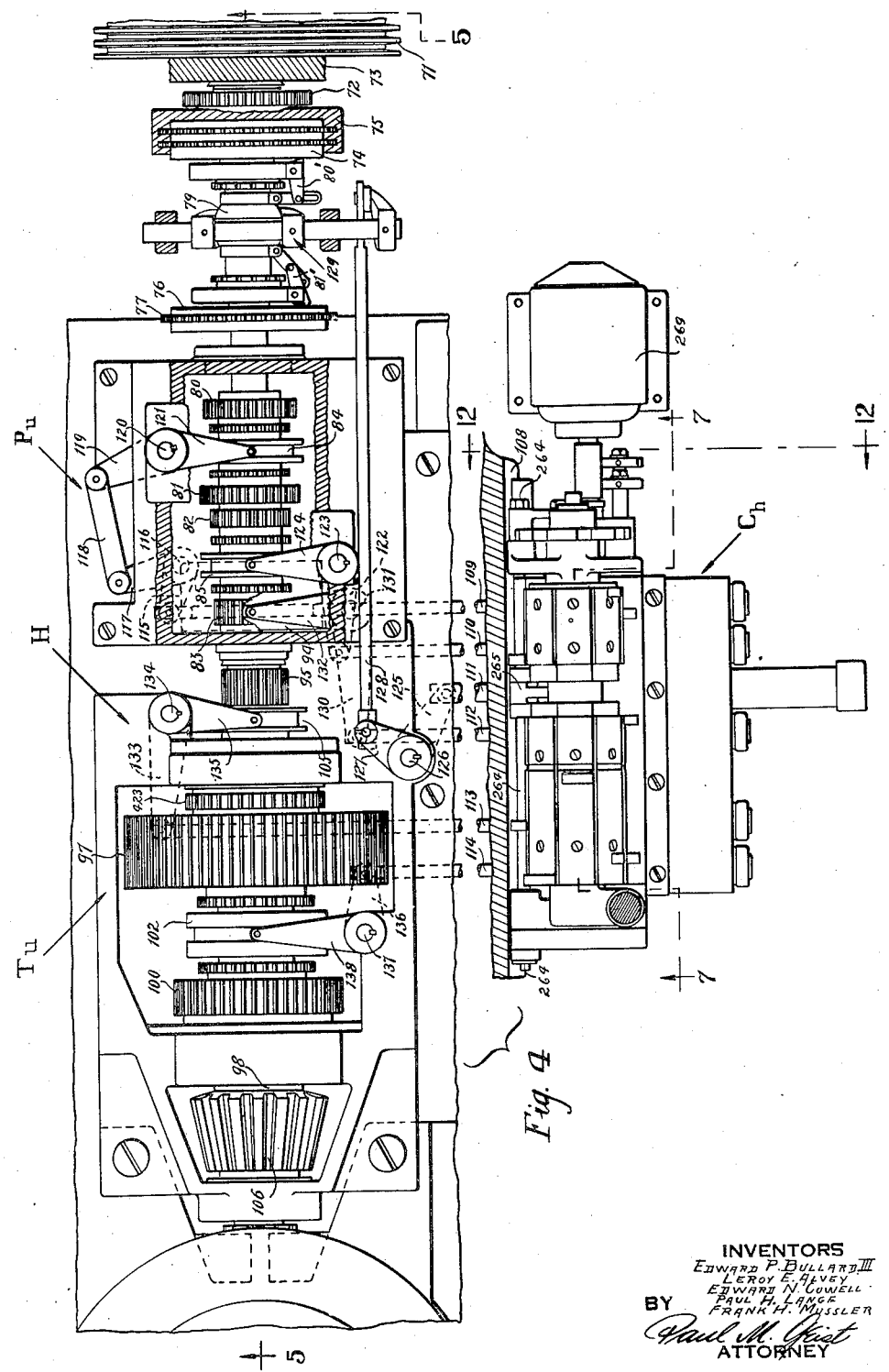
Figure 4 is a sectional plan view taken substantially along line 4—4 of Fig. 2, showing the headstock transmission and its control.
Figure 7:
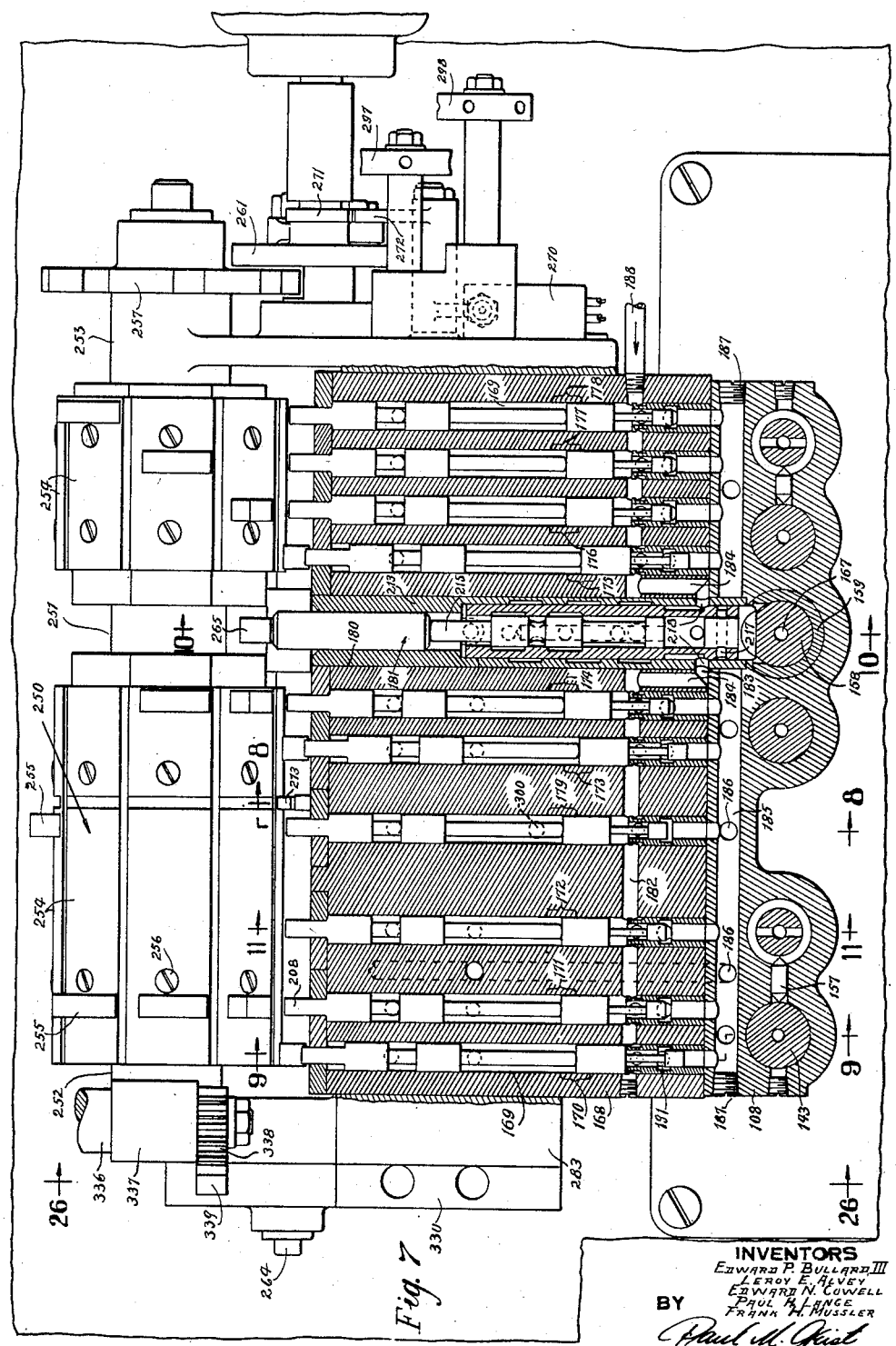
Figure 7 is a sectional elevational view taken substantially along line 7—7 of Fig. 4.
Figure 26:
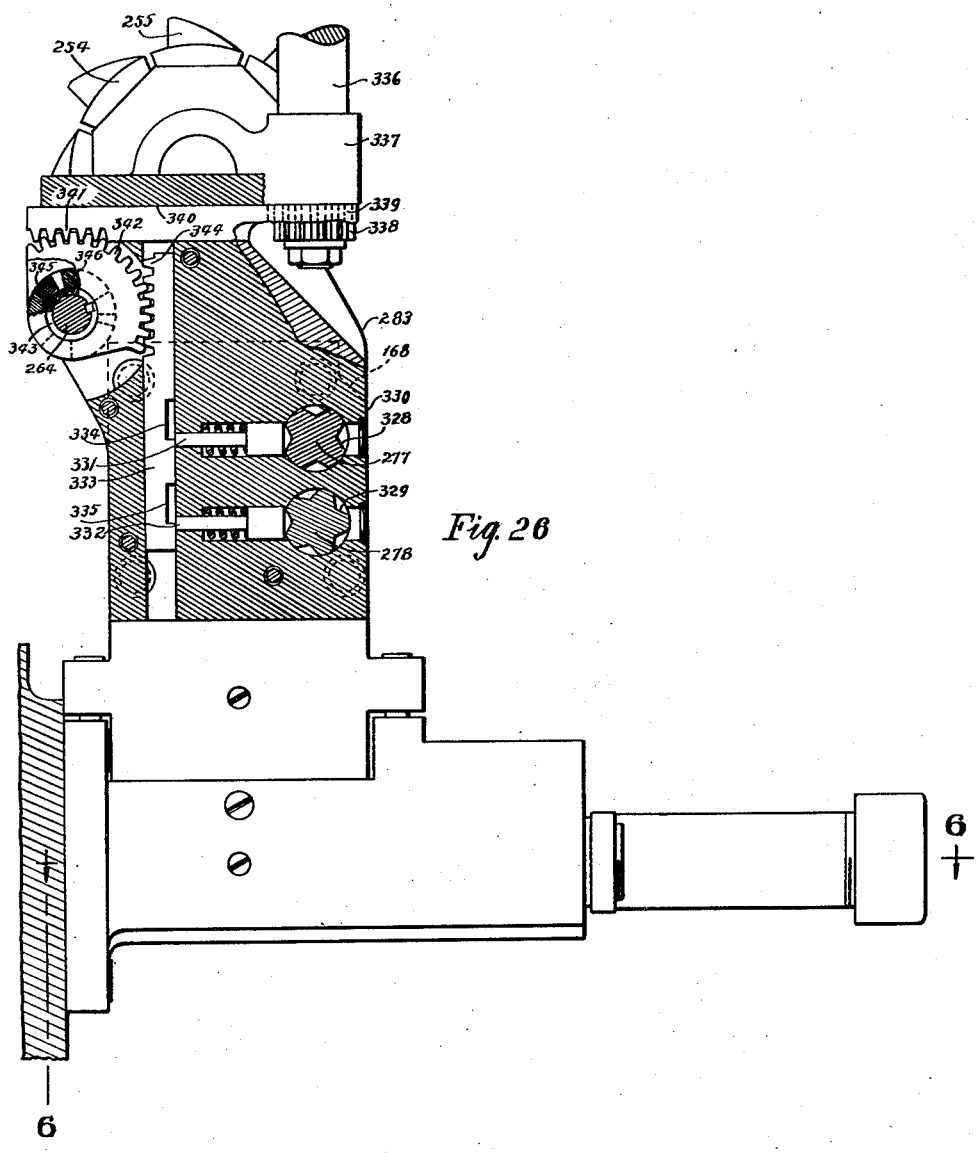
Figure 27:
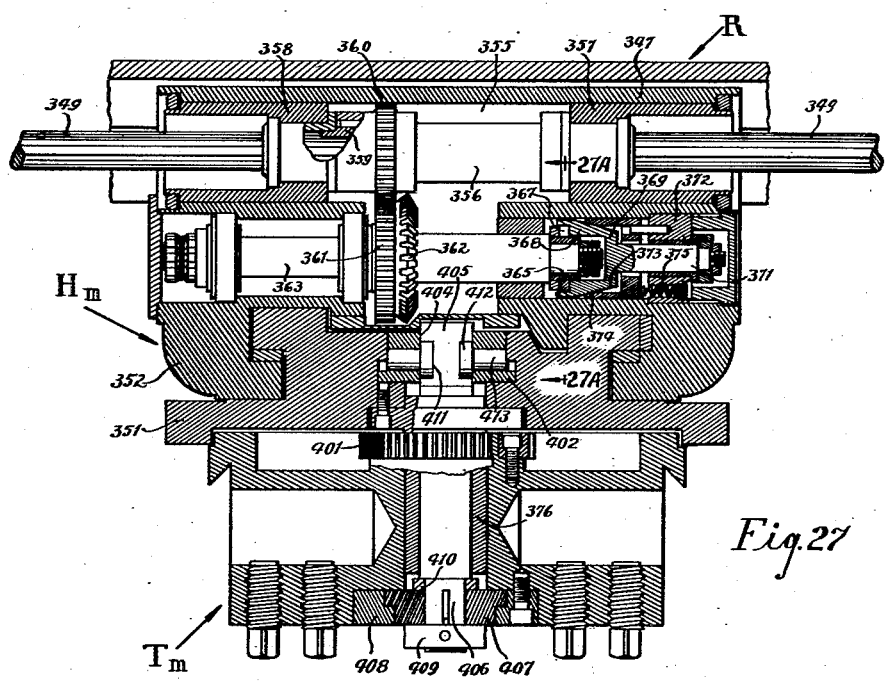
Figure 27A:
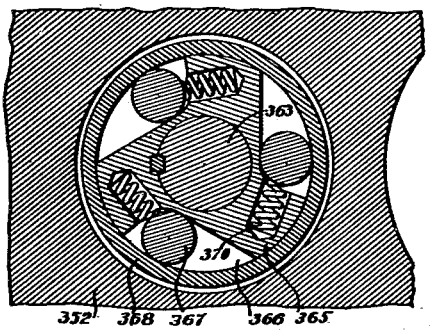
Figure 32:
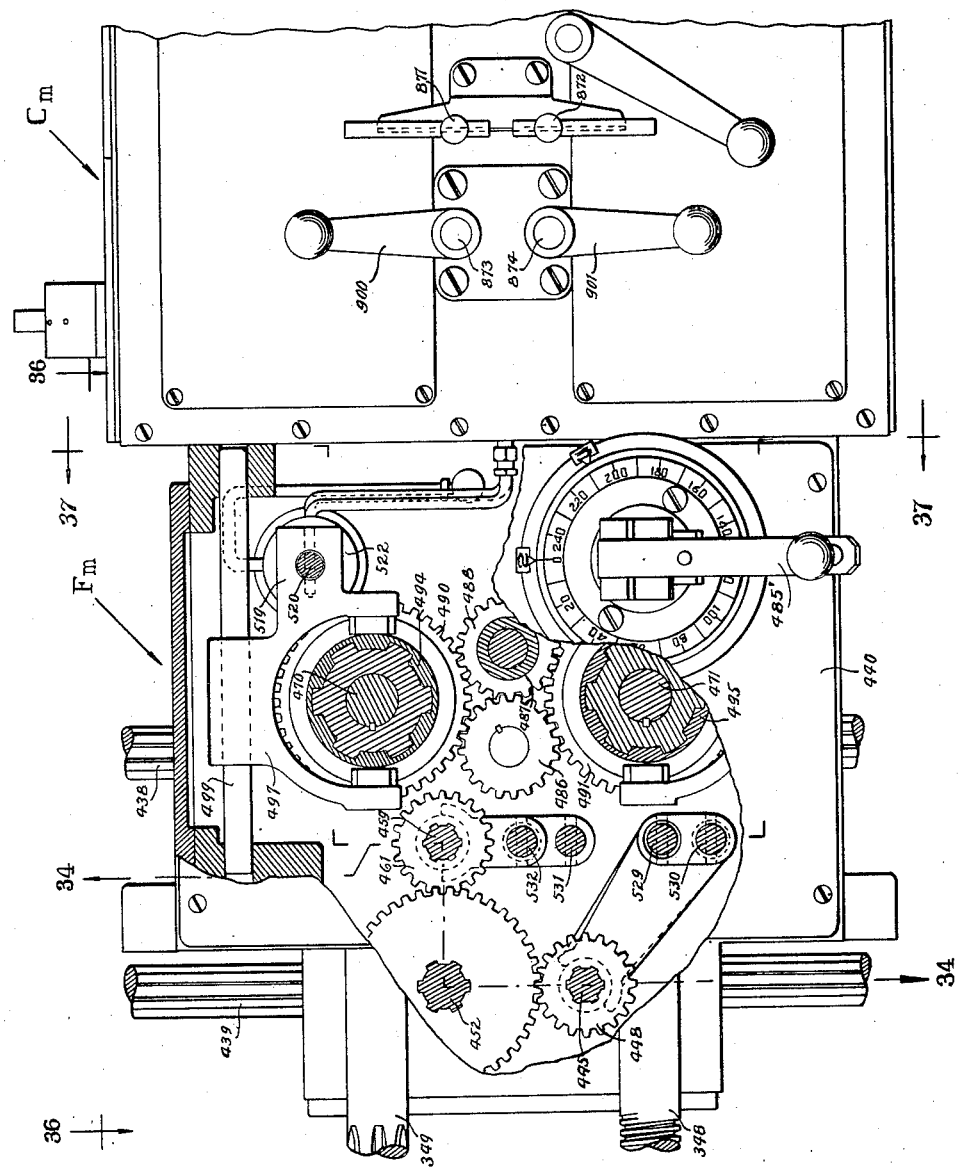
Figure 34:
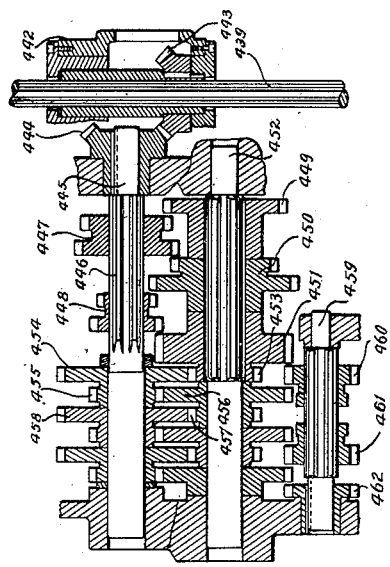
Figure 33:
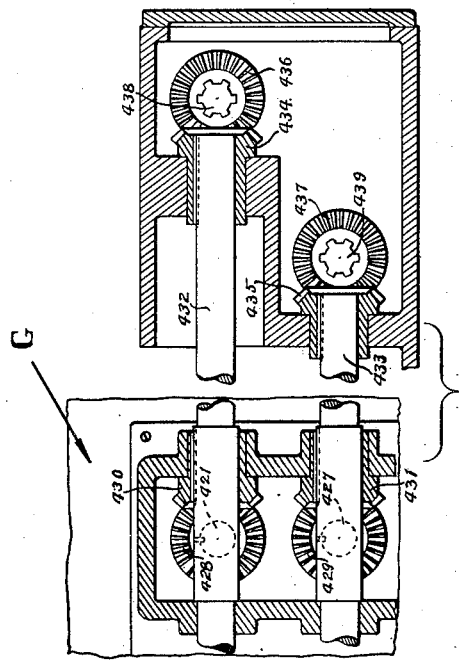
Figure 35:
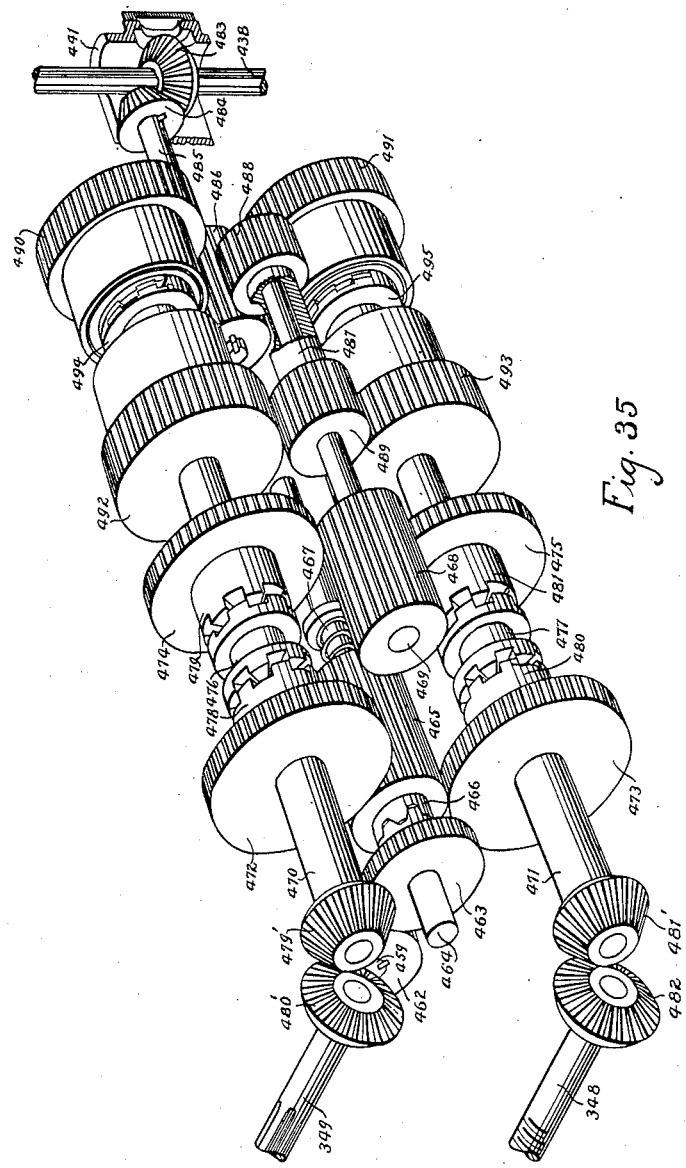
Figure 36:
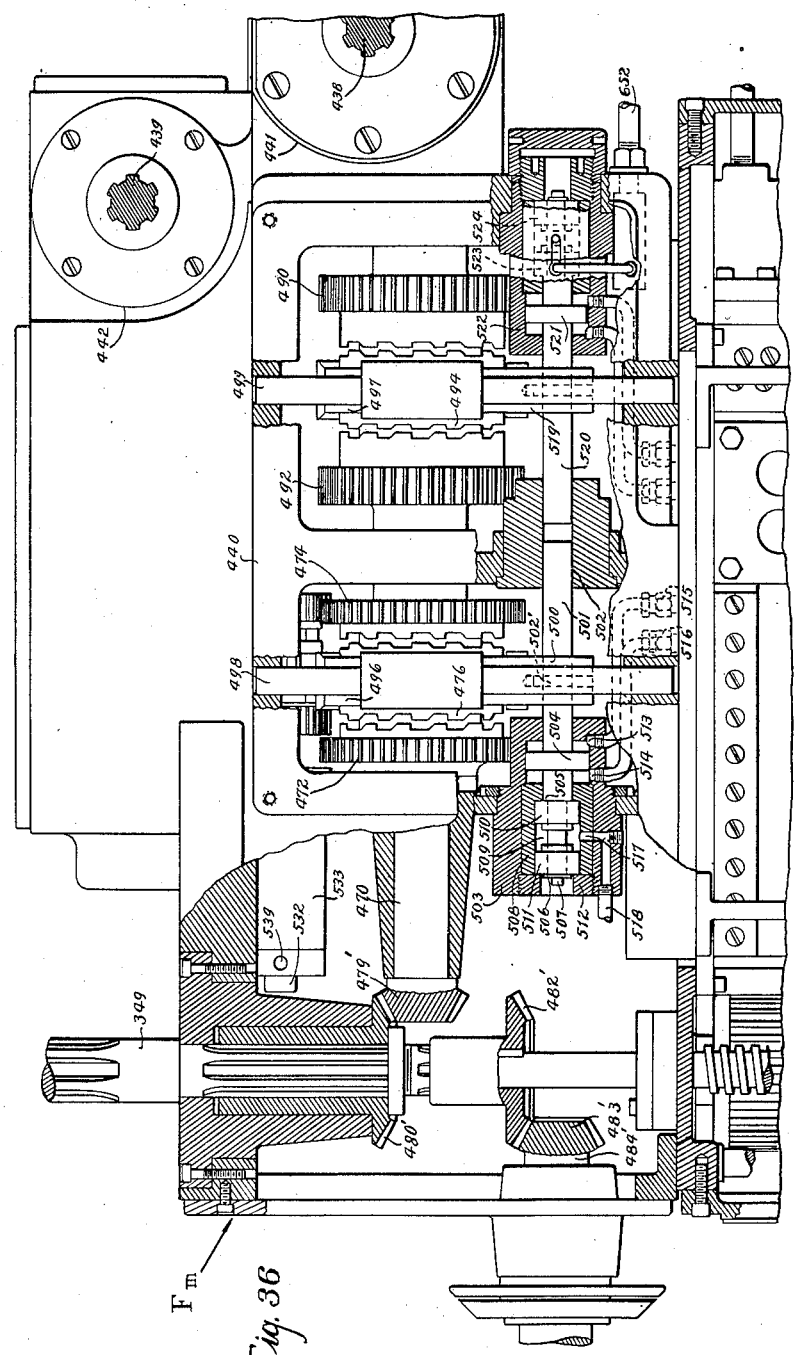
Figure 37:
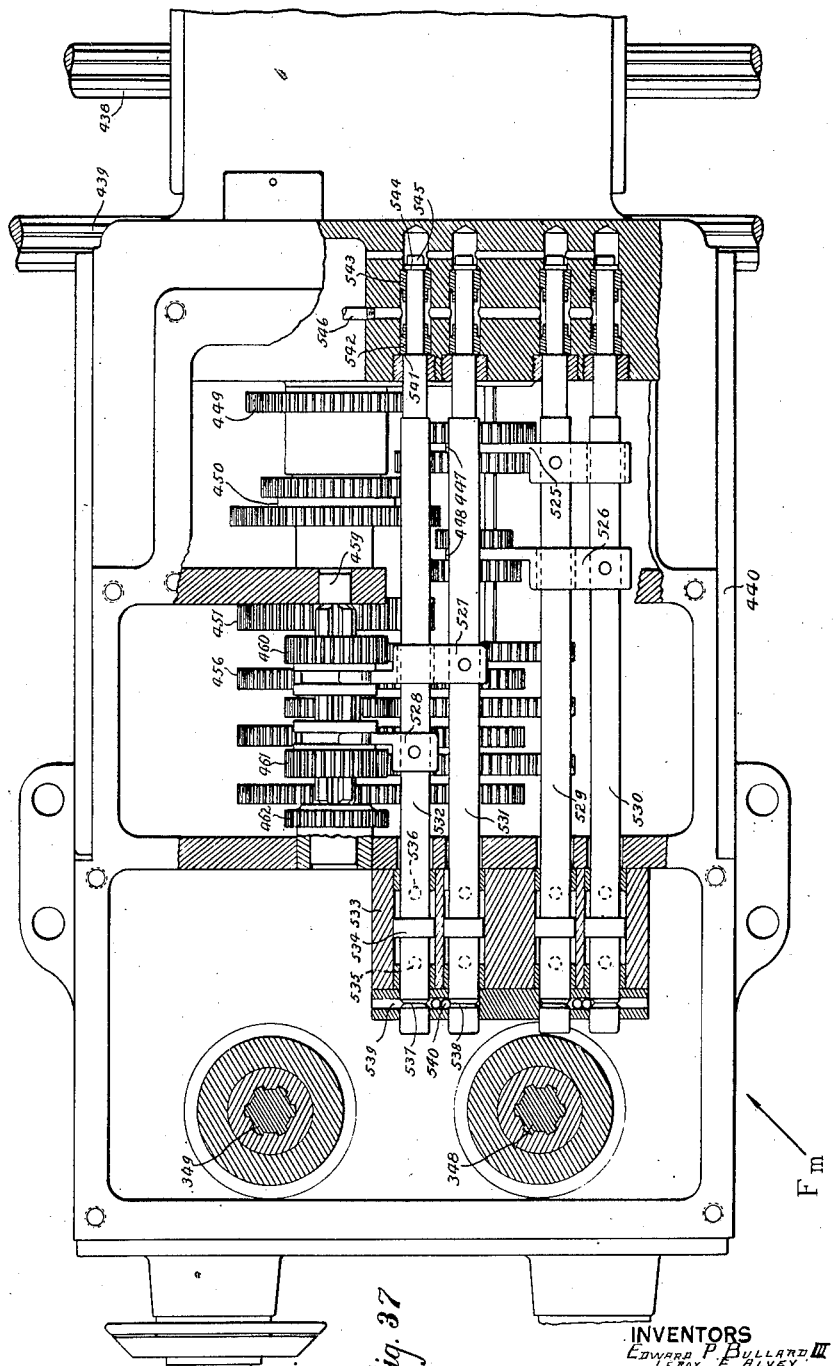
Figure 38:
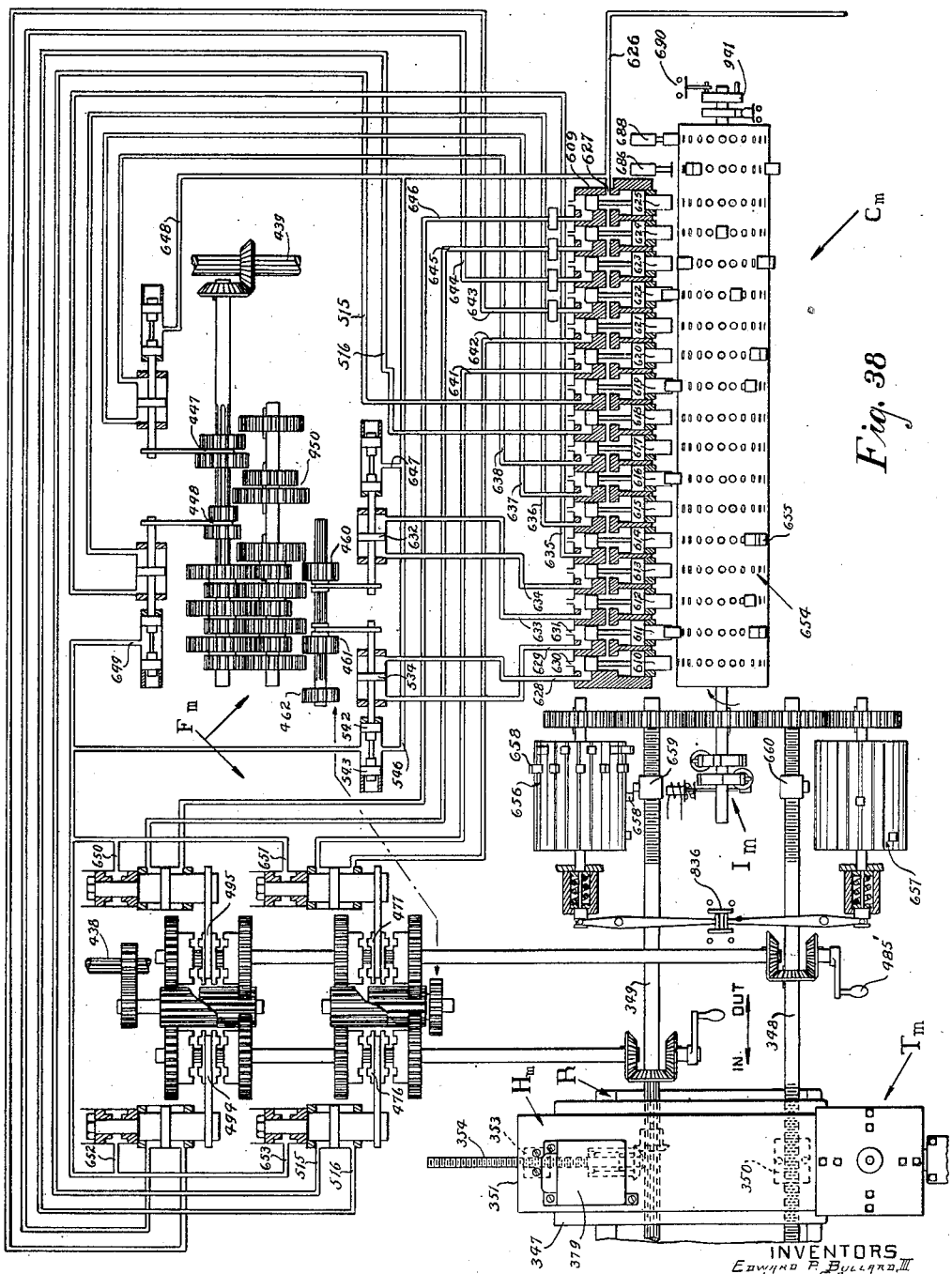
Figure 39:
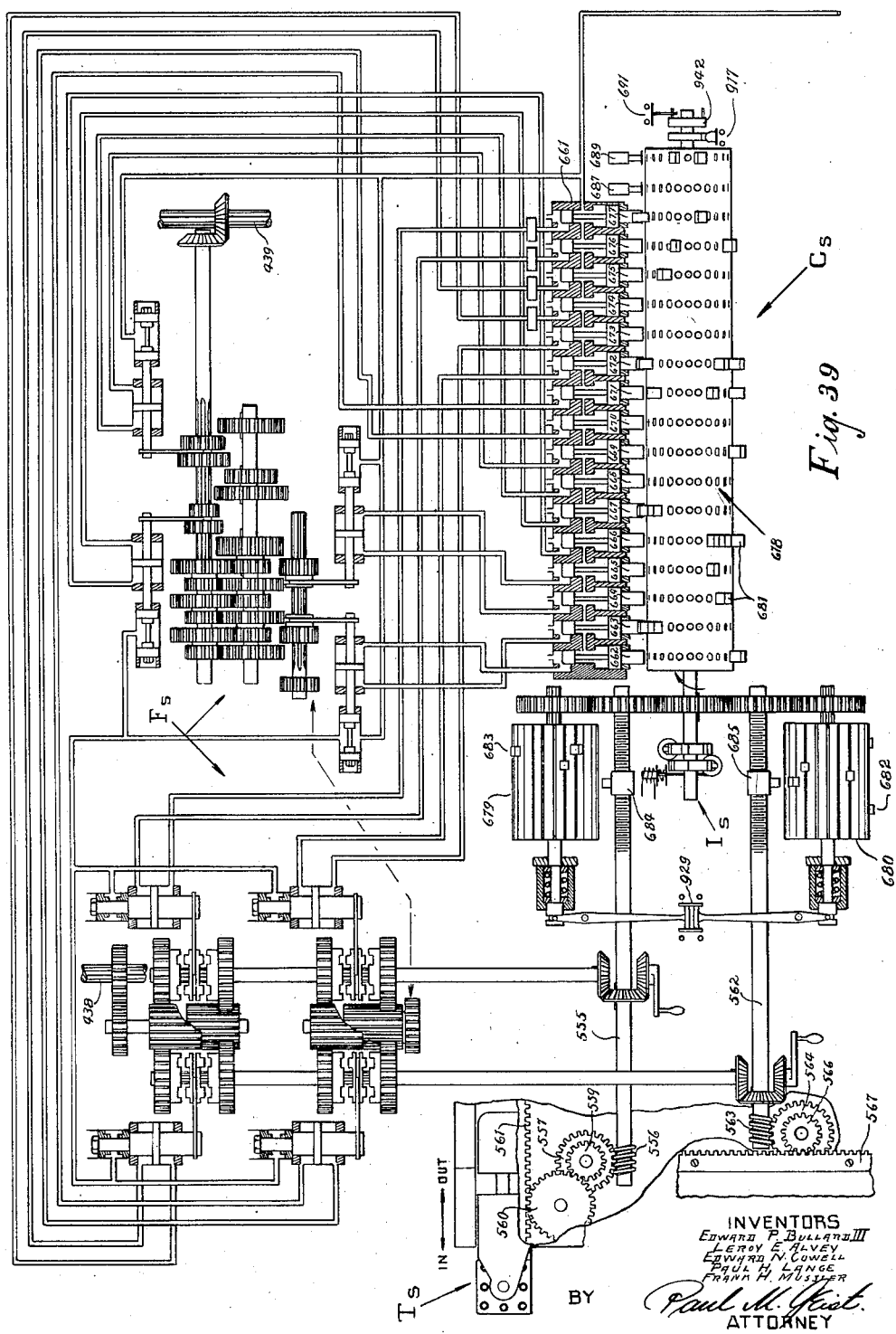
Figure 40:
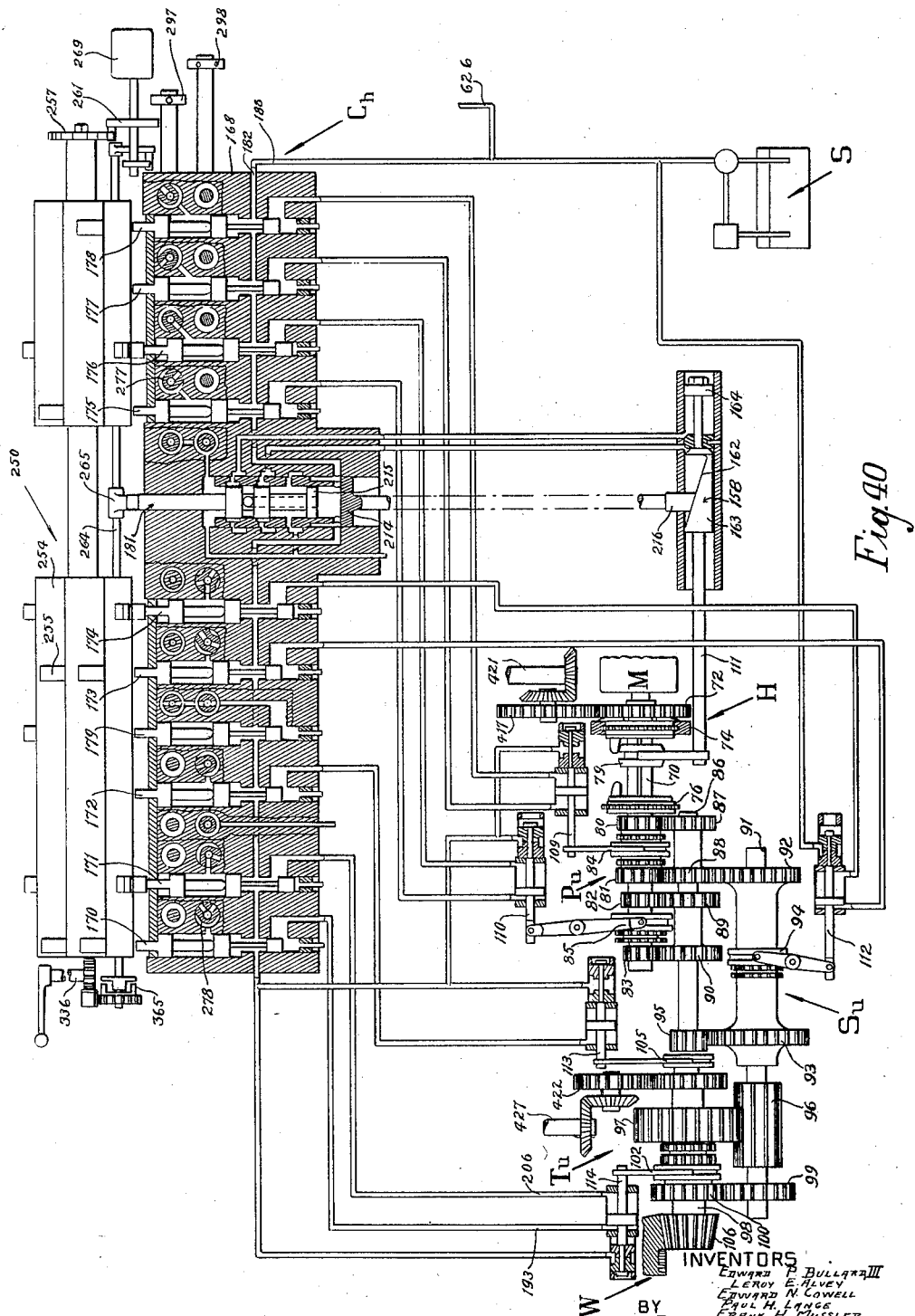
Figure 41:
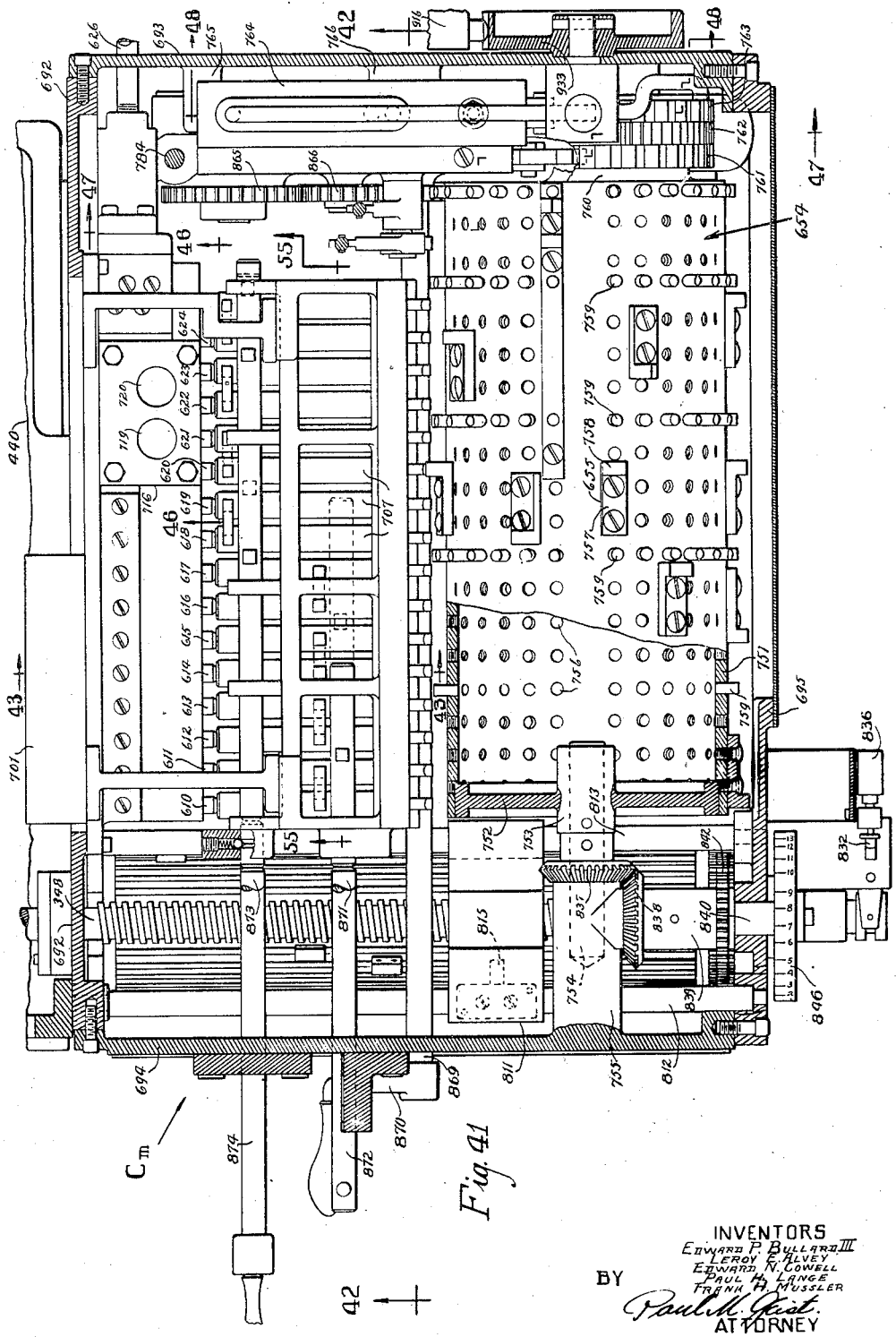
Figure 58:
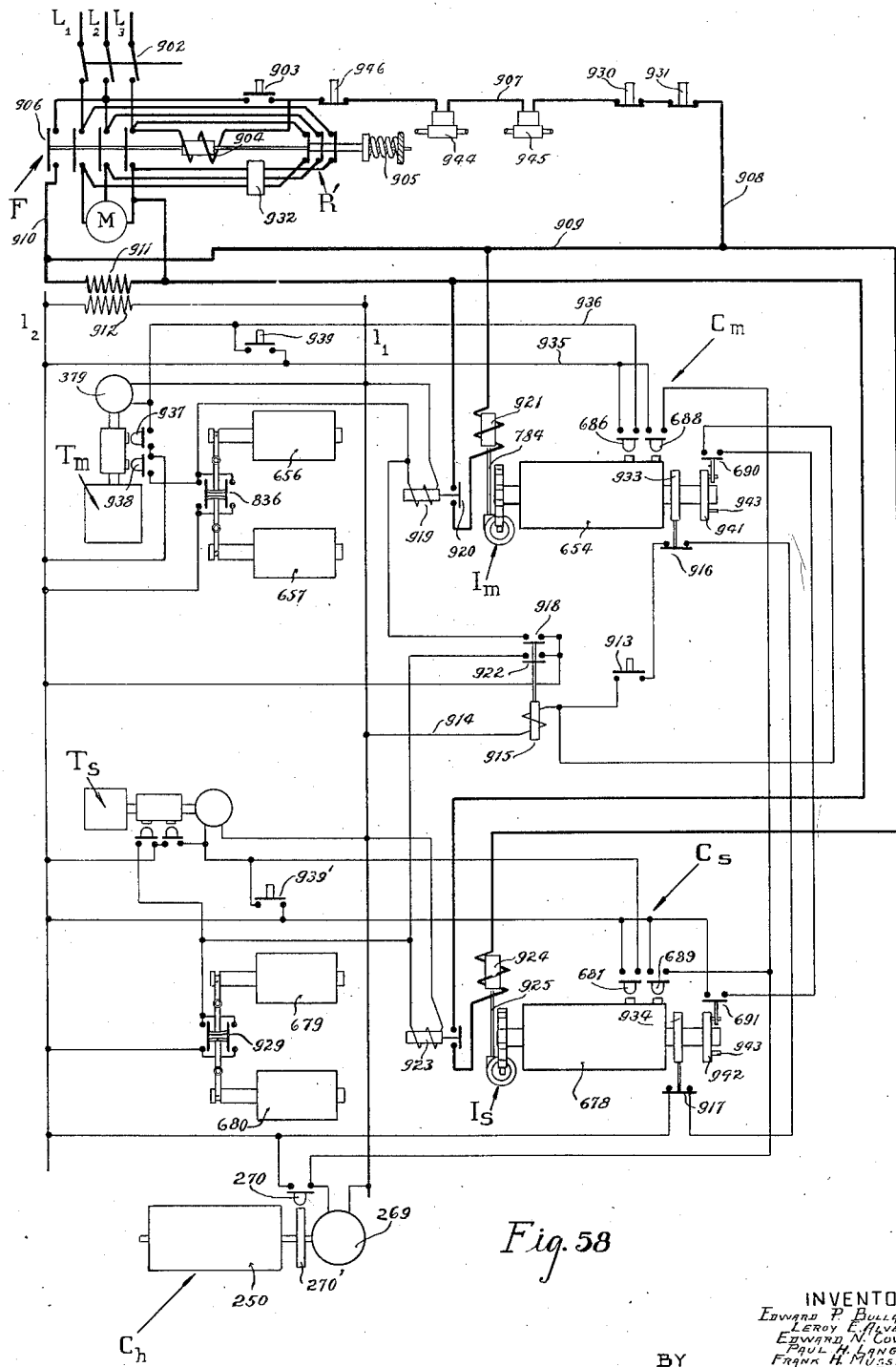

Figures 8 to 11 inclusive are sectional elevational views taken substantially along lines 8—8 to 11—11 inclusive of Fig. 7;

Figure 12 is a sectional elevational view taken substantially along line 12—12 of Fig. 4;

Figure 13 is a sectional elevational view taken substantially along line 13—13 of Fig. 12;

Figures 14 to 25 inclusive are sectional elevational views taken substantially along lines 14—14 to 25—25 inclusive of Fig. 13;

Figure 26 is a sectional elevational view taken substantially along line 26—26 of Fig. 7;

Figure 27 is a sectional plan view taken substantially along line 27—27 of Fig. 1;

Figure 27A is an enlarged sectional elevational view taken substantially along line 27A—27A of Figure 27;

Figure 28 is an enlarged front elevational view of the main head turret indexing mechanism shown in Fig. 1;

Figure 29 is a sectional elevational view taken substantially along line 29—29 of Fig. 28;

Figures 30 and 31 are details of the structure of Figs. 28 and 29;

Figure 32 is a front elevational view of the feedworks Fm and its control Cm of Fig. 1, parts being broken away to show others;

Figure 33 is a sectional plan view taken substantially along line 33—33 of Fig. 2;

Figure 34 is a stretchout sectional view taken substantially along line 34—34 of Fig. 32;

Figure 35 is a perspective view of a portion of the feedworks transmission of Fig. 32;

Figure 36 is a sectional plan view, parts being broken away to show others and taken substantially along line 36—36 of Fig. 32;

Figure 37 is a sectional elevational view taken substantially along line 37—37 of Fig. 1;

Figures 38, 39 and 40 are diagrammatic sketches of the main and side head feedworks and headstock transmissions together with their control mechanisms;

Figure 41 is a sectional plan view taken substantially along line 41—41 of Fig. 2;

Figure 42 is a partial sectional elevational view taken substantially along line 42—42 of Fig. 41;

Figure 43 is a partial sectional elevational view taken substantially along line 43—43 of Figs. 41 and 42;

Fig. 44 is a sectional elevational view taken substantially along line 44—44 of Fig. 46;

Figure 45 is a top plan view as viewed along line 45—45 of Figs. 42 and 46;

Figure 46 is a sectional elevational view taken substantially along line 46—46 of Fig. 41;

Figure 47 is a sectional elevational view taken substantially along line 47—47 of Fig. 41;

Figure 48 is a sectional elevational view taken substantially along line 48—48 of Fig. 41;

Figures 49, 50 and 51 are sectional elevational views of various positions of the valve of Figs. 47 and 48;

Figure 52 is a front elevational view partly in section of the control Cm as viewed along line 52—52 of Fig. 42;

Figure 53 is a side elevational view, partly in section and taken substantially along line 53—53 of Fig. 52;

Figure 54 is a top plan view as viewed along line 54—54 of Fig. 53;

Figure 55 is a sectional elevational view taken substantially along line 55—55 of Figs. 41 and 43;

Figures 56, 57 and 57A are details of construction;

Figure 58 is a diagram of the electrical circuit for the apparatus;

Figures 59 to 62 inclusive are diagrammatic views of a work piece and different positions of certain tools during the machining thereof; and Figures 63 to 65 inclusive are diagrams illustrating the setting of the control mechanisms of the machine tool for causing it to automatically machine the work piece of Fig. 59.

Although the principles of this invention are applicable to many types of machines, they have been shown and will be described as applied to a vertical turret lathe, the general type of which is shown, described and claimed in Patent Number 2,355,625, dated August 15, 1944.

Figure 2A:
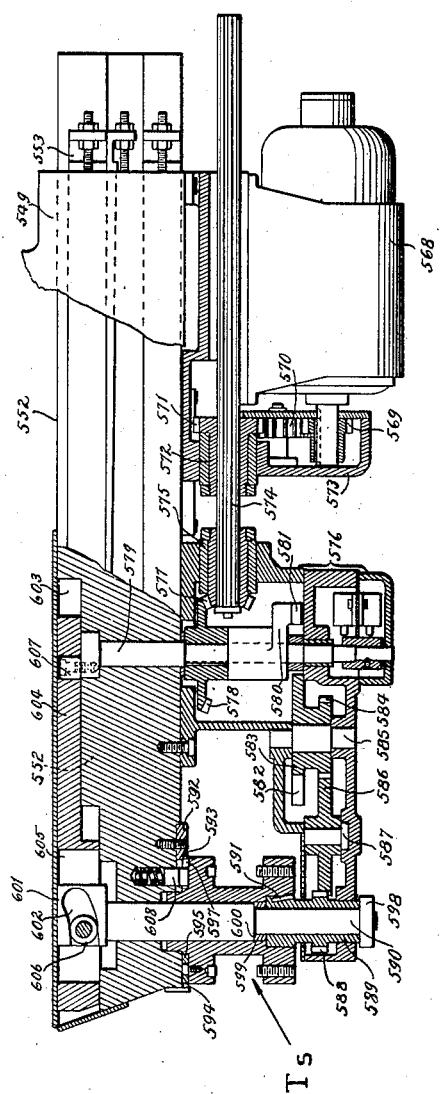
Figure 2A is a plan view partly in section taken along the line 2A—2A of Fig. 1.
Figure 3:
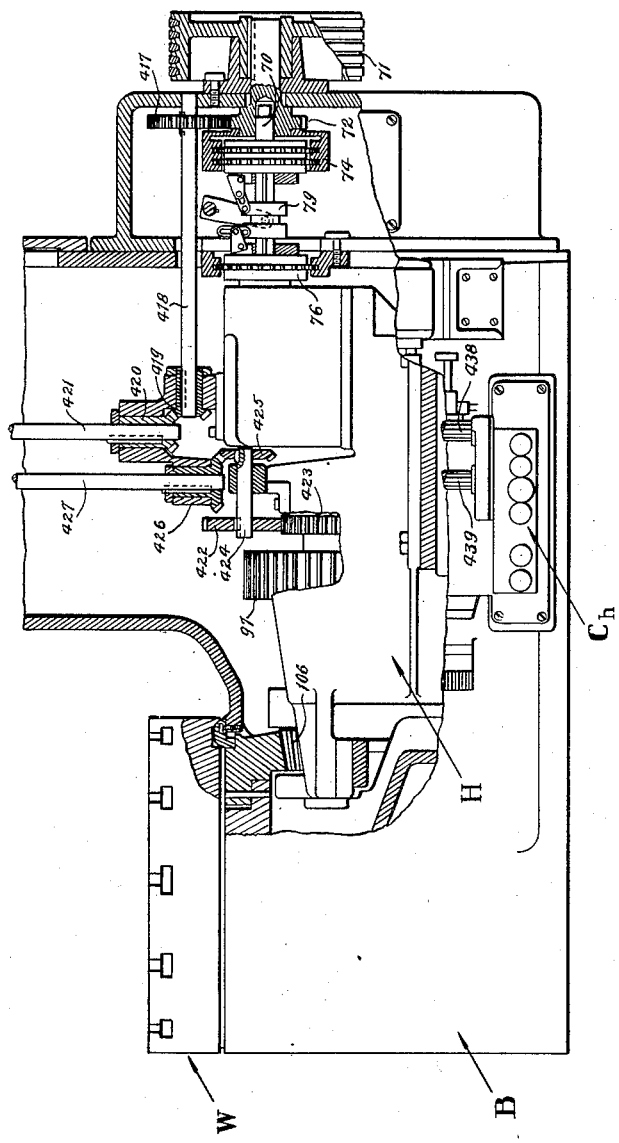
Figure 3 is a partial side elevational view, partly in section and in which certain parts have been removed to show the headstock for the machine tool.

Referring to Figs. 1, 2 and 3, the vertical turret lathe to which the principles of this invention have been applied comprises a base B on which is mounted a work-supporting table W that is adapted to be driven at a plurality of different rates of rotation by a headstock transmission H (Fig. 3). The speeds at which table W is adapted to be rotated during a given cycle of operation are adapted automatically to be rendered effective by a control unit $C_h$, the construction and arrangement of which permit the manual selection of any of the various gear combinations of the headstock H without affecting the automatic setting of the control unit $C_h$.

A cross-rail R is mounted on a standard of base B, and supports a main head Hm including a turret Tm that is adapted to be moved in either direction along intersecting paths at any of a plurality of speeds by the action of a feedworks transmission Fm. The direction, speeds, starting and stopping of linear motion of turret Tm are adapted automatically to be controlled by a unit Cm, which latter is also constructed and arranged to permit manual selection of the directions, speeds, starting and stopping of the linear motion of turret Tm without affecting the setting of the control Cm.

The standard of base B is also adapted to support a side head Hs on which a turret Ts is mounted for movement in either direction at any of a plurality of speeds along intersecting paths by the action of a feedworks Fs. The direction, speeds, starting and stopping of linear motion of turret Ts are also adapted automatically to be controlled by a unit Cs, which latter is also arranged and constructed to permit manual selection of the directions, speeds, starting and stopping of the linear motion of turret Ts without affecting the setting of control Cs. Both controls Cm and Cs include pre-settable means adapted automatically to direct the movement of the turrets Tm and Ts, respectively, to produce any of the functions of which they are capable, and in any pre-determined order.

Power for driving the feedworks Fm and Fs is supplied from the headstock H through shafting that extends upwardly through the standard of base B into a gear-bracket G (Fig. 2) thence outwardly beyond the base B and downwardly through the feedworks Fm and Fs.

The construction and arrangement of the above-described apparatus are such that each control Cm and Cs is under the influence of the other so that either may be rendered effective by the other; an electrical block system is incorporated between the controls Cm and Cs such that either may be stopped while the other continues to function for any pre-determined period, and whereby said stopped control may be automatically re-started at the end of such period; each turret Tm or Ts is adapted to be indexed in a rotary manner from station to station by power means (individual motors) rendered effective either manually or automatically by the action of the control Cm or Cs that is associated with the head to which the turret is attached; the control $C_h$ is adapted to be rendered effective by either of the controls Cm or Cs; and no new function of either of the turrets Tm or Ts can be started until the next preceding function of that turret has been completed.

*Headstock transmission*

Figure 5:
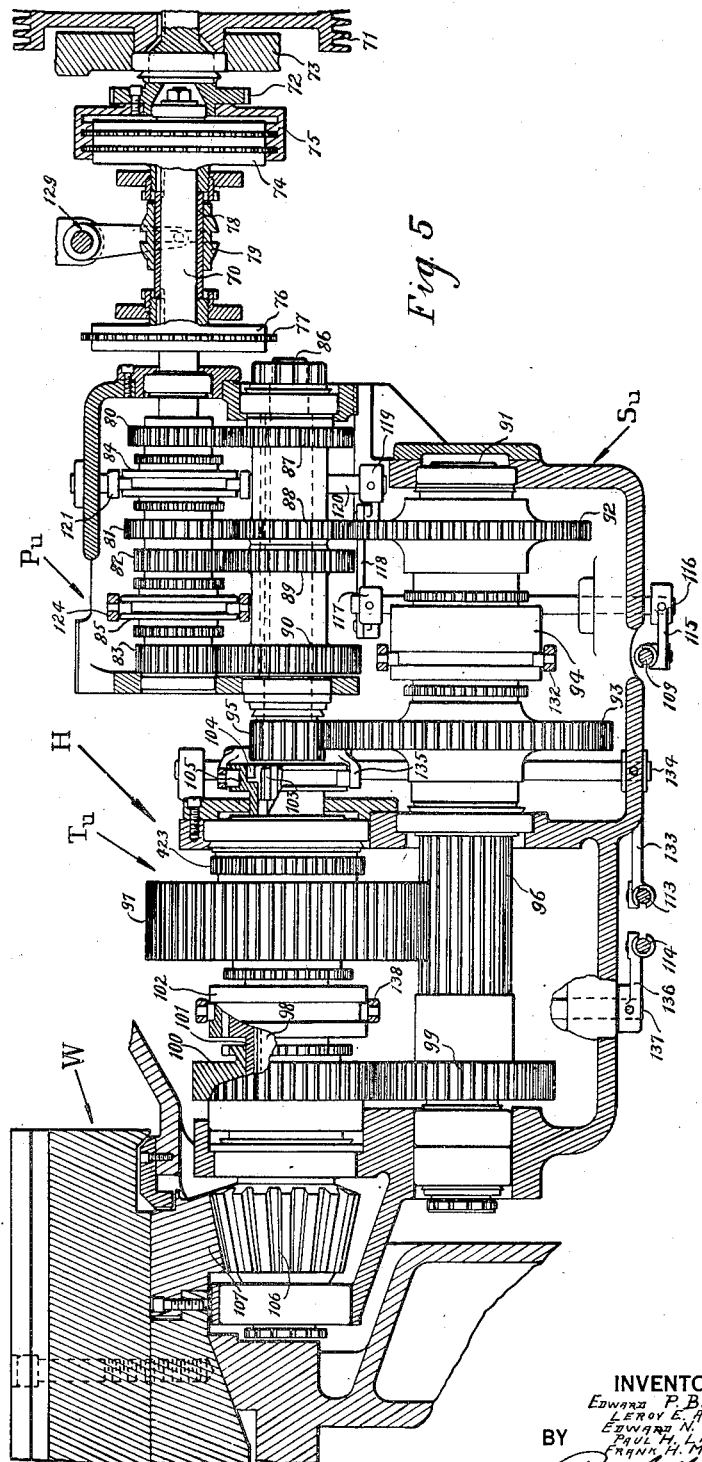
Figure 5 is a sectional elevational view taken substantially along line 5—5 of Fig. 4 and showing the headstock transmission.

Referring to Figs. 4 and 5, the headstock H comprises a shaft 10 (Fig. 5) that is driven from a prime mover (not shown) through a multiple V-groove pulley 71. The pulley 71 is keyed to an extended hub portion of a spur gear 72 that is journaled in a support 73. The hub of gear 72 is recessed to provide a bearing for the end of the driving shaft 70. The driving shaft 70 supports a multiple-disc friction clutch 74, the discs being provided with peripheral teeth. A clutch-driving element 75, having internal teeth adapted to mesh with the teeth on the periphery of the friction discs of clutch 74, is fixed to the gear 72. A friction brake 76 is likewise supported on the drive shaft 70, and comprises a friction disc 77 having peripheral teeth adapted to mesh with internal teeth disposed about an opening in a fixed supporting bracket. Both the clutch 74 and the brake 76 are provided with metal discs splined to the drive shaft 70 on each side of the friction discs. A sleeve 78 surrounds the shaft 70 between the clutch 74 and the brake 76. It supports a slidable grooved spool 79 to which the one ends of toggle connectors 80', 81' (Fig. 4) are secured—the opposite ends of the connectors being fixed to certain of the movable metal discs of the clutch 74 and brake 76. Accordingly, axial movement of spool 79 alternately engages and releases the clutch 74 and brake 76.

Referring to Fig. 5, the transmission includes a primary unit $P_u$, a secondary unit $S_u$ and a tertiary unit $T_u$. These units are designed and constructed so that only parallel shafts are employed throughout the transmission, and certain gears are common to various units.

Four spur gears 80, 81, 82 and 83 are freely journaled on the drive shaft 70 and each gear is provided with positive-action clutch-engaging teeth arranged between gears 80, 81 and 82, 83. Slidable gear-engaging means 84, 85 are keyed to the driving shaft 70 and are located between respective gear sets 80, 81 and 82, 83. Thus, movement of the engaging means 84, 85 to the left or to the right will connect to shaft 70 either gears 81, 83 or gears 80, 82 respectively. A shaft 86 parallel with shaft 70 is provided in the transmission and is adapted to support four gears 87, 88, 89 and 90 arranged in units of two. These last-mentioned gears are keyed to the shaft 86 and each is retained in constant mesh with gears 80, 81, 82 and 83, respectively. The gears 80 to 83 and 87 to 90, both inclusive, comprise the primary unit $P_u$ of the transmission.

An additional parallel shaft 91 is provided in the transmission on which gears 92 and 93 are freely journaled. The gears 92 and 93 are likewise provided with positive-action clutch-engaging teeth on adjacent sides. A positive-action gear-engaging means 94 is keyed to the shaft 91 and is adapted selectively to engage the gears 92 and 93. The gear 92 on shaft 91 is adapted to be maintained in constant mesh with the gear 88 on shaft 86, while the gear 93 on shaft 91 is adapted to be maintained in constant mesh with an additional gear 95 integral with the shaft 86. Gears 88, 92, 93 and 95 comprise the secondary unit $S_u$. By selectively shifting the means 84 and 85, shaft 86 can be driven at four separate and distinct speeds from the drive shaft 70. Furthermore, the shaft 91 may be driven at eight separate and distinct speeds from the drive shaft 70 by selectively shifting the means 84, 85 and 94.

The shaft 91 of the secondary unit is extended and forms one shaft of the tertiary unit $T_u$. The extended portion of shaft 91 is provided with gear teeth 96 adapted to be maintained in constant mesh with a gear 97 freely journaled on a driven shaft 98 forming the other shaft of the tertiary unit $T_u$. Likewise, the extended portion of shaft 91 fixedly supports a gear 99 adapted to be maintained in constant mesh with a gear 100 freely journaled on a sleeve 101, which latter is keyed to the driven shaft 98. Each of the gears 97 and 100 is provided with positive-action engaging means facing each other and disposed between the two gears. A shiftable engaging means 102, splined to sleeve 101, is provided between the last two gears for selectively engaging either. Inasmuch as the shaft 91 may be driven at eight different speeds from the driving shaft 70 by shifting means 84, 85 and 94, it follows that selectively shifting said means and the means 102 of the tertiary unit $P_u$ will impart sixteen separate and distinct speeds of rotation to the driven shaft 98.

The driven shaft 98 is arranged coaxially with the shaft 86. This arrangement makes it possible to produce an additional four speeds of rotation of the driven shaft 98 from the driving shaft 70 by employing a single additional gear. Accordingly, the gear 95, fixed to shaft 86, is made longer than would be necessary for its proper meshing with gear 93. The end of driven shaft 98 adjacent the gear 95 is provided with a spline 103. An internal ring-gear 104 is splined on the end of driven shaft 98 and is adapted selectively to be moved axially by shiftable element 105 to directly connect driven shaft 98 with shaft 86.

The driven shaft 98 is provided with a bevel gear 106 at its end opposite that which contains spline 103. This bevel gear 106 meshes with a bevel ring-gear 107 fixed to the under surface of the table W.

The various gear combinations of the transmission are, therefore, adapted to be established by the operation of the shiftable means 84, 85, 94, 102 and 105. The clutch 74 and the brake 76 are alternately engaged and disengaged by the action of the slidable spool 79. Referring to Fig. 4, a bracket 108 is provided, within which a plurality of rods 109, 110, 111, 112, 113 and 114 is located. These rods are connected to the shiftable means 84, 85, 94, 102, 105 and spool 79 within the headstock through linkages to be described. Accordingly, selective axial shifting of the rods effects shifting of the shiftable means and spool 79 within the headstock.

Referring to Fig. 4, the bracket 108 is bolted to the housing containing the headstock. The series of six parallel rods 109 to 114 extends from within the bracket 108 through the headstock housing and are connected to the various shiftable elements of the headstock as follows:

The rod 109 extends to a point on the far side of the transmission and is connected to a lever 115 that is fixed to a vertically-disposed shaft 116. The upper end of the shaft 116 has a lever 117 fixed to it which forms a bell-crank with the lever 115. Lever 117 is connected to a link 118 which in turn is connected to a lever 119 fixed to the lower end of the shaft 120. The upper end of shaft 120 fixedly supports a yoke 121 that engages the shiftable element 84 so that reciprocable movement of the rod 109 moves the element 84 to the right and left thereby selectively connecting gears 80 and 81 to the driving shaft 70.

Rod 110 extends into the headstock housing and is connected to a lever 122 which latter is fixed to a vertically-disposed shaft 123 extending upwardly to a point adjacent the primary unit $P_u$. The upper end of the shaft 123 rigidly supports a yoke 124 that engages the shiftable element 85.

The rod 111 is pivoted to a lever 125 that is rigidly connected to a vertically-disposed shaft 126. The shaft 126 extends vertically to a point near the top of the headstock. The upper end of shaft 126 fixedly supports a lever 127 that is pivoted to a pull-rod 128 connected to an arm of an oscillatable yoke 129. The yoke 129 engages the spool 79 on the driving shaft 70 between the clutch 74 and brake 76.

Rod 112 extends into the headstock housing where it is connected to a lever 130 fixed to a pivot shaft 131. The pivot shaft 131 has rigidly fixed thereto a yoke 132 which is adapted to engage the shiftable element 94 of the secondary unit.

Rod 113 extends to the far side of the headstock where it is connected to a lever 133 rigidly fixed to a pivot shaft 134. The shaft 134 fixedly supports a yoke 135 that engages the shiftable element 105 for directly connecting the driven shaft 86 to the shaft 98.

The rod 114 is connected to a lever 136 fixed on a pivot shaft 137. The shaft 137 rigidly supports a yoke 138 that engages the shiftable element 102 of the tertiary unit Tu.

From the foregoing it is evident that selective reciprocation of the rods 109, 110, 112, 113, 114 and 111 will set up various gear combinations and effect shifting of clutch 74 and brake 76 within the headstock to provide twenty different rates at which the driven shaft 98 may be rotated.

Headstock control unit

Figure 6:
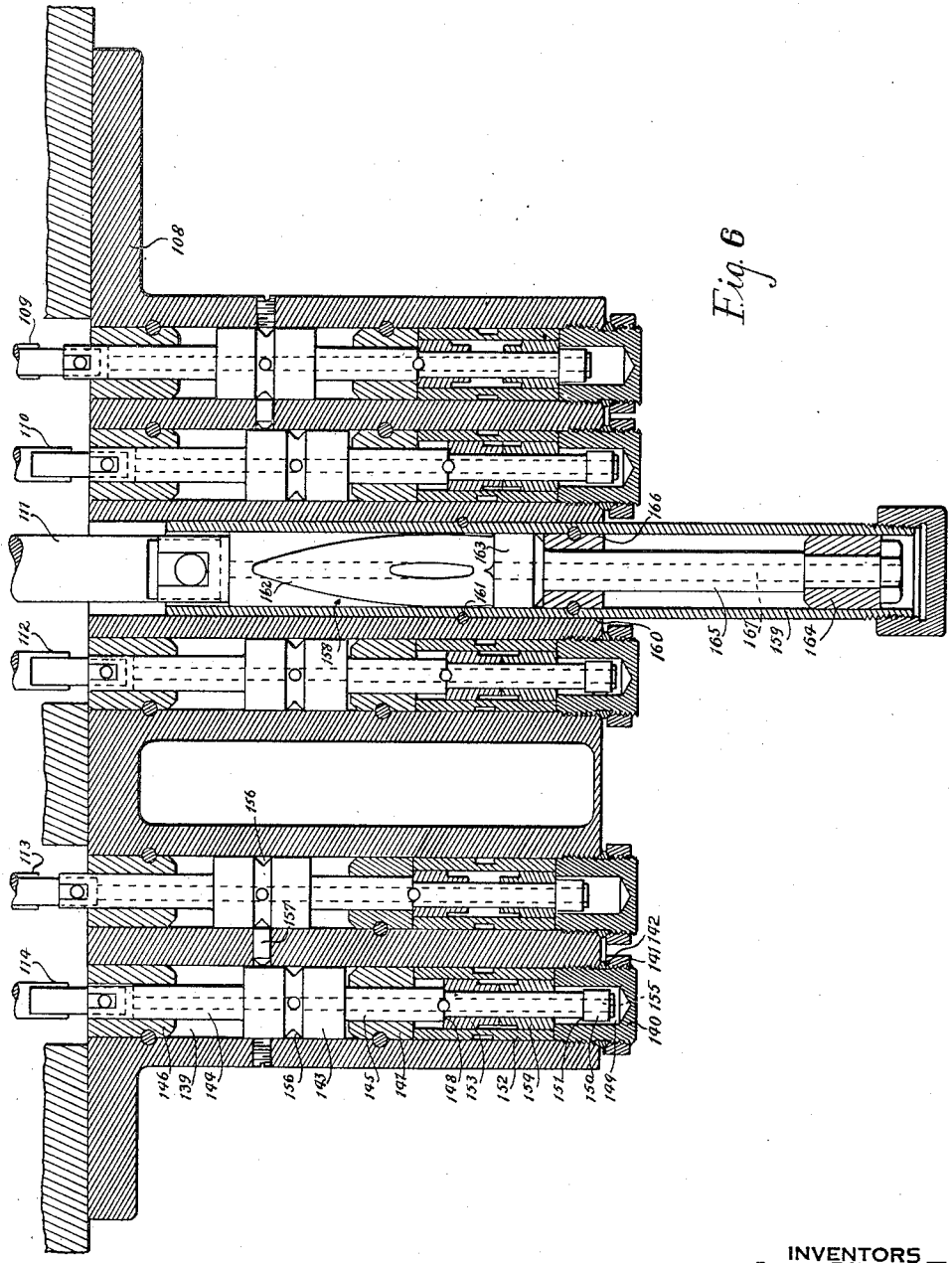
Figure 6 is a sectional plan view taken substantially along line 6—6 of Figs. 2 and 26.

Referring to Fig. 6, the rods 109, 110, 111, 112, 113 and 114 are connected to pistons adapted to be reciprocated within cylinders formed in the bracket 108. Inasmuch as each piston and its associated structure for each of the rods is identical with the exception of that for rod 111, only the piston and associated structure for rods 114 and 111 will be specifically described. The bracket 108 is provided with a cylindrical bore 139 that extends entirely therethrough. The outer end of bore 139 is closed by a plug 140 that is sealed against the leakage of fluid by a nut 141 and packing 142. A piston 143 provided with an integral connecting rod 144 and an integral tail-rod 145 is adapted to be reciprocated within a portion of the bore 139. A closure member 146 is fixedly secured in the inner end of bore 139 and a member 147 is fixed substantially centrally within said bore. Each of the members 146 and 147 is bored to receive the rods 144 and 145, respectively. The rod 114 is pivotally pinned to the connecting rod 144. The tail-rod 145 is reduced in diameter forming a shoulder 148, and the reduced portion extends into a recess 149 within the plug 140. The end of tail-rod 145 is provided with a collar 150 which forms a shoulder 151 with the portion of tail-rod 145 that is of reduced diameter. The closure members 146 and 147 define a chamber within which the piston 143 is adapted to be reciprocated. A spacing sleeve 152 is provided between the plug 140 and the closure member 147, defining a chamber within which split piston members 153 and 154 are adapted to reciprocate. Fluid pressure means, to be described later, is provided for moving piston 143 in either direction, and for constantly supplying fluid under pressure to the chamber in which split piston members 153 and 154 reciprocate. As shown in Fig. 6, piston 143 is in a position outward from its central or neutral position, and shoulder 148 has forced the split piston member 153 outward while the plug 140 engages and fixes the piston member 154. Upon release of the fluid pressure that has moved piston 143 outward, split piston members 153 and 154 will instantly separate and move piston 143 to its neutral position. Upon movement of piston 143 inwardly as viewed in Fig. 6, shoulder 151 moves member 154 inwardly, while the closure member 147 prevents inward movement of the member 153. Upon release of the pressure that moves piston 143 inwardly, the portions 153 and 154 separate thereby neutralizing piston 143. A hole 155 is drilled through the connecting rod 144, piston 143 and tail-rod 145 which opens at its one end into the recess 149 and at its other end into the housing of the headstock. The function of hole 155 is to exhaust into the housing of the headstock any fluid that might leak past the several pistons. The piston 143 for rod 114, as well as the corresponding piston for rod 113 is provided with a centrally-disposed annular groove 156, into which an interference detent 157 is adapted to be forced upon movement of either of the pistons 143 from their central or neutral positions. This interfering device prevents the accidental shifting of either of rods 114 or 113 when the other is out of its neutral position.

Rod 111 which is adapted to shift the clutch 74 and brake 76, is pivotally connected to a piston member 158 adapted to be reciprocated within an elongated cylindrical sleeve 159 fixed within a bore 160 of the bracket 108 by pins 161. The piston member 158 is provided with a cam surface 162 for a purpose to be described later. It also includes plunger portions 163 and 164 rigidly fixed in spaced relation on a connecting rod 165. A separating element 166 is fixed within the bore of sleeve 159 and is drilled to receive the connecting rod 165. The construction and arrangement are such that the plunger portions 163 and 164 are located on opposite sides of the separating member 166—thereby forming in effect a compound piston arrangement. Fluid pressure is adapted to be admitted into the space between the plunger portions 163 and 164 and opposite sides of the separating member 166 for shifting the piston 158 and the rod 111 in opposite directions for effecting alternate engagement and disengagement of the clutch 74 and brake 76. A drilled passage 167 extends axially through the rod 165 and piston 158 for the purpose of exhausting into the headstock housing any fluid that may leak past the plunger portions 163 and 164.

Figure 9:
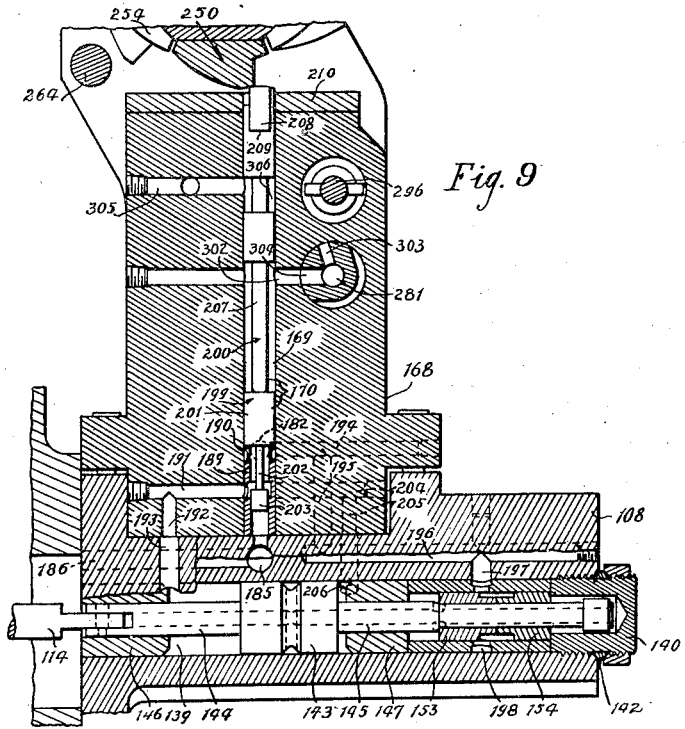

Referring to Figs. 7 and 9, a valve body 168 is mounted on bracket 108 and includes a series of bores 169 extending therethrough, arranged in a common plane and in parallel relation. Valve mechanisms 170, 171, 172, 173, 174, 175, 176, 177 and 178 are adapted to be reciprocated within said bores 169 for controlling the admission of fluid under pressure to, and the exhaust from the cylinders in which the pistons 143 are adapted to reciprocate. The pistons 143 which are connected to the rods 109, 110, 112 and 114 are adapted to be moved to opposite sides of a neutral position for shifting the shiftable elements 84, 85, 94 and 102, respectively, within the headstock. Accordingly, these pistons are provided with substantially identical valve-actuating mechanism 170, 171, 173, 174, 175, 176 and 177, 178. The piston 143 that is connected to the rod 113 is adapted to be moved to only one side of a neutral position and accordingly, only a single valve-actuating mechanism 172 is provided therefor. A valve-actuating mechanism 178 is employed for a purpose to be described later.

The valve body 168 is provided with a bore 180 in which a compound valve-actuating mechanism 181 is adapted to be reciprocated for controlling the admission of fluid under pressure to, and the exhaust from the piston 158 that is adapted to effect shifting of the clutch 74 and brake 76. In order to supply all of the valve-actuating mechanisms with fluid under pressure, a passage 182 is provided that extends throughout the length of the valve body 168 and which intersects all of the bores 169, as well as the bore 180. The specific construction of the valve-actuating mechanism 181 is such that the passage 182 does not extend there-across and in order to by-pass the fluid under pressure around the valve mechanism 181, bore 180 is provided with a counter-sunk portion 183 at its bottom extremity, namely at the dividing line between the valve body 168 and the bracket 108, and a pair of holes 184 is drilled from the counter-sunk portion 183 to the passage 182.

The bracket 108 is additionally provided with a passage 185 that extends throughout its entire length and with which each of the bores 169 communicates. The passage 185 exhausts to the headstock housing through a series of spaced parallel ducts 186. The opposite ends of passage 185 are provided with plugs 187, as are all of the openings in the valve body 168 and bracket 108 that are formed by drills and which require a sealing means. From the foregoing, it is apparent that fluid passing through an inlet 188 of the valve body 168 is distributed to all of the valve-actuating mechanisms within the valve body.

Inasmuch as the construction and operation of the valve mechanisms 170, 171, 173, 174, 175, 176 and 177, 178 are identical, only the construction and operation of the valve mechanisms 170, 171 will be specifically described.

Referring to Fig. 9, the bore 169 is provided at its lower extremity with a tubular insert 189 having a recessed and bored portion 190 in registry with the fluid inlet passage 182. A passage 191 is provided in the body 168 which communicates with a drilled hole in the side of the tubular element 189. Passage 191 communicates with passages 192 and 193 which latter opens into the bore 139 on the left side of the piston 143 as viewed in Fig. 9. Another passage 194 in the valve body 168 is in registry with the inlet 182 between the adjacent bores 169 in which valve mechanisms 170, 171 reciprocate. Passage 194 communicates with passages 195, 196, 197 and delivers fluid under pressure to the annular space 198 formed between the split piston members 153 and 154.

The valve-actuating mechanism 170 comprises two parts, a lower part 199 and an upper part 200. The lower part 199 includes a plunger portion 201 that is adapted to be reciprocated within the bore 169 and to seat on top of the upper edge 190 of the tubular member 189. Member 199 also includes a downwardly extending valve stem 202 on the lower end of which is provided a valve member 203. In the position of the lower portion 199 as shown in Fig. 9, wherein it is seated on the top of the upper edge of the portion 190 of the tubular member 189, it is evident that fluid under pressure enters the center of the tubular member 189 from the passage 182, passes through the passages 191, 192 and 193 into the bore 139 on the left-hand side of piston 143 thereby forcing said piston to the right. Likewise, fluid pressure is admitted from passage 182 through the passages 194, 195, 196 and 197 to the annular space 198 formed between the split piston members 153 and 154. Even though this pressure is the same as that which acts on piston 143, the differential area between the piston 143 and the piston members 154 and 153 is such that the piston 143 moves to the right. Upon release of the force which holds the portion 199 in its lower position, the pressure from inlet 182 acts on the area of lower part 199 adjacent the portion 190 of tubular member 189, which area is greater than that of the valve member 203 against which said pressure also acts. Accordingly, the lower portion 199 of the valve mechanism 170 is raised to an upper position, cutting off the passage of fluid from inlet 182 to passage 191 and permitting the fluid trapped within the bore 139 on the left side of piston 143 to by-pass the valve 203 to the exhaust passage 185, thence the exhaust passes through one of the ducts 186 to the interior of the headstock housing. Immediately upon cutting off the inlet pressure from passage 182 to the passage 191, split piston members 153 and 154 are separated, as previously explained, whereupon piston 143 is moved to its neutral position.

Fluid under pressure is admitted in an identical manner to the right side of piston 143 in the space formed between it and the left side of closure member 147 by the valve-actuating mechanism 171 (Fig. 7) as follows: A passage 204 (Fig. 9) is provided in the valve body 168 which communicates with a tubular member within the passage 169 that receives valve-actuating mechanism 171 in the same manner that passage 191 communicates with the interior of the tubular member 189. Passage 204 communicates with passages 205 and 206 which latter delivers fluid into the space formed between the right and left-hand faces of the piston 143 and the closure member 147, respectively. From the foregoing it is evident that movement of the valve-actuating mechanism 171 to its lower position permits the fluid under pressure from passage 182 to flow through the passages 204, 205 and 206 into the bore 139 on the right side of piston 143 thereby forcing piston 143 to the left. Upon release of the force holding the actuating mechanism 171 in its lower position, its lower portion moves upwardly and exhausts the fluid trapped on the right side of piston 143 to the passages 185 and 186. When this occurs, of course, the pressure acting on the split piston members 153 and 154 instantly separates them thereby effecting movement of piston 143 to its neutral position.

The upper portion 200 of the valve-actuating mechanism 170 includes a stem portion 207 and an abutment portion 208 which latter is adapted to be engaged by means to be described later for forcing the portion 207 downwardly. The abutment portion 208 includes a shoulder 209 that is adapted to engage shoulders formed between a series of narrow removable plates 210 that form the top of valve body 168. The upper portion of the valve-actuating mechanism 171 is identical with that of mechanism 170. From the foregoing it is apparent that the selective depression of the valve-actuating mechanisms 170 and 171 will cause the piston 143 to be moved to either side of its neutral position thereby effecting the shifting of shiftable element 102 of the headstock. In an identical manner, the selective depression of the valve-actuating mechanisms 173, 174, 175, 176 and 177, 178 effects the shifting of rods 112, 110 and 109, respectively, to thereby shift the shiftable elements 94, 85 and 84 of the headstock.

Figure 11:
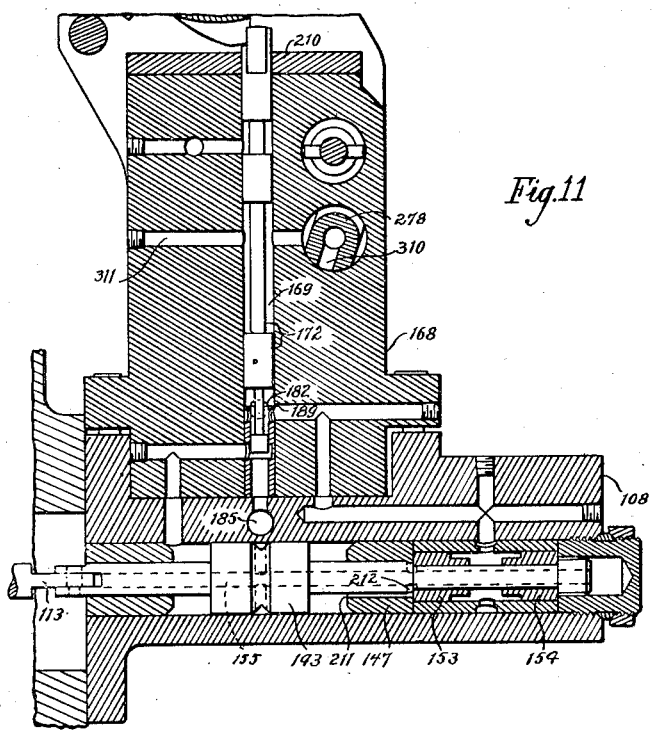

Referring to Fig. 11, the valve mechanism 172 is identical with the valve mechanism 170 (Fig. 9). Movement of the mechanism 172 to its lower position admits fluid from the inlet 182 to the left side of the piston, 143 that is connected to the rod 113, thereby forcing said piston to the right to shift element 105 of the headstock to engage the direct drive between driven shaft 98 and shaft 86. Upon release of the means that moves the valve mechanism 172 to its lower position, pressure from the inlet 182 will effect the upward movement of the valve 172 in the same manner as its moves the valve mechanism 170 to its upper position. In its upper position, valve 172 exhausts the fluid trapped on the left side of piston 143 to the passage 185, while at the same time, pressure from the inlet 182 that is continuously acting upon the split piston members 153 and 154 of the assembly disclosed in Fig. 11, moves the piston 143 to its neutral position. The closure member 147 in this instance is provided with a groove 211 in communication with a radial passage 212 that leads to the exhaust passage 155 extending through the piston 143 and its connecting and tail-rods. This construction permits the exhausting of any fluid that may leak past the piston 143 and become trapped on the right side thereof.

Figure 10:
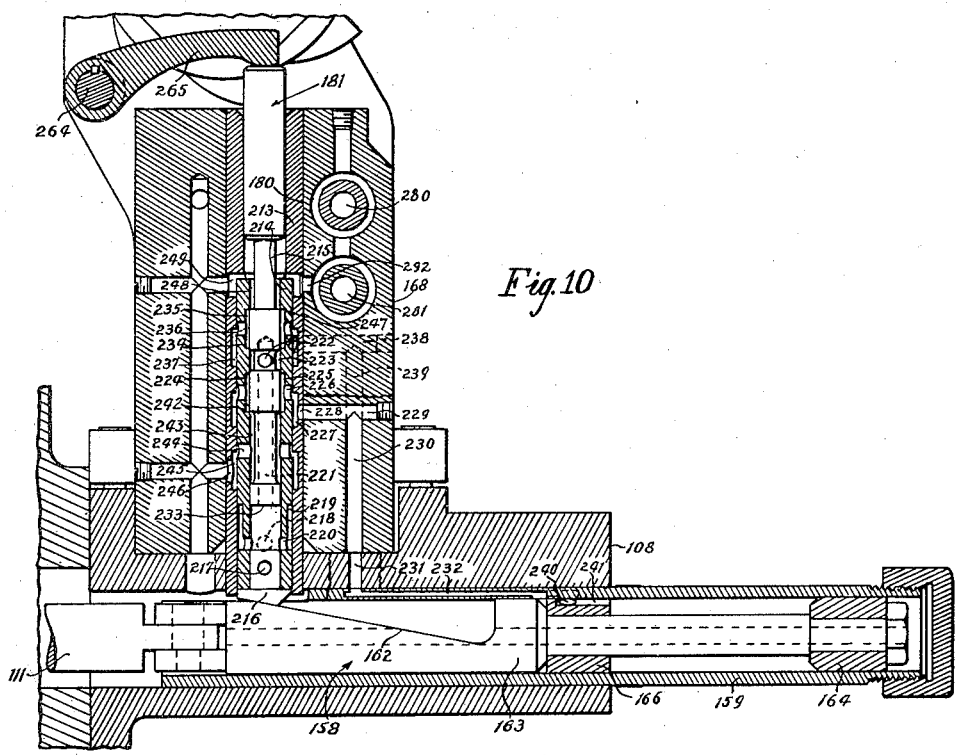

Referring to Fig. 10, the valve mechanism 181 within the bore 180 of the valve body 168 is designed for dual functioning, namely, for manual as well as automatic operation. Although the specific construction of the valve mechanism 181 is essentially for manual manipulation of the apparatus, it also functions automatically. Even though its significance relative to manual manipulation of the apparatus will not appear until later, its specific construction will now be described. Essentially, the valve mechanism 181 comprises a sleeve 213 fixed within the bore 180, a vertically-reciprocable sleeve 214 mounted within the sleeve 213, and a vertically-reciprocable valve stem 215 mounted within sleeve 214.

A cam follower 216, adapted to cooperate with the cam surface 162 of the piston 158, is provided with a plug extending up into the vertically-reciprocable sleeve 214 and fixed to said sleeve by a pin 217.

Referring to Fig. 7, the counter-sunk portion 183 of the bore 180 that communicates with passages 184 and inlet passage 182 is also adapted to communicate with radial passages 218 that extend through the fixed sleeve 213.

Referring again to Fig. 10, radial passages 218 communicate with an annular chamber 219 formed between the sleeves 213 and 214. Radial passages 220 that extend through the sleeve 214 provide communication between the interior of sleeve 213 and said annular chamber 219. The vertically-reciprocable valve stem 215 is provided with an axial bore 221 extending partially therethrough, and a port 222 near its upper end, at the dead end of said bore. The port 222 communicates with a chamber 223 formed between the slidable sleeve 214 and the stem 215. The construction and arrangement are such that slight downward movement of the valve stem 215 will effect separation of a contact point 224 between the valve stem 215 and the sleeve 214. Such separation provides communication between the annular chamber 223 and another annular chamber 225 formed between the sleeve 214 and the stem 215. The sleeve 214 is provided with radial bores 226 that communicate with an annular chamber 227 formed between the slidable sleeve 214 and the fixed sleeve 213. A radial bore 228 is provided in the fixed sleeve 213 in alignment with a passage 229 formed in the valve body 168. A vertically-disposed passage 230, within the valve body 168, is in communication with the passage 229 and also with a passage 231 formed in the bracket 108. The passage 231 in bracket 108 communicates with a passage 232 that opens into the space between the separating element 166 within the sleeve 159 and the plunger portion 163 of piston 158. Accordingly, the downward movement of the valve stem 215 permits the fluid under pressure from port 220 to pass upwardly through passage 221, through port 222 into chambers 223, 225, through bore 226 into chamber 227, thence through port 228 into passages 229, 230, 231 and 232 into sleeve 159 on the right-hand end of piston 158 causing the same to be moved to the left. Slight leftward movement of piston 158 tends to move the cam surface 162 away from the cam follower 216. However, the fluid under pressure entering the ports 220 of the slidable sleeve 214 acts upon the upper face of the plug connected to cam follower 216 and causes downward movement of the cam follower and sleeve 214. Slight downward movement of the sleeve 214 causes re-engagement of the sleeve 214 and stem 215 at point 224, thereby cutting off the supply of fluid under pressure from chamber 223 to chamber 225, whereupon the assembly assumes the position shown in Fig. 10. Continued downward movement of the valve stem 215 again effects separation of the contacting point 224, re-establishing communication between the chambers 223 and 225 whereupon continued leftward movement of the piston 158 occurs. However, sleeve 214 is again lowered by virtue of cam surface 162 moving to the left causing re-engagement of the sleeve 214 and stem 215 at point 224 thereby stopping the leftward movement of piston 158. This intermittent supplying of fluid under pressure to chamber 225 effects an incremental movement of piston 158 until the shiftable rod 111 is moved to its maximum leftward position. However, as will appear later on, such action only occurs during the manual operation of the valve mechanism 181 since during automatic operation, the valve stem 215 is moved instantly to its lowest position causing instant and complete leftward movement of the piston 158.

Upon release of the force that has moved stem 215 to its lowest position, the fluid pressure entering sleeve 214 through ports 220 acts upon an annular surface 233 at the bottom of the stem 215 causing the same to move upwardly. Slight upward movement of the valve stem 215 effects the separation of the sleeve 214 and stem 215 at a point 234, whereupon chamber 223 communicates with an annular chamber 235 formed between the sleeve 214 and the stem 215. Radial ports 236 extend through the walls of sleeve 214, and communicate with an annular chamber 237 formed between the slidable sleeve 214 and fixed sleeve 213. A passage 238 formed in the valve body 168 communicates with the chamber 237 and also with a vertically-disposed passage 239 that extends downwardly in parallel but spaced relation with respect to the passage 230. The vertically-disposed passage 239 communicates with a passage 240 in the bracket 108 which latter passage communicates with a groove 241 in the separating member 166 within sleeve 159. Groove 241 in turn communicates with the space formed between the right face of separating member 166 and the left face of plunger portion 164. Accordingly, upon slight upward movement of stem 215, fluid under pressure is adapted to pass from chamber 223 to chamber 235, port 236, chamber 237, passages 238, 239, 240, 241 and to act upon the left face of plunger member 164 causing piston 158 and rod 111 to move to the right. Slight movement of piston 158 to the right causes cam surface 162 to act against follower 216 forcing vertically-reciprocable sleeve 214 upwardly whereupon the sleeve 214 and stem 215 re-engage at point 234 thereby cutting off the supply of fluid under pressure to chamber 235 and stopping the rightward movement of piston 158. The upward movement of stem 215 may be continuous or controlled manually, and the sleeve 214 follows it upwardly until both slidable members reach their maximum upward position where they remain until further downward movement of the stem 215. At all times, the slidable members 214 and 215 tend to assume the position shown in Fig. 10. Slight upward movement of valve stem 215 not only separates the sleeve 214 and stem 215 at the contact point 234 to admit fluid under pressure to the left face of plunger portion 164, but it also separates a contact point 242 between said stem 215 and sleeve 214, whereupon chamber 225 communicates with a chamber 243 formed between the stem 215 and sleeve 214. Radial passages 244 are provided in the sleeve 214 which communicate with a chamber 245 formed between the sleeves 214 and 213. A radial passage 246 in sleeve 213 opens into the exhaust line leading to the headstock housing. Accordingly, as the piston 158 moves to the right, fluid trapped between it and the left side of partition 166 exhausts through passages 232, 231, 230, 229, through port 228 into chamber 227, through port 226 into chamber 225, thence into chamber 243, through port 244, into chamber 245, through port 246 to the headstock housing. Additionally, as the stem 215 moves downwardly, it not only causes separation of sleeve 214 and stem 215 at contact point 224, but also causes separation of a contact point 247 between said stem and sleeve. Accordingly, upon downward movement of stem 215, any fluid trapped between the right and left faces of members 164 and 166, respectively, will be exhausted through passages 241, 240, 239, 238 into chamber 237, through port 236 to chamber 235, thence into a chamber 248 that opens into a chamber 249 which latter communicates with the exhaust that leads to the headstock housing.

From the foregoing description, it is evident that downward movement of the stem 215 causes piston 158 to move to the left thereby disengaging the clutch 74 and engaging the brake 76, and upon release of the force moving stem 215 downwardly, the same rises automatically thereby causing piston 158 to move to the right which disengages brake 76 and engages clutch 74.

The selective depression of valve mechanisms 170, 171, 172, 173, 174, 175, 176, 177 and 178 is effected by the step-by-step movement of a program drum 250 (Fig. 7) that is adapted to be indexed about a horizontal axis. The drum 250 is positioned directly above the valve body 168 such that its axial center line is in the same plane as that which contains the valve mechanisms 170 to 178. The program drum 250 comprises a polygonally-faced member in which a groove 251 is formed to provide a space for the means that actuates valve mechanism 181, to be described later. The drum is provided with trunnions journaled in bearings 252 and 253 formed on brackets mounted on the body 168. Each of the faces of the polygonally-shaped member is provided with dove-tail grooves for receiving replaceable plates 254 that are adapted to support shoes 255 for engaging the abutment portions 208 at the upper ends of the various valve-actuating mechanisms. The plates 254 are fixed in place on the program drum 250 by screws 256. The shoes 255 on plates 254 on the right side of the groove 251 (Fig. 7) are adapted to control the valve-actuating mechanisms 175, 176 and 177, 178, which in turn control the admission of fluid pressure to, and exhaust from the opposite sides of the pistons 143 that are connected to rods 109 and 110, the movement of which controls the shiftable elements 84 and 85 of the primary unit $P_u$ of the headstock. The shoes 255 on plates 254 on the left side of the groove 251 are adapted to control the shifting of shiftable elements for the secondary unit $S_u$, tertiary unit $T_u$ and the direct drive. Various combinations of the plates 254 may readily be assembled to provide a definite program, and upon the successive indexing of the drum 250, a succession of different rates of rotation of the driven shaft 98 of the headstock may be effected.

Prior to the changing of any gear combination within the headstock, it is necessary to disengage the clutch 74 and to engage the brake 76 in order to stop the transmission; and upon effecting a new gear combination within the transmission, it is necessary to disengage the brake 76 and to re-engage the clutch 74.

Referring to Figs. 4, 7 and 12 and particularly Fig. 12, a Geneva stop wheel 257 is provided with as many radial slots 258 as there are sides to the polygonally-shaped drum 250. This wheel 257 is fixed to the end of one of the trunnions of the program drum 250 by a washer 259 and a lock bolt 260. An indexing disc 261, provided with a roll 262 adapted to cooperate with the radial grooves 258, is mounted on a shaft 263 parallel with, but spaced from the trunnions of the program drum 250. The disc 261 is adapted to be rotated in a clockwise direction and is provided with means forming a time-delay actuating mechanism for controlling the admission of fluid under pressure to the piston 158 for shifting the clutch 74 and brake 76. A shaft 264 mounted in brackets at the back of the valve body 168 is adapted to extend throughout substantially the entire length thereof (Fig. 4). The shaft 264 fixedly supports a rocker arm 265 within the groove 251 (Fig. 7) and in alignment with the valve-actuating mechanism 181. Referring to Fig. 12, the end of the shaft 264 rigidly supports an arm 266 having a follower 267 in the plane containing the disc 261. The follower 267 is adapted to ride on the periphery of disc 261. The fluid pressure continuously urging the valve stem 215 of the valve mechanism 181 upwardly, forces the rocker arm 265 upwardly and consequently the arm 266 towards the disc 261 such that the roller 267 is maintained in constant engagement with the periphery of said disc 261. A recessed portion 268 is formed in the periphery of the disc 261 within which follower 267 normally rests. The construction and arrangement are such that as the disc 261 initially moves in a clockwise direction from the position shown in Fig. 12, the shaft 264 is turned in a counter-clockwise direction thereby depressing the valve stem 215 of the valve mechanism 181. The roll 262, however, does not engage the next succeeding radial slot 258 of the Geneva stop wheel 257 for a substantially long time interval after the depression of valve mechanism 181. Accordingly, during this substantial time interval before the indexing of drum 250, the main clutch 74 is disengaged and the brake 76 engaged to stop the headstock. As the disc 261 continues to rotate, roll 262 engages a slot 258 in the Geneva wheel 257 and indexes the program drum one step. Upon the completion of the indexing movement of the program drum 250, the recess 268 returns to cooperative position with the roll 267, thereby permitting the fluid under pressure to raise the valve means 181 effecting disengagement of the brake 76 and reengagement of the clutch 74.

Referring to Figs. 1 and 4, power is supplied to the disc 261 through a motor 269 and a gear reduction unit. The circuit of the motor 269 includes a switch that is adapted automatically to be actuated by means to be described later, in parallel with a holding switch 270 (Fig. 12). Upon the automatic closing of the first named switch, the motor 269 begins to rotate and to drive the disc 261 in a clockwise direction. A cam disc 270' fixed to rotate with disc 261 is provided with a notch 271 into which the one end of a lever 272 is resiliently urged. Upon the beginning of rotation of the disc 261, the lever 272 is moved in a counter-clockwise direction closing holding switch 270 and maintaining it closed after the release of the automatically-operated switch. Upon the completion of a single revolution of the disc 261, when roll 267 is within the recess 268 again, lever 272 cooperates with groove 271 thereby effecting the opening of holding switch 270 and effecting stopping of motor 269.

In order to prevent vibrations from changing the position of the program drum 250 between successive indexing movements, a lever 273 (Figs. 7 and 8) is journaled on the shaft 264. A spring pressed member 274 mounted in the valve body 168 is adapted resiliently to force the lever 273 upwardly into engagement with the sides of the polygonally-shaped drum 250.

Referring to Figs. 4, 5, 6, 7 and 9, the program drum 250 is shown in position such that valve mechanisms 170, 173 and 175 are depressed to their low positions. With valve mechanism 170 in its low position, fluid is admitted under pressure to the left side of the piston 143 (Fig. 9) that is connected to rod 114 thereby shifting element 102 (Figs. 4 and 5) of the headstock to the right connecting gear 97 to driven shaft 98. Valve mechanism 173 in its low position admits fluid under pressure to the left side of the piston 143 that is connected to the rod 112 thereby shifting element 94 of the secondary unit $S_u$ to the left (Fig. 5) connecting gear 93 to shaft 91. Valve mechanism 175 in its low position admits fluid under pressure to the left side of the piston 143 connected to the rod 110 thereby shifting element 85 of the headstock to the left connecting gear 83 to shaft 70. Referring to Fig. 5, the gear train that is established in the transmission by the control mechanism in the position shown in Fig. 7 is such that power is transmitted from shaft 70 to gear 83, gear 90, thence through gear 95 to gear 93, and finally from gear 96 to gear 97. Upon indexing the program drum 250, the shoes 255 are so located that valve mechanism 171 is moved to its low position while valve 170 is permitted to move to its upper position; valve mechanism 174 is lowered while valve mechanism 173 is permitted to rise; and valve mechanism 176 is lowered while valve mechanism 175 is elevated. Accordingly, upon indexing drum 250 to its next succeeding position, fluid under pressure will be admitted to the right side of the piston 143 connected to the rod 114 whereupon shiftable element 102 of the transmission is moved to the left (Fig. 5) connecting gear 100 to shaft 98; fluid pressure is admitted to the right side of the piston 143 connected to the rod 112 whereupon the shiftable element 94 of the secondary unit $S_u$ is shifted to the right connecting gear 92 to shaft 91; and fluid pressure is admitted to the right side of the piston 143 connected to the rod 110 whereupon shiftable element 85 is moved to the right (Fig. 4) connecting gear 82 to shaft 70. Power will then be transmitted from the shaft 70 to the gear 82, gear 89, thence through the gears 88 and 92, and finally through the gears 99 and 100. From the foregoing description, it is evident that the transmission includes means (84, 85, 94, 102, 105 and associated structure) adapted to be actuated for establishing various operative gear combinations within the headstock, and the control (including drum 250, Geneva stop 257, disc 261 and attending apparatus) is adapted to perform successive cycles of operation (neutralizing clutch 74, applying brake 76, indexing drum 250 at a time substantially after brake 76 has been applied, disengaging brake 76 and engaging clutch 74), in each cycle of which any of the means for establishing operative gear combinations is adapted to be actuated.

*Manually-operable mechanism for controlling headstock*

The present invention contemplates the provision of mechanism for manually selecting various gear combinations within the headstock without disturbing the setting of the program drum 250. In other words, the invention includes means associated with the program drum 250 for rendering effective manually-operable means for shifting the shiftable elements within the headstock, which means is adapted to become effective at the end of a predetermined program of operation of the headstock.

Referring to Fig. 13, the valve body 168 is provided with bores 275 and 276 arranged in parallel relation, extending throughout the entire length thereof and adapted to receive valve plugs 277 and 278. The valve plugs 277 and 278 comprise elongated cylindrical members having bosses 279 formed thereon through which ports extend from the exterior thereof to passages 280, 281 drilled axially of said plugs 277 and 278, respectively. The outer surfaces of the bosses 279 are machined to accurately fit the bores 275 and 276, and said bosses are arranged in such a manner that they cooperate with means to be described later for controlling the admission of fluid under pressure to, and for exhausting the fluid under pressure from the operative sides of the pistons 143 for effecting shifting of the shiftable elements within the headstock. Closure members 282 and 283 are fixed to the sides of the valve body 168 and bearings are formed therein for receiving and journaling parts of the plug valves 277 and 278. Each of the plug valves 277 and 278 is provided with flanged portions 284 that are axially spaced and of a diameter accurately fitting the bores 275 and 276.

Recesses 285 are formed between the spaced flanges 284 in alignment with a passage 286 within the wall separating the bores 275 and 276. Radial passages 287 extend from the recesses 285 to the axial bores 280, 281 of the plug valves 277 and 278. An inlet passage 288 is provided within the valve body 168 which communicates with the recesses 285 as well as the valve-actuating mechanism 179 (Fig. 8) that in turn controls the admission of fluid under pressure to the plug valves 277 and 278. The spaces between the various bosses 279 on the exterior of the plug valves 277 and 278 form exhaust chambers with the bores 275, 276. Communication between the bores 275, 276 for said exhaust chambers on the right-hand side of flanges 284 is provided by the passage 289. A passage 290 is provided between the bosses 279 on the left-hand side of flanges 284 to exhaust any leakage past said flanges in bore 275. A passage 291 (Fig. 16) is provided within the valve body 168 that leads to the housing of the headstock, to which the exhaust fluid from the left-hand side of flanges 284 in bores 275, 276 is returned. A passage 292 is provided in the body 168 for exhausting the fluid from the right-hand side of flanges 284 in bores 275, 276 into chamber 249 (Figs. 10 and 21) thence to the housing of the headstock.

From an inspection of Fig. 13, it is evident that substantially perfect alignment between the bore 275 and that for the plug valve 277 in closure 282 must be provided since the bosses 279 and the flanges 284 on the plug valve 277 must accurately fit said bore 275. Perfect alignment of the axes of the bore in closure 282 and the bore 275 is provided, and the arrangement includes forming a bearing 293 for the rear end of the plug valve 277 without regard to precise alignment between it and the bore 275 and that in closure 282. The end of plug valve 277 opposite that journaled in closure 282 is provided with a pin-receiving slot 294, and a trunnion within bearing 293 is provided with a similar slot 295. A shaft 296 extends between the trunnion within bearing 293 and the end of plug valve 277 containing pin slot 294. Shaft 296 is provided with pins adapted to engage the respective slots 294 and 295, thereby producing a construction that will permit slight misalignment of the axis of bearing 293 with the axes of the bore in closure 282 and bore 275. A similar construction is employed in connection with the plug valve 278 as clearly shown in Fig. 13.

Handwheels 297 and 298 are connected to the extensions of the plug valves 277 and 278 that are journaled in the bores within closure 282. These handwheels bear numbers 1 to 4 and letters A to E (Fig. 12). The numerals 1 to 4 represent the four rotative positions plug valve 277 is adapted to assume, while the letters A to E represent the five rotative positions plug valve 278 is adapted to assume. Accordingly, rotation of the handwheels 297 and 298 will effect rotary movement of the plug valves 277 and 278 for controlling the admission of fluid under pressure to the various pistons 143 in a manner to be described later.

Figure 8:
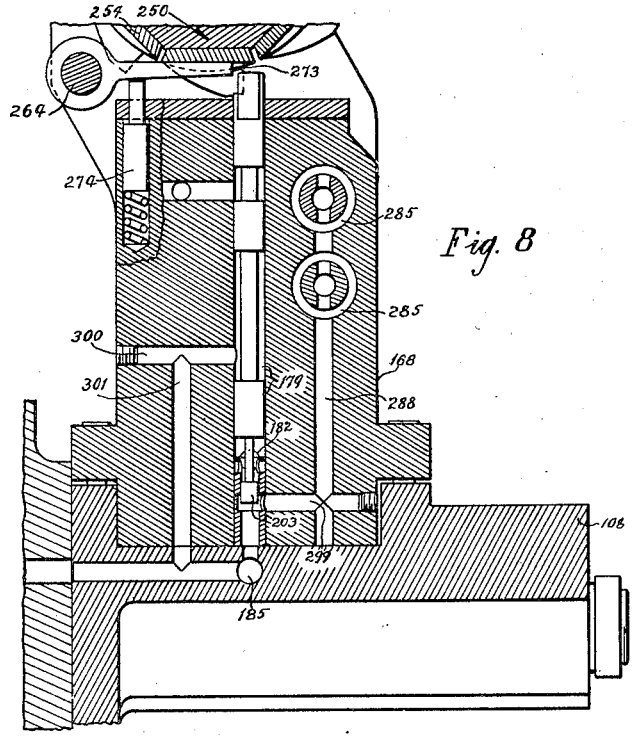

Referring to Figs. 7 and 8, the valve mechanism 179 is adapted to control the admission of fluid under pressure to the plug valves 277 and 278 (Fig. 13). Referring particularly to Fig. 8, the valve mechanism 179 is identical with the valve mechanism 170 (Fig. 9). Movement of the mechanism 179 to its low position will permit fluid under pressure from the inlet 182 to flow past the valve head 203 into a passage 299 that communicates with the vertically-disposed passage 288 leading to the recesses 285 between the flanges 284 of the plug valves 277 and 278. Upon release of the force which holds the valve mechanism 179 in its low position, it will be caused to move upwardly in the same manner that valve mechanism 170 is caused to move upwardly upon release of the force which holds it in its low position, and the fluid within the cylinders of the pistons 143 will be exhausted into the exhaust passage 185 via passages 288 and 289. In order to exhaust any fluid that may leak past the lower portion of valve mechanism 179, the valve body 168 is provided with a passage 300 in communication with a vertically-disposed passage 301 that leads to the exhaust passage 185.

Referring to Fig. 7, it is evident that the program drum 250 must be indexed four times before the shoe 255 in alignment with valve mechanism 179 cooperates therewith to move it to its low position. During the four successive indexes of the program drum separate and distinct gear combinations will be set up within the transmission. For purposes of clarity, the handwheels 297 and 298 (Fig. 13) have been set to establish the same gear setting that is effected by the position of the program drum 250 in Fig. 7, and, accordingly, upon the fourth successive index of the drum 250 from the position in which it is shown in Fig. 7, valve mechanism 179 will be moved to its low position and a gear combination identical with that effected by virtue of the downward movement of the valve mechanisms 170, 173 and 175 will be established. Fig. 13 discloses the apparatus in a position where the valve mechanism 179 is in its low position with the handwheels 297, 298 set as above described.

Referring to Fig. 9, the valve mechanisms 170, etc., were previously described as comprising an upper portion 200 and a lower portion 199. These portions are independently movable such that the lower portion 199 can be moved downwardly against the seat on the upper edge of tubular member 188 independently of the movement or the upper member 200. The upper member 200 is prevented from moving upwardly beyond a fixed point by virtue of the shoulder 209 formed between the abutment portion 208 and the stem portion 207, which shoulder engages the plates 210.

Referring to Figs. 9 and 14, the valve body 168 is provided with a passage 302 that is adapted to communicate with the passage 169 within which the valve mechanism 170 is adapted to reciprocate. Passage 302 also communicates with the bore 276 within which plug valve 278 is adapted to be oscillated. The boss 279 (Fig. 14) is provided with two radial ports 303 and 304 that are adapted to be moved into alignment with the passage 302. When this occurs, fluid under pressure from the passage 281 is delivered into the bore 169 between the upper and lower portions 200 and 199 of the valve mechanism 170, thereby forcing the lower portion 199 downwardly until it seats on the upper edge of the tubular member 189 and permitting the pressure from inlet 182 to be admitted to the left side of the piston 143 connected with the rod 114, thereby effecting the shifting of element 102 to engage gear 97 to the driven shaft 99 of the transmission. An exhaust passage 305 is provided for each of the bores 169 that receive fluid under pressure for manual manipulation. The passage 305 communicates with an annular chamber 306 formed between the stem 207 and the bore 169 for exhausting any fluid that might leak past the upper portion 200 of the valve mechanism 170 and thereby preventing such fluid from leaking out on top of the plates 210.

Referring to Fig. 15, the boss 279 shown therein is provided with two radial passages 307 and 308 which upon continued counter-clockwise movement of the plug valve 278 will come into line with a passage 309 parallel with, but spaced from passage 302. Passage 309 communicates with the bore 169 within which valve mechanism 171 is adapted to be reciprocated. When passages 307, 308 become aligned with passage 309, fluid under pressure from passage 281 is admitted to the right-hand side of the piston 143 connected with the shiftable rod 114 thereby to effect engagement of shiftable element 102 of the headstock with gear 100 thereof. Accordingly, four positions of rotation of the plug valve 278 will provide the selective shifting of the shiftable element 102 to effect its engagement with gears 97 and 100.

Referring to Figs. 11 and 17, another boss 279 in plug valve 278 is provided with a single radial port 310 that is adapted to be turned into alignment with a passage 311 communicating with the bore 169 within which valve mechanism 172 is adapted to be reciprocated. When the radial port 310 is in alignment with the passage 311, fluid under pressure is adapted to move the lower portion of valve mechanism 172 downwardly until it seats upon the tubular member 189 thereby admitting fluid under pressure to the left side of the piston 143 connected to the rod 113 and effecting the movement of element 105 to engage the direct drive between shaft 86 and the driven shaft 88.

Referring to Fig. 19, the plug valve 278 is provided with two additional bosses 279 in which radial ports 312 and 313 are located. The ports 312 and 313 are adapted to cooperate with a passage 314 that communicates with the bore 169 within which the valve mechanism 173 is adapted to be reciprocated. In the position shown in Fig. 19, passage 312 is in alignment with the passage 314 thereby admitting fluid under pressure from the axial bore 281 to the valve mechanism 173 and forcing the lower part of the valve mechanism 173 downwardly to admit fluid under pressure to the left side of the piston 143 that is connected to the rod 112, thereby shifting the element 94 of the transmission into engagement with the gear 93. Similarly, when the radial passage 313 is in alignment with the passage 314, the same condition prevails, namely, shiftable element 94 of the secondary unit $S_u$ is shifted into engagement with gear 93.

Referring to Fig. 20, the plug valve 278 is provided with three bosses 279 in which radial ports 315, 316 and 317 are located. These ports are adapted to cooperate with a passage 318 that is formed in the valve body 168 and which communicates with the bore 169 within which the valve mechanism 174 is adapted to reciprocate. When the radial ports 315 and 316 are in alignment with the passage 318, fluid under pressure from passage 281 forces the lower part of valve mechanism 174 downwardly, whereupon fluid under pressure from inlet 182 is admitted to the right side of the piston 143 that is connected to the rod 112 thereby effecting engagement between the shiftable element 94 and the gear 92 within the headstock.

Referring to Figs. 14, 15, 17, 19 and 20, attention is directed to the fact that the radial ports 304 and 312 are aligned with their respective passages 302 and 314 at the same time. Thus, gear 97 is connected to the driven shaft 98 and gear 93 is connected to shaft 91 whereupon the drive from the primary unit $P_u$ passes through the gears 95, 93, 96 and 97 to the driven shaft 98. Furthermore, radial ports 303 and 315 will become aligned with their respective passages 302 and 318 at the same time, in which case gear 97 will be connected to the driven shaft 98 and gear 92 will be connected to shaft 91. In this case the drive from the primary $P_u$ will include gears 88, 92, 96 and 97. Furthermore, radial ports 307 and 313 will become aligned with their respective passages 309 and 314 at the same time. When this occurs, gear 100 will be connected to the driven shaft 98 and gear 93 will be connected to shaft 91. The drive then will be from the primary unit through the gears 95, 93, 99, 100. Additionally, the radial ports 308 and 316 will become aligned with their passages 309 and 318 at the same time. When this occurs, gear 100 is connected to the driven shaft 98 and gear 92 is connected to shaft 91. Accordingly, under these circumstances the drive from the primary unit will include gears 88, 92, 99 and 100. From the foregoing it is evident that four positions of the plug valve 278 will provide four separate and distinct gear combinations within the headstock and a fifth combination, namely, the direct drive will be established when the passage 310 (Fig. 17) is aligned with the passage 311 in which case, element 105 is shifted into engagement with the gear 95 thereby directly connecting the driven shaft 88 with the shaft 86. Should the direct drive be established for a great length of time, the driven shaft, the sleeve 101 for gear 100 and the gear 97 would be subjected to excessive unequal wear tending to make them eccentric. This has been overcome by providing the additional radial port 317 (Fig. 20) which will automatically become aligned with passage 318 at the same time that the radial port 310 (Fig. 17) becomes aligned with its passage 311. Under these circumstances, therefore, the shiftable element 94 will be connected with the gear 92 and consequently, gears 99, 100, 96 and 97 will be rotated, thus effecting even wear between the sleeve 101 for said gear 100 and the driven shaft 98, as well as between the gear 97 and shaft 98.

For each of the five possible gear combinations just described, four separate and distinct gear combinations are adapted to be established in the primary unit $P_u$ of the headstock by turning the plug valve 277 to four separate positions. Referring to Fig. 22, the plug valve 277 is provided with a boss 279 having a single radial port 319 that is adapted to be aligned with a passage 320 in communication with the bore 169 of valve body 168 within which valve mechanism 175 is adapted to reciprocate. When the port 319 is in alignment with passage 320, fluid under pressure from bore 280 is admitted to the valve mechanism 175 forcing the lower part thereof downwardly, admitting fluid under pressure to the left side of the piston 143 connected to the rod 110 whereupon shiftable element 85 is connected to gear 83.

Referring to Fig. 23, plug valve 277 is provided with another boss 279 having a radial port 321 that is adapted to be moved into alignment with a passage 322 that communicates with the bore 169 within which the valve mechanism 176 is adapted to reciprocate. When this alignment is provided, the lower portion of valve 176 is moved downwardly and fluid under pressure is admitted to the right side of the piston 143 that is connected to the rod 110 whereupon shiftable element 85 is connected to gear 82 of the headstock.

Referring to Fig. 24, the plug valve 277 is additionally provided with a boss 279 having a radial port 323 that is adapted to become aligned with a passage 324 that communicates with the bore 169 within which valve mechanism 177 reciprocates. When this alignment occurs, the lower portion of valve 177 is moved downwardly whereupon fluid under pressure is admitted to the left side of the piston 143 that is connected to rod 109 thereby shifting shiftable element 84 into engagement with gear 80.

Referring to Fig. 25, the plug valve 277 is additionally provided with a boss 279 containing a port 325 that is adapted to become aligned with a passage 326 in communication with the bore 169 of the passage within which valve mechanism 178 is adapted to reciprocate. When this alignment occurs, fluid under pressure forces the lower part of valve mechanism 178 downwardly whereupon fluid under pressure is admitted to the right side of the piston 143 that is connected to the rod 109 whereupon shiftable element 84 is connected to gear 81 within the headstock.

Referring to Figs. 14, 15, 17, 19, 20, 22, 23, 24 and 25, it is noted that the portions of the plug valves 277 and 278 between the various bosses 279 form exhaust chambers 327 in each instance. Accordingly, when the various passages 302, 309, 311, 314, 318, 320, 322, 324 and 326 communicate with said chambers 327, the fluid under pressure that maintains the lower portions of the various valve mechanisms in their downward positions is exhausted through passages 291 and 292 (Figs. 16 and 21), thence to the headstock housing. Accordingly, when such condition prevails, the lower portions of the various valve mechanisms are caused to be raised by the inlet pressure from the inlet 182 (Fig. 7) acting on the under faces of the lower portions of said valve mechanisms that are seated on the tubular members 189 (Fig. 9). Upon the upward movement of any of the lower portions of the valve mechanisms, the fluid trapped within the cylinders containing the pistons 143 is exhausted to the headstock housing as previously described.

With the setting of the handwheels 297 and 298 as just described, a gear combination in the headstock will automatically be set up when the shoe 255 moves the valve mechanism 179 to its low position. This gear combination will include a drive from shaft 70 through gears 83, 80, 95, 93, 96 and 97 to the driven shaft 98. Of course, it is to be understood that any of the twenty gear combinations could have been set for being automatically established upon the completion of the series of gear combinations automatically provided by the indexing of the programming drum 250.

As previously described, each new gear combination that is set up by the indexing of the programming drum 250 is accompanied by the timed operation of the clutch 74 and brake 76 (Fig. 5). This timed actuation of the clutch and brake is also effected when the shoe 255 moves the valve mechanism 179 to its low position to provide the gear combination in the headstock in accordance with the pre-setting of the handwheels 297 and 298 (Fig. 13.) The initial setting of the handwheels 297 and 298 is performed at the same time the program drum 250 is set up, and the plug valves 277 and 278 are maintained in this set position by means that prevents any accidental displacement thereof during the automatic operation of the machine, and also any manual actuation of handwheels 297 and 298 when the main clutch is engaged. Referring to Fig. 26, the ends of the trunnions for the plug valves 277 and 278, within the bearings in the closure 283, are provided with notched peripheries 328 and 329 that extend into recessed portions also within an additional closure member 330 fixed to the closure member 283. Referring to Fig. 26, the end of the trunnion on plug valve 277 is provided with four notches 328 because it is adapted to assume only four positions of rotation; whereas the end of the trunnion for member 278 is provided with five notches 329 because it is adapted to assume five positions of rotation. Spring-pressed detents 331 and 332 are adapted to engage the notches 328, 329. Interference mechanism is provided for fixing the detents 331 and 332 in their active positions, comprising a vertically-reciprocable member 333 having notches 334 and 335, which, when in cooperative position relatively to the detents 331 and 332, permit the leftward movement of the latter upon manual rotation of the plug valves 277 and 278; and when said notches 334 and 335 are not in cooperative position with said detents, the member 333 will prevent the leftward movement of said detents and effectively lock the plug valves 277 and 278 in adjusted position.

While the valve mechanism 179 is in its low position, the handwheels 297 and 298 may be adjusted to any desired position to provide any other gear combination within the headstock. Of course, employing the manual means for setting up gear combinations necessitates the manual operation of the clutch 74 and brake 76.

Referring to Fig. 26, a shaft 336 is journaled in a bearing 337 formed on the bearing 252 (Fig. 7). A spur gear 338 is keyed to the lower end of the shaft 336 in mesh with rack teeth on the one end of a rack bar 339 slidably mounted in a cross-head bearing 340. The end of rack 339 opposite that which meshes with the gear 338 is provided with rack teeth 341 that mesh with the teeth of a gear segment 342 journaled on a sleeve 343 which latter is keyed to shaft 264. The teeth of gear segment 342 also mesh with rack teeth 344 on the vertically-reciprocable interference member 333. The sleeve 343 is provided with integral clutch dogs 345 that are adapted to cooperate with dogs 346 on gear segment 342. Lost motion is provided in one direction between the dogs 345 and 346 as clearly shown in Fig. 26. This lost motion permits shaft 264 to be moved in a clockwise direction an amount equal to the lost motion without affecting gear segment 342. Thus, the actuation of shaft 264 by the rotation of disc 261 (Fig. 12) is independent of shaft 336, although movement of shaft 336 from left to right (Fig. 26) will cause the dogs 346 to move the shaft 264 through dogs 345. Upon movement of shaft 336 from right to left, the pressure acting on valve mechanism 181 will force shaft 264 in a counter-clockwise direction, thereby maintaining dogs 345 and 346 in abutting relation. Furthermore, oscillation of the shaft 336 will effect reciprocable movement of the interference member 333. The construction and arrangement of the parts are such that in the position shown in Fig. 26, the brake 76 is disengaged and the clutch 74 is in engagement, and the detents 331 and 332 lock the plug valves 277 and 278 in their adjusted positions.

It is clear that successive actuations of the clutch and brake by disc 261 will not release detents 331 and 332. Therefore, the handwheels 297, 298 can only be adjusted by manually moving shaft 336 from left to right (Fig. 26). Turning shaft 336 from left to right (Fig. 26) will cause shaft 264 to turn clockwise thereby forcing rocker arm 265 (Fig. 10) downwardly and causing the intermittent admission and cut-off of fluid under pressure to the right side of piston 158 moving the latter towards the left and thereby effecting disengagement of the clutch 74 and engagement of the brake 76. While this is occurring, notches 334 and 335 (Fig. 26) become aligned with the detents 331 and 332 whereupon the plug valves 277 and 278 may be manually turned by the handles 297 and 298 to provide any desired gear combination within the transmission. When a desired gear combination has been established, turning of the shaft 336 from right to left (Fig. 26) permits upward movement of the rocker arm 265 (Fig. 10) to thereby effect the intermittent admission and cut-off of fluid under pressure to the left side of piston member 164 to thereby incrementally shift the rod 111 to the right, effecting disengagement of the brake 76 and engagement of the clutch 74. At the same time, the notches 334 and 335 move out of registry with the detents 331 and 332 and maintain the plug valves 277 and 278 in their adjusted position. As previously explained in connection with the description of the compound valve-actuating mechanism 181 shown in Fig. 10, the incremental movement of the clutch 74 into driving engagement is directly proportional to the incremental movement applied to shaft 336. Accordingly, an hydraulically-operated clutch is provided that does not completely become engaged when the pressure is turned on, but one which moves toward or from engagement by increments proportional to the movements applied to the manual actuating mechanism. Such a clutch in a headstock is extremely valuable since it places the incremental rotary movement of the driven member directly under the control of the operator.

*Main head Hm and turret Tm*

Referring to Fig. 1, the cross-rail R is constructed, mounted on the standard of base B and operated in the same way as that of Patent Number 2,355,625, dated August 15, 1944. The cross-rail R is adapted to support a saddle 347 adapted to be moved therealong by the action of a rotatable screw 348. The saddle 347 supports the main head Hm including the turret Tm for movement at an angle relatively to the movement of the saddle on the cross-rail by the action of a rotatable splined shaft 349.

Referring to Figs. 27 to 31, inclusive, saddle 347 is adapted to be reciprocated by the rotation of the screw 348 threaded to a nut 350 fixed to the saddle 347. A slide 351 is mounted on the front face of the saddle 347 and is adapted to be reciprocated vertically along bearings 352 on the saddle 347. A nut 353 is fixed to the back of the slide 351 and is threaded to a screw 354 that is driven through suitable gearing from the splined shaft 349. Referring to Fig. 27, saddle 347 is provided with a cored portion 355, within which a sleeve 356 is journaled in bearing members 357, 358. Sleeve 356 is provided with an internally-splined portion 359 that cooperates with splined shaft 349. A sleeve gear 360 is keyed to sleeve 356 and meshes with a spur gear 361 integral with a bevel gear 362 keyed to a shaft 363 that is journaled in the saddle 347. Gear 362 meshes with a bevel gear 364 (Fig. 29) keyed to the lower end of screw 354. Accordingly, rotation of splined shaft 349 will effect rectilinear movement of slide 351 along bearings 352 even while saddle 347 is moved along cross-rail R.

In the present embodiment, slide 351 is adapted to be moved vertically and to support turret Tm which latter is adapted to support relatively heavy tools. Accordingly, the mass associated with slide 351 is so great that it tends to move it downwardly along screw 354 which is not a self-locking screw. This characteristic is particularly undesirable when head Hm is moved downwardly at rapid feed rates and then suddenly stopped, because the momentum of the head causes over-travel. To compensate for the above, an over-running clutch and brake is provided. Referring to Figs. 27 and 27A, an extension of shaft 363 has a disc 365 keyed to it. This disc (Fig. 27A) is provided with a plurality of recesses 366 in which rolls 367 are adapted to be confined and urged into cooperating position with an outer shell 368 of a brake member 369 by springs 370 behind each roll. The brake member 369 is integral with a shaft 371 journaled in a bearing 372 fixed in saddle 347. The brake member 369 is provided with a conical outer surface 373 that is adapted to cooperate with a mating conical surface of a brake lining 374, fixed to bearing 372 against rotation, but axially urged toward brake member 369 by springs 375. The construction and arrangement are such that rotation of shaft 363 to effect upward movement of slide 351 produces an anticlockwise rotation to disc 365 (Fig. 27A) causing it to over-run relatively to brake member 369. However, rotation of shaft 363 to produce downward movement of slide 351 causes disc 365 to drive brake 369 through rolls 367 thereby preventing over-travel of slide 351.

The turret Tm is mounted for rotation on a sleeve bearing 376 fixed to the lower end of the slide 351. The turret Tm is adapted to be held in fixed relation relatively to the slide 351 by a plurality of centering and locking means, one of which is shown in detail in Fig. 30. These centering devices comprise a member 377 fixed to the turret Tm that is adapted to cooperate with a mating member 378 fixed to the slide 351. The construction and arrangement of the parts are such that the turret Tm is adapted to be moved away from the slide 351 so that the members 377 and 378 clear each other prior to an indexing operation. At the completion of an indexing operation, the turret Tm is moved toward the slide 351 such that the members 377 and 378 cooperate to accurately locate the turret Tm and fix it in such position.

An electric motor 379, the control of which will be described later, is fixed to the top of the slide 351 and is provided with a spur gear 380 (Fig. 28) that meshes with a gear 381 on a stub shaft 382. A bevel gear 383 is mounted on the shaft 382 and meshes with a bevel gear 384 fixed to a spur gear 385 that is integral with a shaft 386 (Fig. 29) journaled in the slide 351. The gear 385 meshes with a like gear 387 keyed to a shaft 388 also journaled in the slide 351. The end of shaft 388 opposite that to which gear 387 is keyed is provided with a crank arm 389 forming one element of a Geneva stop motion. The crank arm is provided with a roll 390 adapted to cooperate with a plurality of slots 391 in a disc 392 journaled on a pin 393 mounted in the slide 351. A gear 394 is fixed to the disc 392 and meshes with a spur gear 395 also journaled on a pin 396 mounted in the slide 351. The gear 396 meshes with a wide faced gear 397 which latter meshes with a spur gear 398 integral with a shaft 399. The shaft 399 also includes a spur gear 400 fixed thereto and adapted to mesh with a gear 401 that is fixed to the turret Tm. Gears 400 and 401 are of such width that movement of the turret away from the slide 351 will not affect their meshing.

Movement of the turret Tm away from and toward the slide 351 is adapted to be effected by the reciprocation of a bar 402 mounted in a bearing 403 in the back of the slide 351 (Fig. 31). The bar 402 is provided with a slot 404 through which extends a head 405 integral with a shaft 406. The shaft 406 is located within the sleeve bearing 376 and supports at its outer end a plate 407 that cooperates with a ring 408 fixed to the turret Tm. A locking nut 409 is located on the end of shaft 406 for providing a locking arrangement between the shaft 406, a collar 410 and the plate 407. Two cam slots 411 are located on opposite faces of the head 405 (Figs. 29 and 31). The cam slots 411 are adapted to receive the heads 412 of cam followers 413 mounted within the bar 402. The contour of slots 411 is such that vertical reciprocation of bar 402 causes turret Tm to move away from and toward the slide 351.

Referring to Fig. 29, the shaft 386 mounted within the slide 351 is provided with an eccentric portion 414 that extends through the upper portion of the bar 402. Additionally, a bolt 415 is located in the bar 402 in position to engage one of the slots 391 of the Geneva disc 392 when the bar is in its raised position, and to clear said slots when said bar is in its lower position.

The construction and arrangement of the mechanism are such that during a partial revolution of the shaft 386 by the motor 379, the bar 402 descends thereby moving the turret Tm away from the slide 351, providing a clearance between the locking members 377 and 378 (Fig. 30) and moving bolt 415 out of engagement with the slot 391 of the Geneva disc 392. Continued rotation of shaft 386 causes the roller 390 on the crank arm 389 to cooperate with a slot 391 in the disc 392 to index it through 72 degrees. The gearing between the disc 392 and the turret Tm is such that the turret Tm rotates through 90 degrees for 72 degrees' rotation of disc 392. This arrangement is provided because the turret Tm includes four faces, whereas the Geneva disc 392 is provided with five equally spaced slots. Rotation of shaft 386 to complete a single revolution thereof, raises bar 402 thereby moving turret Tm toward slide 351. The members 377, 378 (Fig. 30) accurately center the turret Tm and cooperate with the bar 402, cam slots 411 and cam followers 413 to effectively lock the turret in its indexed position. Additionally, as the bar 402 rises, the bolt 415 thereon cooperates with a slot 391 to prevent vibrations from moving the Geneva disc 392 out of its proper position.

Feedworks Fm

From the foregoing it is evident that rotation of the screw shaft 348 effects movement of saddle 347 along cross-rail R, and that rotation of the splined shaft 349 effects movement of slide 351 along bearings 352 in saddle 347. Rotative power for shafts 348 and 349 is provided by the feedworks Fm, rigidly mounted on one end of the cross-rail R. Since the shafts 348 and 349 are adapted to be rotated at variable speeds that bear a definite relation to the rotation of the work-supporting table W, as well as to be rotated at a substantially constant, relatively rapid speed, two independent sources of power must be supplied to the feedworks Fm. Accordingly, the headstock H (Fig. 3) is provided with the driving gear 72 fixed to its driving shaft at the power input side of the headstock adjacent the clutch and brake 74 and 76. The gear 72, therefore, rotates at a constant speed irrespective of the speed at which the headstock H drives the work-supporting table W. The driving gear 72 meshes with a spur gear 417 fixed to one end of a shaft 418. The opposite end of shaft 418 is provided with a bevel gear 419 that meshes with a bevel gear 420 fixed to one end of a vertically-disposed shaft 421. An additional driving gear 422 is adapted to mesh with a gear 423 fixed to the driven shaft 98 of the headstock H adjacent the power output side thereof. Accordingly, the driving gear 423 is adapted to be rotated by the headstock H at a speed directly related to the speed at which the work-table W is driven. The driving gear 422 is fixed to a stub shaft 424 which supports a bevel pinion 425 at its opposite end. The bevel pinion 425 meshes with a bevel pinion 426 fixed to the lower end of a shaft 427. The shafts 421 and 427 are located directly above the headstock H approximately at the center of the standard of bed B. These shafts extend vertically upwardly through the top of said standard into the gear-bracket G. Referring to Fig. 33, the gear-bracket G comprises a housing in the bottom of which bevel gears 428 and 429 are adapted to be journaled. The gears 428 and 429 are fixed to the upper ends of shafts 421 and 427 respectively, and mesh with bevel gears 430 and 431 keyed to a pair of parallel horizontally-disposed shafts 432 and 433. The parallel shafts 432 and 433 extend outwardly beyond the side of the standard and are provided at their outer ends with bevel gears 434 and 435 that mesh with bevel gears 436 and 437 keyed to the upper ends of vertically-disposed parallel driving shafts 438 and 439. The shafts 438 transmits rotary power from the transmission to the feedworks Fm for moving the turret head Tm along its intersecting paths at a relatively rapid, substantially constant speed. The shaft 439 is adapted to transmit rotary power to the feedworks Fm for moving the turret head Tm along its intersecting paths at a plurality of relatively slow speeds. Both of the shafts 438 and 439 are splined throughout substantially their entire lengths to continuously supply rotary power to the feedworks Fm as the latter moves vertically with the movement of the cross-rail R.

The feedworks Fm comprises a substantially rectangular box-like housing 440 (Fig. 32) adapted to be hermetically sealed and to contain sufficient lubricant to keep the transmission gears submerged in oil, thereby insuring adequate lubrication, noiseless operation and preventing dust and dirt from entering the transmission. The housing 440 is provided with substantially cylindrical bosses 441 and 442 (Fig. 36) through which the vertically-disposed shafts 438 and 439 are adapted to pass, respectively.

Referring to Fig. 34, a bevel gear 443 is journaled in the cylindrical boss 442 and splined to the shaft 439. The bevel gear 443 meshes with a bevel gear 444 keyed to a shaft 445. A portion 446 of the shaft 445 is splined to receive slidable gear units 447 and 448. The gear units 447 and 448 are adapted selectively to be meshed with three gear units 449, 450, and 451 keyed to a shaft 452 parallel with shaft 445. The single gear of unit 449 is adapted to mesh with one gear of unit 447; and the gear unit 450 is provided with two gears, one of which is adapted to be meshed with a gear of the sliding unit 447 and the other with a gear of the sliding unit 448. The gear unit 451 is provided with a gear adapted to be meshed with one of the gears of the slidable unit 448. From an inspection of Fig. 34, it is apparent that selective shifting of the slidable gear units 447 and 448 will provide four separate and distinct rotative speeds of shaft 452 from a single speed of shaft 439.

The rotative speeds provided by the headstock H for the feedworks Fm require substantial reduction before they can be employed for feeding the turret head Tm during a working operation. Accordingly, a speed reduction unit is contained within the transmission of the feedworks Fm. The construction and arrangement are such that the speed of shaft 452 is reduced through a plurality of successive steps, at each of which a different driving rate for the feedworks Fm is produced. The shafts 445 and 452 of Fig. 34 are extended to support the speed-reduction unit of the transmission. The gear unit 451 on the shaft 452 includes a relatively small gear 453 in constant mesh with a relatively large gear 454 freely journaled on the extension of shaft 445. Another relatively small gear 455 integral with gear 454 is constantly in mesh with a relatively large gear 456 freely journaled on the extension of shaft 452. A third relatively small gear 457, integral with gear 456, is also constantly in mesh with a relatively large gear 458 freely journaled on the shaft 445. The arrangement of gears 454, 455, 456, 457 and 458 may be continued indefinitely to provide any desired number of successive steps of speed reduction. In the present instance, three steps are provided, each of which bears a definite relation to the preceding and the following. A driven shaft 459 is located within the feedworks Fm in parallel relation with the shafts 445 and 452. Shaft 459 is actually in front of shaft 452 (Fig. 32), but for clarity, Fig. 34 discloses shaft 459 below shaft 452. A pair of gears 460 and 461 are splined to the shaft 459. Movement of the gear 460 to the right as viewed in Fig. 34 will provide four separate and distinct speeds of shaft 459 upon selectively shifting the gear units 447 and 448. Movement of gear unit 460 to the left will produce an additional four speeds of shaft 459 which speeds are reduced by the gear ratio of gears 453, 454, 455 and 456, constituting the first step of the speed-reduction unit. Shifting gear 461 to the right will produce an additional four speeds upon selectively shifting gears 447 and 448. These speeds will be further reduced corresponding to the second speed-reduction step of the unit; and shifting gear 461 to the left will produce a final four speeds of shaft 459 at the lowest rate the speed-reduction unit shown can accomplish. Accordingly, shaft 459 is adapted to be driven at sixteen separate and distinct speeds by selectively shifting the gears 447, 448, 460 and 461.

The sixteen speeds of the shaft 459 derived from shaft 439, as well as the substantially constant speed of the shaft 438, are adapted to be transmitted to the driven shafts 348 and 349, for controlling the movement of the turret head Tm along its intersecting paths. Furthermore, shafts 348 and 349 are adapted to be driven in both directions at the plurality of speeds of shaft 439 and the substantially constant speed of shaft 438. In the present instance, this has been accomplished by providing a transmission including a driving shaft for each of the driven shafts 348 and 349 and a pair of auxiliary shafts, all of which support the transmitting and the reversing mechanism.

Referring to Figs. 32 and 35, and particularly Fig. 35, the driven shaft 459 is provided with a gear 462 keyed thereto and adapted to constantly mesh with a gear 463 journaled on an auxiliary shaft 464. The gear 463 is adapted to drive a relatively long gear 465 likewise journaled on the shaft 464. An over-load clutch 466 is provided between the gears 463 and 465, urged into engagement by a spring 467 surrounding shaft 464. The relatively long pinion 465 is adapted partially to overlie and mesh with a similar relatively long pinion 468 freely journaled on another auxiliary shaft 469. The auxiliary shafts 464 and 469 are located in a substantially horizontal plane. A pair of driving shafts 470 and 471 are arranged in a substantially vertical plane that intersects the horizontal plane midway between the shafts 464 and 469. The shafts 470 and 471 are provided with a pair of driving gears 472 and 473 that are constantly in mesh with the relatively long pinion 465 on the auxiliary shaft 464; and a pair of driving gears 474 and 475 in constant mesh with the relatively long pinion 468 on the auxiliary shaft 469. Gears 472 and 473 are adapted to be rotated in opposite directions from that of gears 474 and 475, and by selectively connecting gears 472, 473, 474 and 475 to the shafts 470 and 471, it is apparent that said driving shafts may be driven at sixteen different speeds in either direction upon selectively shifting the gears 447, 448, 460 and 461 of the variable speed unit (Fig. 34). Positive-action axially-shiftable clutch members 476 and 477 are splined to the driving shafts 470 and 471, respectively. The slidable, positive-action clutch-engaging means are adapted to cooperate with mating clutch elements 478, 479, 480 and 481 on the gears 472, 474, 473 and 475, respectively. The driving shafts 471 and 470 are adapted to drive the screw shaft 348 and the splined shaft 349, respectively, for controlling the movement of the turret head Tm. Accordingly, intermeshing bevel gears 479' and 480' are fixed to the driving shaft 470 and splined shaft 349, respectively, and intermeshing bevel gears 481' and 482 are adapted to be keyed to the driving shaft 471 and the screw shaft 348, respectively.

Referring to Fig. 36, a bevel gear 482' is keyed to splined shaft 349. Gear 482' meshes with a bevel gear 483' integral with a stub shaft 484' that extends at right angles to shaft 349 outwardly of the housing for feedworks Fm and to the outer end of which a releasable crank 485' (Figs. 1 and 2) is connected. The crank 485' and a similar crank for shaft 348 is employed to manually move head Tm along its paths of travel.

The driving shafts 470 and 471 are adapted to be rotated in opposite directions at a constant, rapid traverse speed to move the turret head Tm toward and away from the work preparatory to a working operation. Accordingly, a bevel gear 483 journaled in the substantially cylindrical boss 441 of the housing 440 is splined to shaft 438. Gear 483 is adapted to mesh with a bevel gear 484 integral with a stub shaft 485 that is coaxial with the auxiliary shaft 464. A relatively long pinion 486 is adapted to be keyed to the stub shaft 485. A relatively long sleeve gear 487, provided with gear portions 488 and 489, is adapted to be journaled on the auxiliary shaft 469—the gear portion 488 meshing with the relatively long pinion 486. Accordingly, pinion 486 and gear 487 are rotated in opposite directions. Gears 490 and 491, journaled on the driving shafts 470 and 471, respectively, are maintained in constant mesh with the gear 486; and similar gears 492, 493, journaled on the driving shafts 470, 471 are adapted to be maintained in constant mesh with the gear portion 489 of the sleeve gear 487.

Axially-shiftable positive-action clutch members 494 and 495 (similar to clutch members 476 and 477) are splined to the driving shafts 470 and 471, respectively, between the gears 492, 490 and 493, 491. The clutch members 494 and 495 are adapted to engage corresponding or mating clutch members on adjacent sides of gears 492, 490 and 493, 491, respectively. Accordingly, by selectively shifting the clutch members 494 and 495, it is possible to drive the driving shafts 470 and 471 in either direction at a constant, relatively rapid traverse speed.

The mechanism for selectively shifting the clutch elements 476 and 494 is identical with that for shifting the elements 477 and 495, and for that reason, only the shifting mechanism for the clutch elements 476 and 494 will be described. Referring to Figs. 32 and 36, shiftable elements 476 and 494 are provided with yoke elements or members 496 and 497, respectively. The yoke 496 is oscillatably mounted on a shaft 498 within the housing 440. In a similar manner, the yoke 497 is oscillatably mounted on a shaft 499. The yoke member 496 is provided with an arm 500 bored to receive a shaft 501 that is journaled in a bearing 502 mounted in the housing 440. The bore of arm 500 that receives shaft 501 is slightly larger than the diameter of the shaft providing a loose connection, and a pin 502' is provided between the arm 500 and the shaft 501. The looseness between the bore of arm 500 and the shaft 501 is necessary to accommodate the angularity produced by the oscillatable movement of the yoke member 496. The shaft 501 extends from the left side of the arm 500 (Fig. 36) into a cylinder 503, within which a piston 504, fixed to the shaft 501, is adapted to be reciprocated. The portion of shaft 501 that extends within the cylinder 503 is reduced in diameter to provide a shoulder 505 and a plate 506 of slightly larger diameter than the reduced diameter of the shaft 501 is fixed to the end thereof within cylinder 503 by a locking bolt 507. An auxiliary cylinder 508 is mounted within the cylinder 503 and forms a chamber 509 within which piston members 510 and 511 are adapted to reciprocate. The members 510 and 511 are loosely mounted on the reduced diameter of the shaft 501. The piston member 511 is adapted to abut against the plate 506, as well as against a ring member 512 that holds the auxiliary cylinder 508 in place. The piston member 510 is adapted to abut against the shoulder 505 formed between the reduced diameter of shaft 501 and its largest diameter. The cylinder 503 is provided with ports 513 and 514 on opposite sides of the piston 504. The ports 513 and 514 are connected to conduits 515 and 516 that communicate with a source of fluid under pressure. The auxiliary cylinder 508 is provided with a port 517 between the piston members 510 and 511. Port 517 communicates with a line 518 which latter communicates with a source of fluid under pressure.

Fluid, preferably liquid, under pressure is adapted to be supplied to the conduit 518 at all times, thereby tending to separate the piston members 510 and 511 so that the yoke 496 is always urged towards a neutral position. Fluid under pressure is adapted selectively to be supplied to conduits 515 and 516 by mechanism to be described later, for shifting the piston 504 to the right or left thereby shifting the yoke 496 to effect engagement between the clutch 476 and the gears 472 and 474. It is to be noted that the area of the piston 504 on which the fluid under pressure is adapted to act is substantially greater than the area of the piston members 510 and 511 against which said fluid pressure is adapted constantly to act. Accordingly, although a constant supply of fluid under pressure is delivered through the conduit 518, tending to neutralize the clutch 476, any admission of fluid under pressure to either side of the piston 504 will cause it to move in the selected direction and upon release of such pressure the clutch 476 is immediately returned to neutral position due to the action of the piston members 510 and 511.

In a like manner, the yoke member 497 is provided with an arm 519, fixed to a shaft 520 in the same manner that shaft 501 is fixed to arm 500. Shaft 520 is likewise provided with a piston 521 that reciprocates within a portion of a cylinder 522, and neutralizing pistons 523 and 524 are provided for the yoke 497 which function in a manner identical with that of piston members 510 and 511. Fluid under pressure is adapted selectively to be admitted to opposite sides of the piston 521 while a constant source of fluid under pressure is delivered between the pistons 523 and 524 at all times.

Referring to Fig. 37, the shiftable elements 447, 448, 460 and 461 which are adapted, upon shifting, to provide sixteen different speeds of rotation of the gear 462 (Fig. 34), are adapted to be shifted by the movement of finger elements 525, 526, 527 and 528. Four parallel rods 529, 530, 531 and 532 are mounted for reciprocation in bearings within the housing 440. The finger element 525 is pinned to the rod 529; the finger element 526 is pinned to the rod 530; the element 527 is pinned to the rod 531; and the element 528 is pinned to the rod 532. Accordingly, selective axial movement of the rods 529 to 532, inclusive, will effect selective shifting of the slidable gear units 447, 448, 460 and 461.

Since each of the rods 529 to 532, inclusive, is adapted to be shifted axially in the same manner by identical means, only the means for shifting rod 532 will be specifically described. The rod 532 is adapted to extend into a cylinder 533, and a piston 534 is fixed to rod 532 for reciprocation within said cylinder. Ports 535, 536 are provided in the cylinder 533 for selectively admitting fluid under pressure to opposite sides of the piston 534. The end of the rod 532 nearest the piston 534 is provided with a groove 537 that is adapted to cooperate with a groove 538 in the end of rod 531 adjacent to rod 532. A drilled passage 539 is provided in the housing for the cylinders 533, and balls 540 are located within the passage 539. The construction is such that neither the rod 531 nor 532 can be shifted from its neutral position if the other rod is out of its neutral position.

The portion of the rod 532 at the end thereof opposite that to which the piston 534 is connected, is reduced in diameter forming a shoulder 541 against which a loosely mounted piston member 542 is adapted to abut. An additional piston member 543 on the reduced portion of the shaft 532 is adapted to engage a plate 544 fixed to the end of shaft 532 by a locking bolt 545. The area of piston members 542 and 543 is substantially less than that of piston 534. A pipe line 546 is connected to a drilled passage in the housing surrounding the cylinder within which the piston members 542 and 543 are adapted to reciprocate, so that fluid under pressure may be constantly delivered into the cylinder within which said piston members reciprocate. Each of the rods 529 to 531, inclusive, is provided with the same type of neutralizing mechanism which is substantially the same as that disclosed in connection with the rods 501 and 520 of Fig. 36. The passage to which pipe line 546 is connected extends completely through that portion of the housing member in which the cylinders are provided for the respective neutralizing mechanism so that at all times, fluid under pressure is adapted to act upon the individual piston elements thereof. Accordingly, upon the selective admission of fluid under pressure to the opposite sides of the pistons 534 on the respective rods 529 to 532, inclusive, said rods will be axially moved in the direction dictated by the sides of the pistons against which the fluid is directed, and, immediately upon the release of such pressure, each of the neutralizing mechanisms for the rods 529 to 532, inclusive, will automatically shift into neutral the shiftable gear units 447, 448, 460 and 461 with which said rods are associated.

From the foregoing it is evident that the feedworks $F_m$ is made up of various shiftable gear units and clutches which are adapted selectively to be operated upon the selective admission of pressure fluid to the cylinders containing the pistons that are associated therewith. Such selective admission of fluid will effect movement of the turret $T_m$ along intersecting paths as before mentioned. The selective admission of fluid under pressure to the various cylinders of the feedworks $F_m$ is adapted to be effected by the control mechanism $C_m$. The mechanism $C_m$ is substantially identical with the mechanism $C_s$ that is associated with the side head $H_s$ and will be described after a description of said head $H_s$.

*Side head $H_s$ and turret $T_s$*

Referring to Figs. 1, 2 and 2A, a vertical slide bearing 547, on the right-hand side of the standard of base B (Fig. 1) along which cross-rail R slides, extends downwardly to a point 548 near the bottom of the machine. The side head $H_s$ comprises a table 549 (Fig. 2) that is gibbed to the bearing surface 547 at the front of the standard of base B and which extends toward the rear thereof where it is provided with a tongue 550 that slides along a rear, vertically-disposed bearing 551.

The tool-holding turret $T_s$ is journaled on a stud on the one end of a slide 552 that is adapted to be reciprocated horizontally within bearings 553 formed in the front portion of the table 549. The construction of turret $T_s$ is similar to that of turret $T_m$ and will be described later.

A gear-bracket 554 is attached to the under surface of the table 549. The bracket 554 supports a shaft 555 having a worm 556 thereon that meshes with a worm gear 557 keyed to a shaft 558 journaled within the bracket 554. An additional gear 559 is keyed to shaft 558 and meshes with a spur gear 560 which latter meshes with a rack 561 formed on the lower surface of the slide 552. Accordingly, rotation of the shaft 555 causes horizontal reciprocation of slide 552 and tool holder $T_s$.

Another shaft 562 is journaled in bracket 554, and it supports a worm 563 that meshes with a worm gear 564 keyed to a shaft 565 likewise journaled in bracket 554. A spur gear 566 is keyed to the opposite end of shaft 565, and it meshes with a vertically-disposed rack 567 integral with the side of the standard of base B, as more fully disclosed in Patent Number 2,355,625, dated August 15, 1944. Accordingly, rotation of shaft 562 will effect vertical movement of the side head $H_s$ vertically along the side of the standard of base B. Rotation of the shafts 555 and 562 is effected through the feedworks transmission $F_s$ that is mounted on the side head $H_s$ adjacent the bracket 554 in the same manner that feedworks $F_m$ rotates screw 348 and shaft 349 previously described. Both of these feedworks are identical and further discussion of feedworks $F_s$ is believed to be unnecessary. Each of shafts 555 and 562 is provided with means including cranks 485' for manually moving head $T_s$ along its paths of travel, in the same way that head $T_m$ is manually moved.

The turret head $T_s$ is adapted to be indexed from station to station in substantially the same manner that head $T_m$ is indexed. Referring to Fig. 2A, the slide 552, as previously explained, is adapted to be reciprocated in bearings 553 of side head table 549 by the action of gear 560, etc. (Fig. 1). A motor 568 is fixed to the table 549 and straddles slide 552 such that said slide is movable relatively to the motor. The motor 568 is provided with a gear 569 keyed to its driving shaft. The gear 569 meshes with a gear 570 that in turn meshes with a gear 571 having a sleeve portion 572 journaled in a bearing formed in a housing 573. Housing 573 is likewise fastened to the table 549 in a manner to permit slide 552 to move relatively thereto.

A shaft 574 is splined to gear 571 and is journaled in a bearing 575 formed in a multi-part housing 576 that is fixed to and movable with the slide 552. A bevel gear 577 is splined to the end of shaft 574 that extends into housing 576. Gear 577 meshes with a bevel gear 578 that is fixed to a shaft 579 journaled in slide 552. The shaft 579 is provided with a crank arm 580 on which a roller 581 is attached. The roller 581 is adapted upon rotation of shaft 579 and crank 580 to cooperate with a series of slots 582 equally spaced about the periphery of a Geneva disc 583. The disc 583 is fixed to a gear 584 journaled on a shaft 585 that is mounted in the walls of housing 576. Gear 584 meshes with a gear 586 journaled on a shaft 587 within said housing. Gear 586 meshes with a gear 588 integral with a sleeve 589 journaled on a shaft 590 that is supported for axial movement in the slide 552. Turret $T_s$ is journaled on shaft 590 and pinned to sleeve 589 by a taper pin 591. The Geneva stop disc 583 is provided with five slots 582, while the turret $T_s$ is provided with four faces on which tools are adapted to be mounted. Accordingly, the ratio between gears 584, 586 and 588 is such that five indexes of plate 583 effect four indexes of turret $T_s$.

The turret $T_s$ is adapted to be releasably fixed to the slide 552. Accordingly, a wedge plate 592 is bolted to the slide 552. This wedge plate includes a tapered surface 593 that cooperates with a mating surface 594 formed on the four sides of a square plate 595 fixed to turret $T_s$. Axial movement of shaft 590 is adapted to effect the engagement and release of the turret $T_s$ by the action of tapered surfaces 593, 594. Shaft 590 is provided with a nut 598 that secures sleeve 589 between it and a thrust ring 599 that abuts against a shoulder 600 formed on shaft 599. The end of shaft 590 opposite that on which nut 598 is located is provided with a rectangular portion 601 having cam slots 602 in opposed faces. A groove 603 is provided in slide 552 within which a slide member 604 is adapted to be reciprocated. The slide 504 is provided with an opening 605 into which the rectangular portion 601 extends. Rolls 606 are located on opposite walls of opening 605 and cooperate with cam slot 602. Accordingly, reciprocation of slide 604 effects axial movement of shaft 590 and consequently turret T₅ to engage it to and release it from slide 552. The teeth of gears 586 and 588 are such that they remain in mesh at all times, even during the axial movement of shaft 590.

Reciprocation of slide 604 is adapted to be timed with the indexing of turret T₅. Therefore, it is connected to an eccentric stud 507 on the shaft 579 that drives index crank 580. In order to maintain disc 583 and crank 580 in phase, a spring-pressed detent 608 is provided in slide 552 that cooperates with notches 597 formed on the face of plate 596 to prevent its rotation upon its initial release by the axially-outward movement of shaft 590. Since turret T₅ is directly geared to disc 583, the latter is maintained in phase relation with crank 580.

The motor 568 is adapted to rotate the crank arm 580 through a single revolution upon being energized. The control for motor 568 to effect this single revolution of crank 580, as well as the means for initiating its activity, will be described later.

*Diagrammatic arrangement of apparatus and controls*

Before proceeding with the specific description of the control mechanisms C_m and C_s, it is believed that a general description of the relation between such controls, the feedworks F_m, F_s and the headstock H with its control C_h will be advantageous.

Referring to Figs. 38, 39 and 40, wherein the various organizations are shown diagrammatically, and particularly to Fig. 38, a valve body 609, provided with a plurality of valve plungers 610 to 625, inclusive, is adapted to be supplied with fluid under pressure from a source S (Fig. 40) through the line 626. The valve body 609 is provided with a passage 627 extending longitudinally therethrough for supplying all of the bores for valves 610 to 625 with fluid under pressure. The valve plungers 610 to 621, inclusive, are identical, while valve plungers 622 to 625, inclusive, are identical but different from the former group. One valve of each of these groups will be specifically described later. For the present, it is only necessary to note that each valve plunger is provided with a supply line and an exhaust.

The bore for valve plunger 610 is connected to the one end of a line 628, the opposite end of which is connected to the right-hand side of the cylinder in which piston 534 is adapted to reciprocate. The bore for valve plunger 611 is connected to the one end of a line 629, while the other end of said line is connected to the left-hand side of the cylinder in which piston 534 is adapted to be reciprocated. The line 626 which continuously supplies fluid under pressure to the valve body 609 also continuously supplies fluid under pressure through pipe line 546 to the cylinder in which piston elements 542 and 543 are adapted to be reciprocated. As previously pointed out, the effective areas of pistons 542 and 543 are substantially less than that of piston 534. Therefore, with valve plungers 610, 611 in their lower position as shown in Fig. 38, lines 628 and 629 are open to exhaust ports 630, 631, and the pressure fluid that continuously acts on piston members 542, 543 maintains piston 534 midway of its stroke and gear element 461 in neutral. Movement of either valve 610 or 611 to its upper position cuts off the exhaust and admits fluid under pressure to either side of piston 534, whereupon gear 461 moves to the right or left depending upon which valve, 610 or 611, is raised.

In a like manner, valve plungers 612, 613 control the admission of fluid under pressure to, and exhaust from both sides of piston 632 through lines 633, 634, and consequently the shifting of gear 460; valve plungers 614, 615 control the flow of fluid through lines 635, 636, and consequently the movement of gear 448; valve plungers 616, 617 control the flow of fluid through lines 637, 638, and consequently the movement of gear 447; valve plungers 618, 619 control the flow of fluid through lines 515, 516, and consequently the movement of clutch 476; valve plungers 620, 621 control the flow of fluid through lines 641, 642, and consequently the movement of clutch 477; valve plungers 622, 623 control the flow of fluid through lines 643, 644, and consequently the movement of clutch 494; and finally, valve plungers 624, 625 control the flow of fluid through lines 645, 646, and consequently the movement of clutch 495.

Not only is the line 626 adapted continuously to supply fluid under pressure to valve body 609 and the cylinder within which piston elements 542, 543 reciprocate, but it is also adapted continuously to supply fluid under pressure to similar neutralizing mechanisms for gears 460, 447, 448 and clutches 495, 477, 494 and 476. Accordingly, line 626 is provided with branch conduits 647, 648, 649, 650, 651, 652 and 653 adapted continuously to supply fluid under pressure to the neutralizing mechanisms for gears 460, 447, 448 and clutches 495, 477, 494 and 476, respectively.

From the foregoing it is apparent that selective actuation of valve plungers 610 to 625 will effect the selective rotation of screw 348 and shaft 349 in either direction at any one of sixteen feed speeds or at a relatively rapid traverse rate, and consequently the selective movement of turret T_m along either of its intersecting paths.

Valve plungers 610 to 625 are normally urged toward their downward positions. They are, however, adapted selectively to be moved to their upper positions by a function drum 654 on which dogs 655 are adapted to be located in accordance with the desired sequence of operations of turret T_m. Drum 654 is adapted to be indexed step-by-step about a horizontal axis by mechanism I_m—each index setting up the same or a different gear combination within the feedworks for performing an operation by turret T_m. The indexing of drum 654 is adapted to be determined by any preselected position the turret T_m may assume along its paths of travel. Accordingly, a motion-control drum 656 is provided for the shaft 349 and a similar drum 657 is provided for screw 348. These motion-control drums are provided with means for supporting in axially adjustable positions as many dogs 658 about their peripheries as there are axially-aligned rows of dogs 655 about the periphery of function drum 654. Drums 656 and 657 are also mounted for slight axial movement, which movement is caused by cooperation between the dogs 658 thereon and nuts 659, 660 movable in direct proportion to that of turret Tm along its respective paths. This slight axial movement of drums 656, 657 is employed to close a circuit maker for initiating the activity of the mechanism Im to index drum 654. Additionally, drums 654, 656 and 657 are geared together so that upon indexing drum 654, drums 656 and 657 are also indexed. This arrangement enables the selection of the path, speed, direction, starting and stopping of turret Tm for each operation it is adapted to perform because there is a single independent portion of drums 656 and 657 for each index position of drum 654, and a single index of drum 654 is employed for each operation of turret Tm. The valves 610 to 625, the the drums 654, 656, 657 and their associated structures comprise the control mechanism Cm.

Referring to Fig. 39, the feedworks Fs and the control mechanism Cs are substantially identical with the feedworks Fm and control Cm. A valve body 661 is provided within which are mounted valves 662 to 677, inclusive. These valves are connected to the various cylinders associated with the shift gears and clutches of the feedworks Fs in the same manner that valves 610 to 625 are connected to the cylinders associated with feedworks Fm. A function drum 678 is provided that is adapted selectively to be indexed from station to station by index mechanism Is. Motion-control drums 679 and 680 are also provided for shafts 555 and 562, respectively, which drums are geared together with drum 678 so that each is indexed when the drum 678 is indexed. The drums 678, 679 and 680 are adapted adjustably to support dogs 681, 683 and 682, respectively, for cooperation with valves 662 to 677, nut 684 and nut 685, respectively, all as more fully described in connection with feedworks Fm and control Cm. Accordingly, by locating dogs 681, 682 and 683 at the desired points on drums 678, 679 and 680, the turret Ts can be made to move along its intersecting paths in any desired manner—rendering it possible to select in advance the path, speed, direction, starting and stopping of turret Ts.

Switches 686 and 687 are provided for drums 654 and 678, respectively. They are employed to operate the circuit for the motors 379 and 568 of the respective drives for turrets Tm and Ts. Dogs may be located on drums 654 and 678 in line with switches 686 and 687 for rendering said motor circuits effective at predetermined times during the automatic operation of the machine, whereupon turrets Tm and Ts may be indexed selectively under the influence of controls Cm and Cs.

Additionally, switches 688 and 689 are associated with drums 654 and 678 which, when engaged by dogs on said drums, close the circuit for motor 269 of the headstock control Ch (Fig. 2). The headstock H and its control Ch, which have been specifically described before, are shown diagrammatically in Fig. 40 to illustrate the relation between them and the feedworks Fm and Fs. This disclosure shows the manual control valves 277 and 278 in section and 90 degrees revolved at each valve mechanism 170 to 178, inclusive, for the purpose of illustrating the cooperative relation therebetween.

Switches 690, 691 are likewise associated with drums 654 and 678. Upon actuation of switches 690 and 691, the mechanisms Is and Im, respectively, are adapted to be rendered effective so that each control Cm or Cs may start the other. The electrical diagram for the various circuits of the machine will be described later and will show the inter-control between these various mechanisms.

From the foregoing, it is evident that every operating instrumentality of the machine tool is under the control of one of the mechanisms Ch, Cm or Cs; that all of these mechanisms are interrelated; that although the controls Cm and Cs are independent of each other, either may control the other; and that by arranging dogs on the various drums 250, 654, 656, 657, 678, 679 and 680, the machine tool may be made to perform any function or series of functions in any predetermined order that can be performed by the machine under the supervision and control of an operator.

Inasmuch as the control mechanisms Cm and Cs are identical, only the control Cm will be specifically described.

Control mechanism Cm

Referring to Figs. 41, 42 and 43, the control Cm is contained within a housing including a back plate 692 that is rigidly bolted to the housing 440 of the feedworks Fm. Side plates 693, 694 are rigidly fixed to the plate 692, and a front plate 695 is joined to the outermost edges of plates 693, 694. Top and bottom cover plates 696, 697 complete the housing for the control Cm.

Referring to Fig. 43, the valve body 609 includes flanges 698, 699, rigidly attached to the back plate 692 over an opening 700 formed in the latter. A block 701, containing conduits for the passage of fluid under pressure controlled by valve plungers 610 to 617 is secured to the back of body 609 and extends into the feedworks housing 440 through the opening 700. Lines such as 635 connect the conduits within block 701 to the various cylinders such as that containing the piston for gear 448, Fig. 38. Arms 702, 703, 704 and 705 (Fig. 42) support a bracket 706 within which auxiliary pusher elements 707 (Fig. 43, to be described later) are adapted to reciprocate freely. There is a pusher element 707 for, and in line with each of valve plungers 610 to 625, inclusive. The outer end of each element 707 is beveled in two directions for facilitating cooperation with dogs on the function-control drum 654.

As previously mentioned, valve plungers 610 to 621 are identical. The valve plunger 614 will be the only one specifically described. The plunger 614 is adapted to be reciprocated in a bore including a portion 708 of small diameter and a portion 709 of larger diameter. A portion 710 of plunger 614 fits the large-diameter bore and a head 711 fits the smaller-diameter bore. A stem 712 connects portion 710 to 711. The body 609 is provided with a duct 713 that communicates with line 635 and bore 708. The left-hand extremity of bore 708 communicates with an exhaust passage 714 formed in the block 701 and emptying into the housing for control Cm. Fluid under pressure from line 627 enters bore 708 and since the area of portion 710 of valve 614 is greater than the area of the head 711, said valve and pusher member 707 are urged rightwardly thereby exhausting line 635 to exhaust passage 714. Movement of pusher member 707 to the left either by a dog on drum 654 or by hand (to be described later) positions head 711 to cut off communication between line 635 and exhaust passage 714, and establishes communication between line 635 and passage 627, whereupon fluid under pressure passes through line 635 and acts on the left-hand face of the piston associated with gear 448 (Fig. 38) moving it to the right into mesh with gear cluster 450. Upon release of the force that holds the member 707 for valve 614 in its leftward position, the fluid under pressure in bore 708 moves valve 614 and member 707 rightwardly thereby exhausting line 635, and consequently the neutralizing mechanism for said piston moves gear cluster 448 into neutral.

All of the valves 610 to 613, inclusive and 615 to 621, inclusive, are identical with valve 614, just described. Valves 622 to 625 are employed for shifting the traverse clutches of the transmission Fm. Traverse movement of head Tm is usually employed immediately following a cutting movement. Accordingly, to insure the tool's completing the cut, a time-delay device is combined with each valve 622 to 625, inclusive. All valves of this group are identical and since certain passages are common to each pair, valves 622 and 623 will be the only ones described specifically.

Referring to Figs. 44, 45 and 46, and particularly to Fig. 44, valve 622 is identical with valve 614. Fluid under pressure from duct 627 urges valve 622 toward the right into engagement with a pusher element 707. The body 609 is adapted to support a housing member 716 provided with cylindrical bores 717, 718 (Fig. 46) within which piston elements 719, 720 are adapted to reciprocate. A cover plate 721 for housing 716 is open above bores 717, 718 for the passage of pistons 719, 720 beyond the upper extremity of said housing. The pistons 719, 720 comprise elongated portions having flanges 722 and bosses 723 at their lower extremities. A collar 724 is located at the top of each bore 717, 718 against which the flange 722 of each piston abuts to limit the upward travel of each of said pistons. A rod 725 extending through housing 716 across bores 717, 718 acts to limit the downward movement of the pistons 719, 720 by abutting bosses 723.

Sleeves 726, 727 are located within bores 717, 718, respectively, and the rod 725 extends through the top portions of these sleeves. Additional piston-valve members 728, 729 are respectively located within sleeves 726, 727 for reciprocation therein. Each of the piston-valve members comprises a piston portion 730 and a valve head 731. The rod 725 acts to limit the upward travel of members 728, 729, and seats 732, 733, respectively formed within sleeves 726, 727 limit the downward travel of said members. Fluid under pressure from line 626 (Fig. 38) and passage 627 is continuously supplied to a line 734 (Fig. 44) that communicates with a passage 735 (Figs. 44, 46) which extends through the front wall of housing 716 opening into the bores 717, 718. The actual connection between passage 627 and line 734 is not shown in the drawings. A passage 737 extends radially through sleeves 726, 727 and communicates with passage 735 thereby admitting fluid to the interior of said sleeves and to the lower faces of the piston portions 730 of the piston-valve members 728, 729. Since the area of these lower faces is greater than that of the upper faces of valve heads 731, piston-valve members 728, 729 are urged upwardly into engagement with rod 725.

A vertically-disposed passage 738 (Fig. 44) also communicates with passage 735 and a passage 739 within the front wall of housing 716 between bores 717, 718. Passage 739 communicates with each of said bores and admits fluid under pressure to annular spaces 740, 741 surrounding pistons 719, 720. Accordingly, this pressure fluid acts on flanges 722 of said pistons 719, 720 forcing them downwardly until bosses 723 thereof abut rod 725.

Movement of the pusher element 707 for valve 622 to the left (Fig. 44) by hand or by a dog on drum 654, forces said valve leftward whereupon fluid under pressure from duct 627 passes through a duct 742, thence through a passage 743 into the bore between pistons 719 and 728. Since the area of piston 719 is greater than that of piston portion 728, the former moves upwardly to the top of its stroke before the latter moves downwardly. The rate of upward movement of piston 719 and consequently the extent of time-delay may be varied by controlling the degree of leftward movement imparted to the pusher 707 for valve 622 by varying the height of the dog on drum 664. When piston 719 reaches its upper limit, piston-valve member 728 moves downwardly whereupon its valve head 731 permits fluid from passage 735 to flow through a duct 744 to line 643, thence to the lower side of the piston associated with clutch 494 (Fig. 38) to shift it into engagement with gear 490.

Upon release of the force holding valve 622 in its leftward position, fluid from passage 627 forces it and pusher 707 rightwardly opening duct 742 to an exhaust port 745, and thereby exhausting the fluid from between pistons 719 and 728. When this occurs, piston 719 moves downwardly and piston 728 upwardly into abutting relation with rod 725. Upward movement of piston 728 opens duct 744 to an exhaust passage 746 between housing 716 and body 609. Accordingly, the neutralizing mechanism for the piston associated with clutch 494 thereupon shifts said clutch into neutral.

In a similar manner, movement of the pusher element 707 for valve 623 inwardly (Fig. 46) will effect the admission of fluid under pressure after a predetermined time-delay to line 644 (Fig. 38), thence to the top side of the piston associated with clutch 494 to shift said clutch into engagement with gear 492.

A housing 747 identical with housing 716 and containing identical time-delay mechanism is also provided for valves 624 and 625.

Referring to Fig. 42, a plate 748 is attached to the bracket 706 above the valves 610 to 625. The plate 748 is provided with the letters A, B, C and D respectively, above valves 610 to 613, inclusive. A vertically-disposed column 749 including letters A to D is located on plate 748 between valves 613 and 614. Above each valve 614 to 617, inclusive, is a vertical column 750 of four feeds each, that will be established within the feedworks transmission Fm upon the actuation of the correct combination of valves 610 to 613 and 614 to 617. The plate 748 is also provided with the proper designations above the feed-clutch valves 618 to 621, inclusive, and the proper designations above the traverse-clutch valves 622 to 625, inclusive.

Accordingly, the selective actuation of pairs of valves from the groups including valves 610 to 613 and 614 to 617 will provide the sixteen different feeds of which the feedworks is capable, and simultaneous selective actuation of one of valves 618 to 621 will determine the direction in which the head Tm will be fed at the selected speed. Additionally, selective actuation of the valves 622 to 625 will effect the traverse movement of head Tm in either direction along either of its paths of motion.

Selective actuation of valves 610 to 625, inclusive, is adapted to be effected by the step-by-step indexing of function-control drum 654 on which a desired arrangement of dogs 655 is adapted to be made for effecting desired sequential valve actuations.

Referring to Fig. 41, the function-control drum 654 comprises a hollow cylindrical shell 751 in the opposite ends of which spiders 752 are rigidly fixed (only the left-hand spider 752 and its mounting is shown). The spiders 752 are provided with hubs 753 pinned to horizontally-disposed studs 754 that are freely journaled in drilled bosses 755 which latter extend inwardly from plates 694 and 693. The shell 751 is provided with a plurality of circumferentially-disposed series of drilled and tapped holes 756. There may be any desired number of holes 756 in a series, depending upon the size of drum 654, as well as the probable number of functions that may be included in a cycle of operation of the apparatus. In the present embodiment of the invention, thirty tapped holes 756 are provided in each series. Accordingly, drum 654 is adapted to be indexed to thirty separate positions in completing a single revolution.

Dogs 655 are adapted to be secured to the drum 654 by screws that cooperate with holes 756. The dogs include a base portion 757 that extends over at least two holes 756 in adjacent series, and an actuating portion 758 that lies between two holes 756 in adjacent series. The portions 758 are adapted to be aligned with the pushers 707 of valves 610 to 625 for actuating the same upon indexing drum 654. The drum 654 is also provided with circumferentially-arranged series of buttons 759 between valves 613, 614, 617, 618 and 621, 622 for safety reasons. These buttons prevent the incorrect lateral disposition of dogs 655, as well as divide the drum into convenient sections for facilitating its being set.

The dogs 655 are adapted to be pre-set by the operator to provide the sequential operation of the head Tm for performing a cycle of operation upon the successive indexing of the drum 654. Each time a new cycle of operation of head Tm is desired, the dogs 655 are adapted to be rearranged by the operator. This pre-setting of drum 654 is to be distinguished from certain types of automatic machinery in which a predetermined fixed cycle of operation is built into the machine.

*Function-control drum indexing mechanism*

The successive indexing of drum 654 is effected by the indexing mechanism Im (Figs. 41, 42, 47 and 48). Referring to Figs. 41 and 47, the right-hand spider 752 of drum 654 is provided with an integral sleeve 760 to which ratchet wheels 761, 762 and 763 are keyed. The ratchet wheel 761 is employed to index drum 654 in a counter-clockwise direction (Fig. 47); wheel 763 is employed to index the drum in the opposite direction; and ratchet wheel 762 is employed to hold the drum rigidly between indexing movements.

Referring to Figs. 41, 42 and 47, a housing 764 is rigidly fixed to bosses 765, 766 integral with side plate 693. The housing includes a bore 767 (Fig. 47) within which a compound piston mechanism 768 is adapted to be reciprocated. The mechanism 768 includes a piston portion 769 in alignment with ratchet wheel 761. A ratchet head 770 is fixed to the forward end of piston 769 and is adapted to cooperate with ratchet wheel 761 to index the same during its forward stroke. The head 770 is pivoted to piston 769 by a pin 771 to render the same articulate. A bolt 772 passing through an elongated slot 773 in piston 769 and anchored in housing 764 limits the stroke of piston 769. The length of slot 773 is such that the stroke of piston 769 effects a complete index of drum 654. The mechanism 768 also includes a piston 774 that is adapted to abut the piston 769 and to move throughout a stroke of one-half the distance of the stroke of piston 769.

Referring to Fig. 48, housing 764 also includes a bore 775 within which a piston 776 reciprocates. Piston 776 is in alignment with ratchet wheel 763. A ratchet head 777 is pivoted to piston 776 for cooperation with wheel 763. A bolt 778 anchored within housing 764 passes through an elongated slot 779 in piston 776 for limiting its stroke. The length of slot 779 is such that the stroke of piston 776 provides a reverse half index for drum 654.

It is evident from the foregoing that selective admission of fluid to, and exhaust from pistons 769, 774 and 776 will index the drum forwardly a complete index, forwardly a half index and rearwardly a half index, respectively. The forward full index is employed during automatic run, the forward half index for stop and the rearward half index for indexing drum 654 to the position it was in prior to effecting a forward half index.

A rotary valve 780 is provided in the housing 764 for controlling the passage of fluid to pistons 769, 774 and 776. Figs. 47 and 48 show sections of valve 780 at two points along its longitudinal axis. The passages in the section of Fig. 47 control the flow of fluid to pistons 769 and 774, while the passages of the section of Fig. 48 control the flow of fluid to piston 776. The valve 780 is adapted to be rotated by hand in a manner to be described later to four positions disclosed in Figs. 47, 48, 49, 50 and 51. In the position valve 780 is shown in Figs. 47, 48, fluid from the inlet passage 626 (Fig. 41) passes through a duct 781, thence through a passage 782 that includes a recessed portion 783 surrounding a valve 784, thence through the continuation of passage 782 to an annular space 785 and acts upon the mechanism 768 to move it toward the left thereby moving ratchet head 770 away from wheel 761. Movement of valve 784 upwardly permits the fluid under pressure to pass through the bore for valve 784, thence through a passage 786 in housing 764, thence through a duct 787 in valve 780 and in line with passage 786, thence through a continuation of passage 786 to a chamber 788 where it acts on the left-hand face of piston 769 forcing it rightward to effect a full forward index of drum 654. Simultaneously therewith fluid passes from chamber 788 through a line 789 to a housing 790 having a piston mechanism 791 therein. The piston mechanism 791 includes two separate pistons 792, 793 in abutting relation. The fluid from line 789 enters housing 790 between said pistons 792, 793 forcing the former inwardly, whereupon its forward end portion engages head 770 insuring positive cooperation between it and ratchet wheel 761. Additionally, fluid from the space between pistons 792, 793 passes through a duct 794 into a bore 795 containing a compound piston mechanism 796 including a detent-locking mechanism. The mechanism 796 includes two separate piston elements 797, 798 that abut each other and certain faces of each of which, upon being subjected to the pressure fluid, move a detent plunger 799 out of cooperating position relatively to the ratchet wheel 762 against the action of a spring 800.

In order to snub the forward movement of piston 769 and yet to insure that the first portion of the movement is as rapid as possible, the passage 782 enters chamber 785 at a point such that after piston 769 moves rightward a predetermined distance, the exhaust of fluid through passage 782 is cut off and the remainder is forced out through a by-pass 801. The flow through said by-pass is controlled by a ball 802 that is spring urged against a seat having a scratched surface for bleeding the fluid past ball 802.

From the foregoing it is evident that with the apparatus in the position shown in Fig. 47, each time valve 784 is raised, piston 769 will effect a full forward index of drum 654, thereby successively indexing the same and setting up the conditions within the transmission as dictated by the setting of the dogs on said drum.

Valve 784 is raised by an electro-magnet that is energized by an electrical circuit adapted to be completed in response to the position head $T_m$ may assume along its paths of travel. Accordingly, the motion-control drums 656, 657 (Fig. 38) are located adjacent to and parallel with extensions of the shaft 349 and screw 348. Both assemblies for drums 656 and 657 are identical. Only that for drum 657 will be specifically described.

Referring to Fig. 52, drum 657 comprises a pair of discs 803, 804 fixed to a shaft 805 that is journaled in bearings 806, 807 formed in the side walls 692, 695 of the housing for control $C_m$. A circumferentially-disposed series of strips 808 (Figs. 41, 42 and 52) are fixed to discs 803, 804 forming in appearance a squirrel cage arrangement. There are as many strips 808 as there are holes 756 (Fig. 41) in a circuferemential series about drum 654. Each of the strips 808 represents the motion-control factor for a setting incident to an arrangement of dogs 655 along an axial series of holes 756 of drum 654. Contacting elements 658 of rectangular shape and having a slot therein for providing leg portions for straddling the strips 808 are adapted to be securely attached to the strips at any desired place along their length by screws 810. The length of the drums 656 is proportional to the length of travel of head $T_m$ along its respective paths. The specific construction of the motion-control drums may vary. They may be solid cylinders, or hollow cylinders having solid peripheries on either of which peripheries circumferentially-disposed dove-tailed grooves may be provided for receiving contacting elements 658 that are designed to fit said grooves and include locking screws to adjustably fix them at various points along said grooves.

An extension of screw 348 is journaled in bearings formed on the side walls of the housing for control $C_m$. This extension is provided with screw threads, the pitch of which is such that the movement of a nut 811 thereon is proportional to the movement of the head $T_m$ along its horizonaal path. The nut 811 is guided by two rods 812, 813 (Fig. 42) parallel to the extension of screw 348. The nut is provided with a removable finger portion 815 that is located in a plane through which each of the strips 808 must pass. It is adapted to cooperate with the dogs 658 on each strip as said strip is positioned in alignment with finger 815. The finger 815 is connected to nut 811 by dowel pins and screws so that it may readily be removed for a purpose to be described later.

From the foregoing, it is evident that the movement of nut 811 follows the movement of head $T_m$ along its horizontal path and that the dogs 658 that cooperate with nut 811 determine the distance head $T_m$ moves along said path. When nut 811 and a dog 658 engage, the circuit of the solenoid for the valve 784 is adapted to be completed for effecting indexing of drum 654. For this purpose, drum 657 is mounted for slight axial movement from either side of a neutral position to which said drum returns instantly upon release of the force that moves it from said neutral position. This slight movement of drum 657 is adapted to effect making the circuit of the solenoid for valve 784 (Fig. 47). Referring to Fig. 52, the right-hand end of shaft 805 is stepped to provide shoulders 816, 817 and a threaded end 818. A housing 819 is screwed into wall 695 forming a chamber 820 around the stepped end of shaft 805. A pair of collars 821, 822 are loosely mounted on a portion 823 of shaft 805 between shoulders 816 and 817. A nut 824 is screwed to the threaded end 818 of shaft 805 and it abuts against shoulder 817. The abutting surface of nut 824 also serves to support collar 822. A spring 825 is mounted on portion 823 of shaft 805 between collars 821 and 822. The construction and arrangement of the foregoing parts are such that slight axial movement of drum 657 to either side of a neutral position may be effected and drum 657 will instantly return to said neutral position upon release of the force that moves it.

Referring to Figs. 52, 53 and 54, the nut 824 is provided with a spool portion 826 that engages a finger 827 of an oscillatable element 828. The element 828 is pivoted by a pin 829, and the end of said element opposite that which contains finger 827 is provided with a V-slot 830 (Fig. 54) that is adapted to cooperate with a knife-edge 831 on an oscillatable lever 832. The lever 832 is pivoted by a pin 833 and is of a length sufficient to amplify the motion transmitted to it by the slight oscillatable movement of element 828. In the present instance the slight movement of element 828 that is imparted to lever 832 is multiplied ten times and transmitted to a push button 834 that contacts a button 835 of a micro-switch 836. Switch 836 is a commercial item and effects making of the circuit of the solenoid for valve 784 upon a very slight movement (.001") of button 835. It is evident from the foregoing that a very slight movement of drum 657, theoretically .0001", will effect energization of the solenoid for valve 784 and cause drum 654 to be indexed.

Drum 656 is identical with, mounted, constructed and arranged in the same manner as drum 657. Drum 656 responds to the movement of head $T_m$ along its vertical path. A similar movement multiplying linkage is provided for drum 656 and it likewise cooperates with micro-switch 836 for energizing the circuit of the solenoid for valve 784. Only one switch 836 is required in the present embodiment because the machine tool is designed such that during automatic operation, head $T_m$ moves along either of its paths but not both simultaneously.

As previously mentioned, each axial row of holes 756 on drum 654 has a corresponding strip 808 on drums 656 and 657. Therefore, a definite phase relation must be maintained between all three drums. Accordingly, they are adapted to be indexed simultaneously from station to station about their respective axes. Referring to Figs. 41 and 52, a bevel gear 837 pinned to stud 754 to which boss 753 is pinned is adapted to mesh with a bevel gear 838 formed on one end of a sleeve 839 that is pinned to a stub shaft 840 journaled in a bearing 841 formed in wall 695. The end of sleeve 839 opposite bevel gear 838 is provided with a spur gear 842 that meshes with idler gears 843, 844. Idler gears 844, 843 mesh with gear 845 and a gear similar to gear 845, each of which is pinned to the shaft to which its drum 657 or 656 is fixed, respectively. Idler gears 844, 843 are wide enough to remain in mesh with gear 845 and said similar gear associated with drum 656 even when said drums are moved axially a slight amount. An indicator disc 846 is fixed to the end of shaft 840. It contains indices that register with a fixed pointer for indicating at any time the of row longitudinally-aligned holes 756 that are in alignment with the pusher elements 707 of valves 610 to 625, inclusive.

The structure of the control Cm so far described effects automatic operation of the head Tm along its intersecting paths. Certain characteristics of this structure are well worth noting, among which include, the function-control drum 654 is adapted to be indexed from station to station by a source of power separate from that developed by the movement of head Tm; that this separate source of power is, however, rendered effective in response to the movement of head Tm; that the motion-control drums 656 and 657 are adapted to be indexed simultaneously with drum 654 and are provided with separate portions each corresponding to a portion of drum 654; that the cooperation between nuts 811 and dogs 658 is such that instantly upon contact between the two, the dogs 658 are adapted to be moved out of cooperating position relatively to nuts 811; and that the combination of the simultaneously movable drums 654, 656, 657 and the instantaneously operable micro-switch 836 provides an arrangement whereby the head Tm may be moved along the same path for different distances in a cycle of operation without affecting the setting of the control to repeat the cycle of operation.

The control Cm not only effects automatic operation of the machine tool, but also permits manual operation at any time, even during an automatic cycle of operation without disturbing the setting of the control for said automatic cycle of operation. Referring to Figs. 47 to 51, inclusive, valve 780 is adapted to be rotated to four positions, namely, that shown in Figs. 47, 48 and those shown in Figs. 49, 50 and 51. With valve 780 in the position shown in Fig. 49 and valve 784 in its upper position, fluid from line 626 passes into duct 786, thence around a recess 847 in valve 780, thence through a passage 848, into the chamber in which piston 774 is located, and acts on the left-hand face of said piston, forcing it and piston 769 rightward. A wall 849 is provided in the chamber for piston 774 that limits its stroke to a distance such that head 770 indexes drum 654 forwardly only a half index thereby moving the dogs 655 out of radial alignment with the pusher elements 707 for valves 610 to 625, inclusive. Accordingly, this forward half-index will effect stopping of head Tm. The forward half-index, however, will become effective only upon raising valve 784. Therefore, should valve 780 be moved to the position shown in Fig. 49 while an operation is being performed, nothing will occur until said operation is completed at which time cooperation between a nut 811 and a dog 658 (Fig. 52) will effect energization of the solenoid for valve 784. When pressure fluid is admitted to the left-hand face of piston 774, it also passes through a line 850 into the bore for piston mechanism 791, forcing pistons 792 and 793 inwardly to insure head 770 properly engaging ratchet 761. Additionally, pressure fluid from line 850 passes through a duct 851 to the bore for piston mechanism 796, forcing detent plunger 799 outwardly to release ratchet wheel 762. In order to snub the forward motion of piston 774, a vent 852 is provided in the chamber for piston 774 at a point such that a small quantity of air will be trapped in the chamber for said piston to cushion its action. Instantly upon moving drum 654 forwardly a half index to stop head Tm at the end of the movement it is undergoing at the time, the dog 658 that cooperated with the nut 811 for completing the solenoid circuit moves out of cooperating position with nut 811 permitting the drum 657 or 656 to return to neutral position thereby opening the solenoid circuit and permitting valve 784 to move to its lower position under the influence of a spring 853.

The valve 780 is adapted to be moved to the position shown in Fig. 50 when it is desired to repeat the last preceding operation of head Tm. The position shown in Fig. 50, however, will be effective only after the apparatus has been stopped by first setting valve 780 in the position shown in Fig. 49 or that shown in Fig. 51, to be described later. Referring to Figs. 47 and 48, wherein the valve 780 is shown in position for automatic run, the tooth of head 777 is in a midway position between adjacent teeth of ratchet wheel 763 and reciprocation of piston 776 will not be effective to index drum 654. However, when forward half index of drum 654 has been effected by moving valve 780 to the position shown in Fig. 49, the relation between the teeth of wheel 763 and head 777 will be that shown in dotted lines (Fig. 48). Since valve 784 is in its lower position as described in connection with the stopping of head Tm by a forward half index of drum 654, fluid will not pass through ducts 786 and 787, but will pass from passage 781 through ducts 854, 855 into a passage 856 (Figs. 48, 50), thence through duct 857, thence through a passage 858 (Fig. 50), thence through a continuation of duct 857 to the bore for piston 776. The pressure fluid passes from the bore of piston 776 through a line 859 to the bore of a piston mechanism 860 and forces the head 777 into cooperating engagement with ratchet wheel 763. Additionally, pressure fluid from mechanism 860 passes through a line 861 (Fig. 47) to the piston mechanism for withdrawing detent piston 799 to release ratchet wheel 762. Accordingly, with valve 780 having been first moved to the position shown in Fig. 49 to effect automatic stop by a forward half index of drum 654 and then turned to the position shown in Fig. 50, piston 776 will move forwardly, piston mechanism 860 will force head 777 into engagement with a tooth of wheel 763 and detent piston 799 will release ratchet wheel 762, simultaneously, thereby effecting a reverse half index to drum 654 and causing a repetition of the function performed incident to the setting of said drum in its last preceding position.

When for any reason it is desired instantly to stop the transmission of power to head Tm, such, for example, when a tool breaks or inspection of work is desired, it is only necessary to move valve 780 to the position shown in Fig. 51, whereupon pressure fluid passes from duct 782 through passage 787, across recess 847, thence through duct 848, into the bore for piston 774, through line 850 to the bore of piston mechanism 791, thence through passage 851 to piston detent 799. When this occurs, drum 654 is given a forward half index effecting the immediate stopping of head Tm. Obviously, positioning valve 780 in the position shown in Fig. 50 after having positioned it as shown in Fig. 51, will effect reverse half index to drum 654 and re-start the apparatus from where it left off when it was instantly stopped by positioning valve 780 as shown in Fig. 51.

The valve 780 is provided with an exhaust passage 862 that extends from a point in line with duct 848 to the outside of valve 780 emptying into the housing for control Cm. The exhaust passage 862 is adapted to exhaust pressure fluid from piston 774 in the position shown in Fig. 47, and to exhaust pressure fluid from piston 769 in the positions shown in Figs. 49, 50 and 51. The valve 780 is also provided with exhaust passages 863 and 864 that extend from a point within valve 780 in the plane containing passage 857 (Fig. 48) to the outside of said valve, emptying into the housing for control Cm. Passage 863 exhausts pressure fluid from piston 776 when valve 780 is in the positions shown in Figs. 48 and 49. When valve 780 is in the position shown in Fig. 50, pressure fluid is, of course, supplied to piston 776. Passage 864 exhausts pressure fluid from piston 776 when valve 780 is in the position shown in Fig. 51. Referring to Figs. 47 and 42, valve 780 is provided with a gear 865 that meshes with a gear 866 on a shaft 867. Gear 866 meshes with a gear 868 fixed to a shaft 869. Referring to Fig. 42, shaft 869 extends throughout the length of the housing for control Cm and is provided with a crank 870 on the outside of said housing. Indices are located on the outside of said housing for indicating the four described positions to which valve 780 is adapted to be moved.

The present embodiment of the invention includes means for manually controlling the movement of head Tm independently of the automatic control comprising drums 654, 656 and 657. In fact, by removing the fingers 815 from nuts 811, or by causing a forward half index of drum 654, the apparatus may be operated manually without affecting a predetermined setting on drums 654, 656 and 657.

Referring to Figs. 43 and 55, bracket 706 is provided with flanges that support four shafts 871, 872, 873 and 874. The shaft 871 includes an actuator 875 (Fig. 55) that is adapted normally to lie between abutments on the pusher elements 707 for valves 610, 611, 612 and 613. The pusher 707 for valve 610 includes an inverted L-shaped lug 876 and pusher 707 for valve 611 includes a lug 877 in line with the horizontal arm of L-shaped lug 876. Accordingly, upon movement of actuator 875 to the left (Fig. 55) oscillatable movement in one direction actuates valve 610 and in the other direction actuates valve 611. Similarly, pusher 707 for valve 613 includes an inverted L-shaped lug 878, while element 707 for valve 612 includes a lug 879. Upon movement of actuator 875 to the right (Fig. 55), oscillatable movement in one direction actuates valve 612, and in the other direction actuates valve 613. In a like manner, shaft 872 includes an actuator 880 that is adapted to cooperate with lugs 881, 882, 883 and 884 on pushers 707 for valves 614, 615, 616 and 617, respectively.

Shaft 873 is provided with an actuator 885 that is adapted to cooperate with lugs 886, 887 on pushers 707 for valves 618, 619, respectively. Shaft 873 also includes an actuator 888 that is adapted to cooperate with lugs 889, 890 on pushers 707 for valves 622 and 623, respectively. Similarly, shaft 874 includes an actuator 891 that is adapted to cooperate with lugs 892 and 893 on elements 707 for valves 620 and 621, respectively. Additionally, shaft 874 includes an actuator 894 that is adapted to cooperate with lugs 895 and 896 on elements 707 for valves 624 and 625.

Referring to Fig. 52, shafts 871 and 872 are provided with handles 897, 898 and a chart 899 that indicates the axial and oscillatable positions in which these shafts must be placed to establish the sixteen feeds of the feedworks transmission Fm. Shafts 873 and 874 are provided with cranks 900, 901. Pushing shaft 873 inwardly and oscillating it by crank 900 will effect movement of head Tm along its vertical path at a feed rate depending upon the setting of shafts 871, 872. Pulling shaft 873 outwardly will effect vertical traverse movement of head Tm when its crank 900 is oscillated. Pushing shaft 874 inwardly and oscillating crank 901 will effect movement of head Tm along its horizontal path at a feed rate depending upon the setting of shafts 871 and 872. Finally, pulling shaft 874 outwardly and oscillating crank 901 will effect horizontal traverse of head Tm.

Referring to Figs. 43, 56 and 57, the dogs 655 on drum 654 for effecting shifting of the feed gears are of slightly different design than those for shifting the feed and traverse clutches. In Fig. 56, the feed-gear dogs 655 are shown. They are of rectangular construction such that upon a forward half index of drum 654 prior to repeating an operation, the feed gears remain in mesh. Additionally, when the same gear combination is desired for successive operations in a cycle, employing the feed-gear dogs as shown in Fig. 56 at successive points on drum 654 retains in engagement the same gear combination during indexing of said drum. In Fig. 57, the feed and traverse clutch dogs 655 are shown in which they are beveled off so that upon any indexing of drum 654 said clutches are instantly neutralized. Referring to Fig. 57A, it is noted that the type of dog 655 that is employed on the drum 654 for closing switches 688, 689 (Figs. 38 and 39) is such that the push buttons of said switches are depressed for only an instant and then released. Each of the switches includes a time-delay circuit that remains effective for a short interval of time after release of its push button switch, for a purpose to be described later.

The control Cs is substantially identical with the control Cm. It is adapted to be set for selectively and automatically controlling the movements of turret Ts, as well as to permit manual operation thereof without affecting the automatic setting of control Cs, all in the same manner as control Cm is adapted to control turret Tm.

Electrical inter-control

Referring to Fig. 58, closing main switch 902 and push button 903 energizes solenoid 904 thereby effecting the closing of switch F and the opening of switch R' against the action of spring 905. Closing of switch F causes the motor M to rotate in a forward direction. The motor M supplies the power for the headstock H (Fig. 3) and the feedworks Fm and Fs (Fig. 1). The switch F includes a contact 906 that likewise closes upon the energization of the solenoid 904. The contact 906 provides a holding circuit for the solenoid 904 upon the subsequent release of the push button 903. This holding circuit passes from line L3 through the solenoid 904, thence the conductors 907, 908, 909, 910, switch 906 and line L2. A primary element 911 of a transformer is connected across the lines $L_3$ and $L_2$ through the switch F. Accordingly, upon the closing of switch F, the primary 911 is energized and impresses a voltage on its secondary 912. Both the primary and secondary currents are employed in the control circuit as will be evident from the following description.

With the switches 902 and F closed, closing of push button 913 permits current to flow from the line $l_1$ of the secondary circuit through a conductor 914, solenoid 915, push button 913, a normally closed switch 916, another normally closed switch 917, thence to line $l_2$. Accordingly, solenoid 915 is energized closing a block switch 918. Closing of block switch 918 causes current to flow from line $l_1$ through a solenoid 919, switch 918, thence to line $l_2$, energizing solenoid 919 and closing a switch 920. Switch 920 is in the primary circuit of the transformer and upon its closing, a solenoid 921 is energized and lifts the valve stem 784 (Fig. 47) to effect a forward index of the function drum 654. At the same time, a switch 922 associated with switch 918 is also closed, effecting the energization of a solenoid switch 923, thereby energizing a solenoid 924 to effect raising of a valve stem 925 of the indexing mechanism $I_3$ to effect a forward index of function drum 678. Accordingly, upon the closing of the push button 913, both function-control drums 654 and 678 are indexed. Simultaneously with the indexing of drums 654 and 678, motion-control drums 656, 657 and 679, 680 for the drums 654 and 678, respectively, are likewise indexed. Depending upon the arrangement of dogs on the function-control drums 654 and 678, the turrets $T_m$ and $T_s$ are adapted to be moved along either of their paths of travel at a selected speed for a distance dictated by the arrangement of the dogs on the drums 656, 657, 679 and 680. Upon the completion of the selected movement of the heads $T_m$ and $T_s$, one of the drums 656, 657 and one of the drums 679, 680 are adapted to be moved a slight amount as previously described. Such slight movement of these drums effects the closing of switches 836 and 929. Upon the closing of switch 836, current is adapted to flow through the solenoid 919, closing switch 920, effecting energization of solenoid 921, raising valve stem 784 and initiating another index of drums 654, 656 and 657. Likewise, closing switch 929 effects another index of drums 678, 679 and 680. In this new index position of the drums, the heads $T_m$ and $T_s$ may be moved, depending upon the setting of the dogs on such drums, along the same or different paths at the same or different speeds for the same or different distances, and upon the completion of such selected motion, drums 654, 656, 657 and drums 678, 679, 680 are adapted again to be indexed.

Should the movement of the drums 656, 657, 679, 680 fail to close switches 836 and 929, or upon closing them, drums 654 and 678 are not indexed, normally closed switches 930 and/or 931 will be opened. These switches are shown diagrammatically in Fig. 58. They are actually located in juxtaposition with switches 836 and 929. Opening of switches 930 and/or 931 will de-energize solenoid 904, whereupon spring 905 effects opening of switch F and closing of switch R', thereby reversing the flow of current to the motor M, tending to reverse its rotation. A zero speed switch 932 is located in the circuit of switch R' and upon motor M stopping, and prior to its reversing its rotation, said switch 932 automatically opens, thereby stopping the entire machine. This construction is a safety feature insuring substantially instantaneous stopping of the main motor in the event the heads $T_m$ and $T_s$ move beyond pre-selected points in their paths of travel.

The function-control drums 654 and 678, together with their respective motion-control drums 656, 657 and 679, 680, are adapted successively to be indexed from station to station performing a cycle of operation of the machine in accordance with the pattern set up by the various dogs on said drums. Upon the initiating of a cycle of operation by closing push button switch 913, normally closed switches 916 and 917 are adapted to be opened upon the first index of each function-control drum 654 and 678 and to remain upon until the drums have completed a single revolution, whereupon they are adapted to close. This function is effected by the discs 933 and 934 that rotate with the drums 654 and 678. These discs are each provided with a groove within which stems of switches 916 and 917 normally rest. Upon the initial indexing of drums 654 and 678 at the beginning of a cycle of operation, discs 933 and 934 open the switches 916 and 917 and maintain them in their open positions during the complete revolution of said function-control drums. This arrangement renders the circuit for push button switch 913 open during a cycle of operation, so that inadvertent closing thereof during a cycle of operation will have no effect.

When it is desired to index either the heads $T_m$ or $T_s$, it is only necessary to insert a dog beneath the desired switch 686 or 687. Closing of switch 686 causes current to flow from line $l_2$ through a conductor 935, thence through switch 686, conductor 936, motor 379, thence to line $l_1$, whereupon motor 379 begins to rotate. Near the end of a single revolution of the indexing mechanism which effects a single index of the turret $T_m$, two switches 937 and 938 are closed. Closing switch 938 causes current to flow from line $l_2$ through switch 938, thence through solenoid 919 to line $l_1$. Accordingly, switch 920 is closed and drum 654 is indexed to the next succeeding station. However, if the motor 379 does not continue to rotate for a few degrees more, switch 938 will remain closed and maintain solenoid 921 continuously energized. To overcome this the switch 937 has been provided, which upon closing, maintains current flowing through the motor 379 for sufficient time to cause said motor to move the switch contacts for both switches 937, 938 out of engagement, whereupon the circuit for the motor 379 is re-set for subsequent actuation. Manual indexing of the turret $T_m$ may be effected by closing push button 939 and holding it closed until both switches 937 and 938 have been closed.

In a similar manner, the turret $T_s$ may be indexed at any selected point in the cycle of operation of the turret by locating dogs on the drum 678 beneath the switch 687. It may also be indexed manually by closing a push button switch 939'.

Each of the controls $C_m$ and $C_s$ is adapted to initiate the activity of the headstock control $C_h$. Accordingly, placing dogs on drums 654 and 678 at selected points about their peripheries in line with the switches 688 and 689 will effect the operation of the control $C_h$. As previously described, the dogs that are employed to actuate the switches 688 and 689 effect only an instantaneous closing thereof when drums 654 and 678 are indexed to the station containing said dogs. The switches 688 and 689 are provided with time-delay mechanisms which retain them closed for about one second, or sufficient time to permit the motor 269 to begin rotating. At the beginning of the rotation of motor 269, disc 270' closes the switch 270 which holds the circuit for the motor 269 to insure a complete revolution of the indexing mechanism for drum 250 to thereby index said drum from one station to another and to break the circuit for said motor at the completion of such indexing.

Switches 690 and 691 are included within the circuit of the switches 918 and 922 constituting a block for the controls Cm and Cs. This arrangement enables the stopping of one of the heads Tm or Ts for a predetermined length of time while the other continues to operate and after said predetermined length of time to re-start the one that is inactive. Discs 941 and 942 are associated with each of the drums 654 and 678. They are adapted to support pins 943 at adjusted positions thereabout. The pins 943 are adapted to be located at the stations designated for stopping the operation of the control Cm or Cs. In other words, locating a pin 943 in line with a station of the drum 654 containing no dogs thereon will effect stopping of the turret Tm and simultaneous closing of the switch 690. Turret Ts may continue to function for any predetermined time interval and when it is desired to effect re-starting of the movement of turret Tm, another pin 943 is adapted to be located in position to close switch 691. With the turret Tm stopped and the turret Ts functioning, closing of switch 691 permits current to flow from line l₁ through conductor 914, solenoid 915, switch 690, switch 691, thence to line l₂, thereby energizing solenoid 915 and closing switches 918 and 922. Upon closing of the latter switches, solenoids 919 and 923 are energized, thereby effecting the energization of the solenoids 921 and 924, hence the indexing of drums 654 and 678 to the next station, whereupon both heads Tm and Ts move in accordance with the arrangement of dogs on drums 654 and 678 at that station.

From the foregoing it is evident that either of the turrets Tm or Ts may be operated completely independently of the other. That is to say, either may be operated throughout an entire cycle without requiring the operation of the other. Furthermore, both of said turrets Tm and Ts may be operated simultaneously in or out of phase with respect to each other. Either turret Tm or Ts may be started in response to the operation of the function-control drum of the other turret. Additionally, the headstock control Ch for effecting the change in rotation of the table W may be rendered effective by the function-control drum for either of the heads Tm or Ts. While both heads Tm and Ts are operating simultaneously, one may stop while the other continues to operate for a predetermined length of time, at the end of which the one that is inactive may be automatically re-started. Finally, should either of the heads Tm or Ts move beyond the points in their paths of travel as dictated by any setting of either control mechanism, either switch 930 or 931 will be opened causing the main motor M to be instantly stopped.

Inasmuch as high-pressure fluid-operated means is employed for actuating the gear-shifting mechanism throughout the various transmissions, pressure switches 944 and 945 are located in the main circuit including conductor 907. The switches 944 and 945 are for the respective controls Cm and Cs. Should the fluid pressure in either of these controls fall below a predetermined point, the current for the main motor M will be interrupted, and said motor stopped instantly. A normally closed push-button switch 946 is provided in the circuit for motor M, which upon being opened effects instant stopping thereof.

*Operation*

In order to more clearly illustrate the automatic nature of the apparatus, a description will be given of a cycle of operation of the apparatus for producing a series of operations on a relatively simple work piece.

Referring to Fig. 59, a work piece X is chucked to table W. It comprises a casting of stepped cylindrical form having a cored passage therethrough. The work piece X is adapted to be finished by facing its upper horizontal surface, counterboring to a depth 947, machining its outer peripheries, facing surface 948 and forming a groove 949 in its outer periphery.

Referring to Figs. 63, 64 and 65, drums 250, 654, 656, 657, 678, 679 and 680 are shown in developed form and pre-set to effect a cycle of operation of the apparatus to produce the above-described result.

As previously described, closing switch 913 (Fig. 58) energizes solenoid 915, closing switches 918, 922, which in turn energize solenoids 921, 924 to effect the indexing to station No. 1 (Figs. 63 and 64) of drums 654 and 678, together with their respective motion-control drums. Referring to Figs. 63 and 38, station No. 1 of drums 654, 656 and 657 includes a dog 655 beneath that portion of plate 748 that designates vertical down traverse (valve 622, Fig. 38), a dog 655 in position to effect a headstock gear shift by actuating switch 688 (Fig. 38) and a dog 656 on drum 656 at a predetermined point in the downward travel of head Tm (below the starting point Y, Fig. 59) at which it is desired to change from down traverse to down feed. The dog 655 that actuates switch 688 causes drum 250 (Fig. 65) to be indexed to its station No. 1, where shoes 255 thereon actuate valves 171, 174 and 176 thereby to set up a definite gear combination in the headstock H (Fig. 40) for rotating table W at a predetermined relatively high speed commensurate with the boring operation.

When nut 659 contacts dog 658 at station No. 1 of drum 656, said drum is moved slightly leftward thereby closing switch 836 (Fig. 58) and effecting indexing of drums 654, 656 and 657 to station No. 2 (Fig. 63). Station No. 2 of these drums includes dogs set to effect a downward feed of head Tm at a rate of .021 inch per revolution of table W (by actuating valves 611, 616 and 619, Fig. 38). This feed continues to a point in the downward travel of head Tm such that boring tool 950 (Fig. 59) counterbores the work piece X to the depth 947. When tool 950 reaches depth, nut 659 engages a dog 658 at station No. 2 on drum 656 effecting indexing of drums 654, 656 and 657 to station No. 3.

The counterboring operation is relatively long, and during this operation numerous other functions are performed by the side head Hs. Both drums 654 and 678 are indexed to their No. 1 station simultaneously. Station No. 1 for drum 678 includes a dog 681 that initiates a horizontal "in-traverse" of head Ts (by actuating valve 677, Fig. 39) to a predetermined point represented by the location of dog 683 on drum 679. Upon contact between nut 684 and dog 683, drums 678, 679 and 680 are indexed to station No. 2 where dogs 681 on drum 678 effect an "in-feed" of head T$_s$ at a rate of 0.15 inch to locate tool 951 accurately for turning the periphery 952 (Fig. 59). When tool 951 has reached this location, nut 684 engages a dog 683 at station No. 2 of drum 679 effecting another index of drums 678, 679 and 680 to station No. 3.

Station No. 3 of these drums contains dogs that effect downward feeding of head T$_s$ at .015 inch (by actuating valves 663, 667 and 671, Fig. 39) to the surface 948 of work W, at which point nut 685 engages dog 682 on drum 680 thereby effecting indexing of drums 678, 679 and 680 to station No. 4.

Station No. 4 of drum 678 contains a dog for effecting an upward traverse of head T$_s$ (by actuating valve 675, Fig. 39) until nut 685 engages dog 682 at station No. 4 of drum 680 whereupon drums 678, 679 and 680 are indexed to station No. 5.

Station No. 5 of drum 678 includes a dog 681 for effecting an outward traverse movement of head T$_s$ (by actuating valve 676, Fig. 39) to a point where nut 684 engages a dog 683 at station No. 5 of drum 679 whereupon drums 678, 679 and 680 are indexed to station No. 6.

The operations performed by head T$_s$ for the first five stations of drums 678, 679 and 680 require substantially less time than it takes to complete the counterboring operation with tool 950 of head T$_m$ and it is desirable to stop the operation of head T$_s$ until head T$_m$ finishes said counterboring operation. Therefore, station No. 6 of drum 678 includes a dog 681 that closes the blocking switch 691 (Fig. 58), and since no other dogs are located at this station the head T$_s$ stops.

Upon completion of the counterboring operation by head T$_m$, drums 654, 657 and 656 are indexed to station No. 3 as previously explained. Station No. 3 of drum 654 includes a dog 655 that effects upward traverse of head T$_m$ (by actuating valve 623, Fig. 38) to a point where nut 659 engages a dog 658 at station No. 3 of drum 656. When this occurs, drums 654, 656 and 657 are indexed to station No. 4. Station No. 4 of drum 654 includes a dog 655 for effecting indexing of turret T$_m$ to bring tool 953 into operative position (Fig. 60), by closing switch 686 (Fig. 58). Drum 654 also includes a dog 655 at station No. 4 for shifting the gears of headstock H by actuating switch 688, thereby effecting indexing of drum 250 to station No. 2. Station No. 2 of drum 250 contains shoes for actuating valves 171, 174 and 176—the same as those at station No. 1. The reason that station Nos. 1 and 2 of drum 250 contain the same shoe arrangement is that there are eight stations on drum 250, while only three changes of speed of headstock H are required for the job under consideration, and the repetition of station Nos. 1 and 2 provides four gear changes—an even quotient of eight. By so doing, two series of four changes each can be perfectly arranged on drum 250, permitting successive rotations thereof and keeping the three speed changes in phase with successive cycles of operation as dictated by the setting of drums 654 and 678.

Upon completion of turret indexing of head T$_m$, switch 938 (Fig. 58) is closed causing indexing of drums 654, 656 and 657 to station No. 5 where a single dog 655 is located closing blocking switch 690 (Fig. 58), whereupon drums 654, 657 and 656 are indexed to station No. 6, and simultaneously drums 678, 679 and 680 are indexed to station No. 7.

Station No. 6 of drum 654 contains a dog 655 effecting horizontal out-traverse of head T$_m$ to a point where nut 660 engages dog 658 at station No. 6 on drum 657 whereupon drums 654, 657 and 656 are indexed to station No. 7. The extent of this traverse motion places the tool 953 outwardly beyond the outer periphery of work X.

Station No. 7 of drum 654 contains a dog 655 effecting down traverse of head T$_m$ to a point where nut 659 engages a dog 658 at station No. 7 on drum 656, whereupon drums 654, 656 and 657 are indexed to station No. 8.

Station No. 8 of drum 654 contains dogs 655 for effecting down feed of head T$_m$ at a rate of .042 inch to a point accurately locating tool 953 relatively to the top surface of work X, at which point nut 659 engages dog 658 at station No. 8 of drum 656 effecting indexing of drums 654, 656 and 657 to station No. 9.

Station No. 9 of drum 654 includes dogs 655 for causing head T$_m$ to feed inwardly toward the center of the table W at a rate of .01 inch for facing said top surface, and this feed is continued beyond the extent of said surface until the center of head T$_m$ is vertically aligned with the starting point Y, whereupon nut 660 engages dog 658 at station No. 9 on drum 657 thereby effecting indexing of drums 654, 656 and 657 to station No. 10.

Station No. 10 includes a dog 655 on drum 654 that effects upward traverse of head T$_m$ to a point where nut 659 engages a dog 658 at station No. 10 on drum 656, whereupon drums 654, 656 and 657 are indexed to station No. 11.

Station Nos. 11, 12 and 13 contain dogs that effect three successive indexes of the turret of head T$_m$ to locate boring tool 950 in position to operate on the next succeeding work piece.

Station Nos. 14 to 29, inclusive, contain dogs that alternately effect downward and upward traverse of head T$_m$ and dogs 658 are located at station Nos. 14 to 29, inclusive, on drum 656 to limit these traverse movements to a small amount. The arrangement is merely employed to use up those stations of drums 654, 656 and 657 which are not required for the relatively simple job under consideration.

When nut 659 engages a dog 658 at station No 29 on drum 656, drums 654, 656 and 657 are indexed to station No. 30 at which no dogs are provided, whereupon the activity of head T$_m$ ceases until the next cycle of operation is initiated.

During the time that the above-described functions are being performed, head H$_s$ is performing different functions as follows:

Station No. 7 of drum 678 contains two dogs 681, namely, one for effecting in-traverse movement of the head T$_s$, and one for effecting a change in speed of the work table W by actuating switch 689 (Fig. 58). Since the operation of head T$_s$ at station No. 7 of drum 678 occurs at the same time as the operation of head T$_m$ due to dog 655 at station No. 6 of drum 654, a headstock gear shift may be made because both operations of heads T$_m$ and T$_s$ are traverse operations.

Actuation of switch 689 (Fig. 58) by the dog 681 at station No. 7 of drum 678 causes drum 250 (Fig. 65) to be indexed to station No. 3. Station No. 3 of drum 250 contains shoes 255 that actuate valves 170, 173 and 178 (Fig. 40) thereby setting up a gear combination within the headstock H to produce an intermediate speed of rotation of the table W necessary for machining the surface 948 and the outer periphery of the work piece X. Inward traverse of the head T₈ continues until dog 683 at station No. 7 of drum 679 is engaged by nut 684, whereupon drums 678, 679 and 680 are indexed to station No. 8.

Dogs 681 are located at station No. 8 of drum 678 to effect a downward feed of head T₈ at the rate of .166 inch to locate tool 951 accurately for machining surface 949 of the work piece X. When the tool 951 reaches such accurate position in its downward travel, nut 685 engages a dog 682 at station No. 8 on drum 680 to effect indexing of drums 678, 679 and 680 to station No. 9.

Station No. 9 of drum 678 includes a dog 681 arranged to provide an inward feed of head T₈ at a rate of .042 inch to the periphery 952 at which point nut 684 engages a dog 683 at station No. 9 of drum 679, whereupon drums 678, 679 and 680 are indexed to station No. 10.

Station No. 10 of drum 678 includes a dog 681 arranged to effect outward traverse movement of the head T₈ to a point where nut 684 engages a dog 683 at station No. 10 on drum 679. Such engagement effects indexing of drums 678, 679 and 680 to station No. 11.

Station No. 11 of drum 678 includes a dog 681 arranged to provide an in-feed of head T₈ at a rate of .008 inch to accurately locate tool 951 for machining the outer periphery of the work piece X. When tool 951 arrives at this accurate location, nut 684 engages a dog 683 at station No. 11 on drum 679 thereby effecting indexing of three drums to station No. 12.

Station No. 12 of drum 678 includes dogs 681 arranged to effect a downward feed of head T₈ at the rate of .003 inch to turn the outer periphery of the work piece X. At the completion of such turning, nut 685 engages a dog 682 at station No. 12 of drum 680 effecting indexing of three drums to station No. 13.

Station No. 13 of drum 678 includes dog 681 for effecting upward traverse movement of the head T₈ to a point where nut 685 engages a dog 682 at station No. 13 on drum 680, whereupon said drums are indexed to station No. 14.

Station No. 14 of drum 678 includes a dog 681 arranged to effect outward traverse of the head T₈ to a point where nut 684 engages a dog 683 at station No. 14 of drum 679 when said drums are indexed to station No. 15.

Station Nos. 15 and 16 of drum 678 include dogs for effecting two successive indexes of the turret of head T₈ to thereby present the grooving tool 954 in cooperative position relative to the work piece X (Fig. 62). Upon completion of the second indexing of the turret of head T₈, drums 678, 679 and 680 are indexed to station No. 17.

Station No. 17 of drum 678 includes a dog 681 for effecting downward traverse of the head T₈ to a point where nut 685 engages a dog 682 at station No. 17 of drum 680 whereupon said drums are indexed to station No. 18.

Station No. 18 of drum 678 includes dogs 681 arranged to effect a downward feed of head T₈ at .042 inch for accurately locating grooving tool 954 to perform the grooving operation on the work piece X. When tool 954 arrives at such accurate location, nut 685 engages a dog 682 at station No. 18 of drum 680, whereupon said drums are indexed to station No. 19.

Station No. 19 of drum 678 includes dogs 681 arranged to provide an inward feeding movement of head T₈ at the rate of .003 inch for effecting said grooving operation. When tool 954 has formed the groove to the desired depth, nut 684 engages a dog 683 at station No. 19 of drum 679 thereby effecting the indexing of the three drums to station No. 20.

Station No. 20 of drum 678 includes a dog 681 for effecting outward traverse movement of the head T₈ to a point where nut 684 engages a dog 683 at station No. 20 of drum 679, whereupon said drums are indexed to station No. 21.

Station No. 21 of drum 678 is provided with a dog 681 for effecting upward traverse movement of the head T₈, and also a dog for effecting the shifting of gears in the headstock H to provide a low chucking speed of table W. When head T₈ is moved upwardly so that the center thereof is substantially at the starting point Z, nut 685 engages a dog 682 at station No. 21 of drum 680 thereby effecting indexing of the drums to station No. 22.

Station Nos. 22 and 23 of drum 678 include dogs 681 for effecting two successive indexes of the turret of head T₈, whereupon the tool 951 is positioned for performing the first operation on a succeeding work piece. Upon completion of the second turret indexing, drums 678, 679 and 680 are indexed to station No. 24.

Station Nos. 24 to 29, inclusive, contain dogs that alternately effect inward and outward traverse movement of head T₈ and dogs 682 are located at station Nos. 24 to 29, inclusive, on drum 679 to limit these traverse movements to a small amount. The arrangement is merely employed to use up those stations of drums 678, 679 and 680 which are not required for the job under consideration.

When nut 684 engages a dog 683 at station No. 29 on drum 679, the three drums are indexed to station No. 30 at which no dogs are provided, whereupon the activity of head T₈ ceases until the next cycle of operation is initiated.

From the foregoing it is evident that a new and improved machine tool has been provided embodying a control that renders it completely automatic and in which said machine tool is capable of automatically performing every operation of which it is capable. Furthermore, the new and improved machine tool is capable of manual operation at any time without affecting any setting of its automatic control mechanism.

Although the various features of the new and improved machine tool have been shown and described in detail to fully disclose one embodiment of the invention, it will be evident that numerous changes may be made in such details, and certain features may be used without others without departing from the principles of the invention.

What is claimed is:

1. A machine tool comprising in combination, a work support; a plurality of tool supports; means for rotating said work support at a plurality of speeds; means for moving said tool supports along separate paths; means for initiating in any sequential order a plurality of any of the functions of which the machine tool is capable, said means including a plurality of function-control portions for each tool support, each adapted to be pre-set for initiating any of the functions which its tool support is capable of performing; a corresponding means for each function-control portion of each tool support for limiting the extent of each function set up thereby; and means adapted to be operated by the function-control portions of each tool support for rendering effective the function-control portions of the other.

2. A machine tool comprising in combination, a work support; a plurality of tool supports; means for rotating said work support at a plurality of speeds; means for moving said tool supports along separate paths; and control means adapted to be pre-set for initiating any of the functions which the machine tool is capable of performing in accordance with any sequential order; said control means comprising a function-control drum adapted to be pre-set and indexed from position to position for each of said tool supports for initiating any of the functions which its tool support is capable of performing, a motion-control drum for the path along which each tool support is adapted to be moved for limiting its amount of movement therealong; means for simultaneously indexing the function and motion-control drums for each of said tool supports; and means associated with each of said function-control drums for selectively causing the indexing of the other.

3. A machine tool comprising in combination, a work support; a plurality of tool supports; means for rotating said work support at a plurality of speeds; means for moving said tool supports along separate paths; means for each of said tool supports including a plurality of function-control portions, each adapted to be pre-set for selecting and initiating any of the functions which its tool support is capable of performing; means for each of said tool supports including a plurality of motion-control portions, one for each of its function-control portions and each including means adjustable throughout the extent of motion of its corresponding tool support; means for each tool support, responsive to its movement and cooperable with its adjustable motion-control means for operating its function-control means; and means associated with each function-control means for selectively operating the other.

4. A machine tool comprising in combination, a work support; a tool support; a turret mounted on said tool support; power-operated means for indexing said turret; means for providing relative rotation at a plurality of speeds between said supports; means for selecting the rate of said relative rotation; means for providing relative rectilinear movement at a plurality of speeds between said supports; means adapted to be operated independently of the indexing of said turret and adapted to be pre-set for initiating any of the functions which the machine tool is capable of performing in accordance with any sequential order, said means comprising a plurality of function-control portions, each adapted to be pre-set for selecting the rate and direction of said relative rectilinear movement, initiating the activity of said power-operated indexing means and said relative rotation selecting means; a plurality of motion-control portions, one for each of said function-control portions, each including means adjustable throughout the extent of said relative rectilinear movement; and means responsive to said relative rectilinear movement and adapted to cooperate with said adjustable means for operating said pre-settable means.

5. A machine-tool comprising in combination, a work support; means for rotating said work support; a tool support; a turret mounted on said tool support; power-operated means for indexing said turret; means for moving said tool support along intersecting paths at a plurality of speeds; a control for selecting the rate of rotation of said work support; and means adapted to be pre-set for selecting and initiating any of the functions which the machine tool is capable of performing in accordance with any sequential order, said pre-settable means comprising a plurality of function-control portions, each adapted to be pre- set for selecting the path, rate and direction of movement of said tool support, initiating the activity of said power-operated indexing means and said rotation control means; means along each path of movement of said tool support, each including a plurality of motion-control portions, one for each of said function-control portions; and adjustable means associated with each of said motion-control portions for limiting the extent of movement of said tool support therealong.

6. A machine tool comprising in combination, a work support; a plurality of tool supports; a turret mounted on each of said tool supports; separate power-operated means for indexing said turrets; means for providing relative rotation at a plurality of speeds between said work and tool supports; a control for selecting the rate of said relative rotation; means for providing relative rectilinear movement at a plurality of speeds between said tool supports and between each of said tool supports and said work support; means adapted to be pre-set for selecting and initiating any of the functions which the machine tool is capable of performing in accordance with any sequential order, said means comprising function-control means for each of said tool supports for selecting the rate and direction of its relative rectilinear movement, initiating the activity of the power-operated indexing means for the turret associated with the tool support controlled by said function-control means, and said relative rotation control means; and motion-control means for each of said tool supports for determining its amount of relative rectilinear movement.

7. A machine tool comprising in combination, a work support; a plurality of tool supports; a turret mounted on each of said tool supports; power-operated means for indexing said turrets; means for rotating said work support at a plurality of speeds; a control for selecting the rate of said rotation; means for moving each of said tool supports at a plurality of speeds in either direction along intersecting paths; and means adapted to be pre-set for selecting and initiating any of the functions which the machine tool is capable of performing in accordance with any sequential order, said means comprising a plurality of function-control means for the respective tool supports each adapted to select the path, rate and direction of movement of its tool support, to initiate the activity of the respective power-operated indexing means and the rotation control means, and a separate adjustable motion-control means along the respective paths of movement of said tool supports for each corresponding function-control means for limiting the amount of relative movement of said respective tool supports in either direction therealong.

8. Apparatus comprising in combination, a member adapted to be rotated at a plurality of speeds; means for rotating said member; a control for said member-rotating means adapted upon operation to cause said member to be rotated at any one of a plurality of speeds; a tool; means for moving said tool a plurality of times in either direction along a path at a plurality of speeds within a cycle of operation with said tool in fixed angular position relatively to said rotatable member; function-control means including a plurality of portions, each adapted selectively to be pre-set to control said tool-moving means and said member-rotating means; motion-control means including a plurality of portions, one for each of said function-control portions; means separate from said motion-control portions and movable in proportion to the movement of said tool; means associated with each of said motion-control portions, adjustable throughout the extent of movement of said tool, and cooperable with said proportionately-movable means for limiting the extent of tool movement in either direction along said path and for operating said function-control means with said tool at any point in its path of travel.

9. A machine tool comprising in combination, a work support; means for rotating said work support at a plurality of speeds; a control for said work support rotating means adapted upon operation to cause said work support to be rotated at any one of said plurality of speeds; a tool support; means for moving said tool support along a plurality of paths; means adapted to be pre-set at one time for causing said tool support to produce any sequence of motions along said plurality of paths and for operating said rotation control means; separate corresponding means adapted to be pre-set at one time for limiting the extent of each motion within said sequence of motions; and a source of power for operating said motion-sequence and limiting means.

10. Apparatus comprising in combination, a member adapted to be rotated at a plurality of speeds; means for rotating said member; a control for said member-rotating means adapted upon operation to cause said member to be rotated at any one of a plurality of speeds; an element adapted to be moved a plurality of times in either direction along a path at a plurality of speeds within a cycle of operation with said element in fixed angular position relatively to said rotatable member; means for moving said element; means adapted selectively to be operated for controlling said element-moving means; a plurality of function-control means each adapted selectively to be pre-set to selectively effect the operation of said member-rotating control means and to operate selected of said element-moving control means; means responsive to both directions of movement of said element; an electric circuit means for successively operating said function-control means including a plurality of circuit-operating portions, one for each of said function-control means; and means associated with each of said circuit-operating portions, adjustable throughout the extent of movement of said element and cooperable with said movement-responsive means in either direction of its movement for operating said electric circuit means.

11. Apparatus comprising in combination, a member adapted to be rotated at a plurality of speeds; means for rotating said member; a control for said member-rotating means adapted upon operation to cause said member to be rotated at any one of a plurality of speeds; an element adapted to be moved in either direction along a plurality of paths at a plurality of speeds; means for moving said element; means adapted selectively to be operated for controlling said element-moving means; a plurality of function-control means each adapted selectively to be pre-set to effect the operation of said member-rotating control means and to operate selected of said element-moving control means for providing movement of said element along said plurality of paths; a plurality of motion-control means for each path of movement of said element, one for each of said function-control means; and adjustable means associated with each of said motion-control means for limiting the extent of motion of said element in either direction along said paths.

12. Apparatus comprising in combination, a member adapted to be rotated at a plurality of speeds; means for rotating said member; a control for said member-rotating means adapted upon operation to cause said member to be rotated at any one of a plurality of speeds; an element; means for providing relative movement between said element and said member along a plurality of paths at a plurality of speeds; common means adapted to be pre-set and adapted to be indexed from station to station for selectively effecting the operation of said member-rotating control means and for rendering effective said relative movement-providing means; means for indexing said common means; and separate means for each path of said relative movement and adapted to cooperate with said element for determining when said indexing means is to be rendered effective.

13. Apparatus comprising in combination, a member adapted to be rotated at a plurality of speeds; means for rotating said member; a control for said member-rotating means adapted upon operation to cause said member to be rotated at any one of a plurality of speeds; an element; means for providing relative movement between said member and element along a plurality of paths at a plurality of speeds; common means adapted to be pre-set and adapted to be indexed from station to station for selectively effecting the operation of said member-rotating control means and for rendering effective said relative movement-providing means; means for indexing said common means; separate means for each of the paths of said relative movement between said element and member and cooperative with said element for determining when said indexing means is to be rendered effective; and means for indexing said separate means simultaneously with the indexing of said common means.

14. Apparatus comprising in combination, a member adapted to be rotated at a plurality of speeds; means for rotating said member; a control for said member-rotating means adapted upon operation to cause said member to be rotated at any one of a plurality of speeds; an element; means for moving said element in either direction along a path; a control drum adapted to be pre-set and successively to be indexed from station to station for selectively effecting the operation of said member-rotating control means and for controlling the movement of said element; means movable in proportion to the movement of said element; means for determining when said control drum is to be indexed including a drum on which a device is adapted adjustably to be mounted, said device being engageable with said proportional movable means and adapted instantly upon engagement to be moved out of cooperative position relatively thereto; and means for simultaneously indexing said control drum and the drum on which said device is mounted.

15. Apparatus comprising in combination, a member adapted to be rotated at a plurality of speeds; means for rotating said member; a control for said member-rotating means adapted upon operation to cause said member to be rotated at any one of a plurality of speeds; an element; means for moving said element in either direction along a plurality of paths; a control member adapted to be pre-set and successively to be moved from position to position for selectively effecting the operation of said member-rotating control means and for controlling the movement of said element; separate means movable in proportion to the movement of said element along each of its paths of motion; and separate means for each of said paths for determining when said control member is to be moved, each of said separate means including devices engageable with a separate movable means and adapted instantly upon such engagement to be moved out of cooperative position relatively thereto.

16. Apparatus comprising in combination, a member adapted to be rotated at a plurality of speeds; means for rotating said member; a control for said member-rotating means adapted upon operation to cause said member to be rotated at any one of a plurality of speeds; an element; means adapted to move said element in either direction along a plurality of paths; a control drum adapted to be pre-set and successively to be indexed from station to station for selectively effecting the operation of said member-rotating control means and for controlling the movement of said element; separate means adapted to be moved proportionally as said element moves along each of its paths of motion; separate drums for each of said paths on which devices are adapted adjustably to be mounted, for determining when the control drum is to be indexed, said devices being engageable with said separate movable means and adapted instantly upon such engagement to be moved out of cooperative position relatively thereto; and means for simultaneously indexing all of said drums.

17. In a machine tool, a work support; a tool support; a transmission for providing relative rotation between said supports at a plurality of speeds; a plurality of gear combinations within said transmission; fluid-actuated means adapted to be operated for establishing various gear combinations within said transmission; a power-operated control adapted to perform successive cycles of operation, in each cycle of which any of said means is adapted to be operated; means for providing relative rectilinear movement between said supports at a plurality of speeds; means adapted selectively to be operated for controlling said relative rectilinear movement-providing means; pre-settable means adapted selectively to initiate the activity of said power-operated control and to operate selected of said rectilinear-movement control means; motion-control means including a plurality of means adjustable throughout the path of motion of said tool support; and means responsive to said relative rectilinear movement between said supports adapted to cooperate with selected of said adjustable means for operating said pre-settable means with said tool support at any point within the path of said relative rectilinear movement.

18. In a machine tool, a work support; a tool support; a transmission for providing relative rotation between said supports at a plurality of speeds; a plurality of gear combinations within said transmission; a clutch; means adapted to be operated for establishing various gear combinations within said transmission; a control adapted to perform successive cycles of operation, said control including means adapted during each cycle of operation successively to neutralize said clutch, to operate any of said gear combination establishing means, and to engage said clutch; means for providing relative rectilinear movement between said supports at a plurality of speeds; means adapted selectively to be operated for controlling said relative rectilinear movement-providing means; pre-settable means adapted selectively to render said cycle control effective and to operate selected of said rectilinear-movement control means; means movable in proportion to said relative rectilinear movement; and means adjustable throughout the extent of said relative rectilinear movement and cooperable with said proportionately-movable means for operating said pre-settable means with said tool support at any point within the path of said relative rectilinear movement.

19. In a machine tool, a work support; a tool support; a transmission for providing relative rotation between said supports at a plurality of speeds; a plurality of gear combinations within said transmission; a clutch; a brake; means adapted to be operated for establishing various gear combinations within said transmission; a control adapted to perform successive cycles of operation, said control including means adapted during each cycle of operation successively to neutralize said clutch and engage said brake, to operate any one of said gear combination establishing means at a substantial time interval after said brake is engaged, and to disengage said brake and engage said clutch; means for providing relative rectilinear movement between said supports at a plurality of speeds; means adapted selectively to be operated for controlling said relative rectilinear movement-providing means; pre-settable means adapted selectively to render effective said cycle control means and to operate selected of said rectilinear-movement control means; means movable in proportion to said relative rectilinear movement; and means adjustable throughout the extent of said relative rectilinear movement and cooperable with said proportionately-movable means for operating said pre-settable means with said tool support at any point within the path of said relative rectilinear movement.

20. In a machine tool, a work support; a tool support; a headstock transmission for providing relative rotation between said supports at a plurality of speeds; a plurality of gear combinations within said headstock transmission; means adapted to be operated for establishing various gear combinations within said headstock transmission; a control adapted to perform successive cycles of operation, in each cycle of which any of said means is adapted to be operated; a feedworks transmission for providing relative rectilinear movement between said supports at a plurality of speeds; means adapted selectively to be operated for controlling said feedworks transmission; pre-settable means adapted intermittently to be moved from position to position for selectively rendering said cycle control effective and for actuating selected of said feedworks transmission control means; means movable in proportion to said relative rectilinear movement; means adjustable throughout the extent of said relative rectilinear movement and cooperable with said proportionately-movable means for operating said pre-settable means with said tool support at any point within the path of said relative rectilinear movement; and means for manually controlling the operation of both of said transmissions without affecting the setting of the cycle control means or the pre-settable means.

21. In a machine tool, a work support; a tool support; a headstock transmission for providing relative rotation between said supports at a plurality of speeds; a main clutch; means adapted to be operated for establishing various gear combinations within said transmission; a control adapted to perform successive cycles of operation, said control including means adapted during each cycle of operation successively to neutralize said clutch, to operate selected of said gear-establishing means, and to engage said clutch; a feedworks transmission for providing relative rectilinear movement between said supports at a plurality of speeds; means adapted selectively to be operated for controlling said feedworks transmission; pre-settable means adapted intermittently to be moved from position to position for selectively rendering effective said cycle control for said headstock transmission, and for operating selected of said feedworks control means; means movable in proportion to said relative rectilinear movement; means adjustable throughout the extent of said relative rectilinear movement and cooperable with said proportionately-movable means for operating said pre-settable means with said tool support at any point within the path of said relative rectilinear movement; manually operable means for shifting said main clutch; and manual means for operating both of said transmissions without disturbing the setting of their automatic control mechanisms.

22. Apparatus comprising in combination, a member adapted to be rotated at a plurality of speeds; means for rotating said member; a control for said member-rotating means adapted upon operation to cause said member to be rotated at any one of a plurality of speeds; a plurality of elements adapted to be moved in either direction along separate paths at a plurality of speeds; means for moving said elements; function-control means including a single set of means for each element adapted selectively to be operated for controlling its element-moving means and the operation of said member-rotating control means; pre-settable means for each element including a plurality of independently selectable actuating means for each means within its set adapted to operate only its corresponding means within its set; means for operating said pre-settable means; and means associated with each said set of means adapted selectively to be actuated for operating the pre-settable means for the other set of means.

23. Apparatus comprising in combination, a member adapted to be rotated at a plurality of speeds; means for rotating said member; a control for said member-rotating means adapted upon operation to cause said member to be rotated at any one of a plurality of speeds; a plurality of elements adapted to be moved in either direction along separate paths at a plurality of speeds; means for moving said elements; means adapted selectively to be operated for controlling said element-moving means; separate function-control means for each of said elements adapted independently to operate selected of said element-moving control means, each of said function-control means being adapted selectively to effect the operation of said member-rotating control means; means responsive to the movement of said elements along each of their paths for operating their respective function-control means; and means associated with each function-control means adapted selectively to actuate the other.

24. Apparatus comprising in combination, a member adapted to be rotated at a plurality of speeds; means for rotating said member; a control for said member-rotating means adapted upon operation to cause said member to be rotated at any one of a plurality of speeds; a plurality of elements adapted to be moved in either direction along separate paths at a plurality of speeds; means for moving said elements; means adapted selectively to be operated for controlling said element-moving means; separate means for each of said elements each including a plurality of function-control portions, each portion adapted independently to operate selected of said element-moving control means, and to effect the operation of said member-rotating control means; means for operating said function-control means; means responsive to the movement of each of said elements; motion-control means for each element, each including a plurality of portions, one for each of its function-control portions; adjustable means on each of said motion-control portions adapted to cooperate with its corresponding movement-responsive means in either direction of its motion for operating its function-control means; and means associated with each function-control means adapted selectively to actuate the other.

25. Apparatus comprising in combination, a member adapted to be rotated at a plurality of speeds; means for rotating said member; a control for said member-rotating means adapted upon operation to cause said member to be rotated at any one of a plurality of speeds; a plurality of elements adapted to be moved in either direction along separate paths at a plurality of speeds; means for moving said elements; means adapted selectively to be operated for controlling said element-moving means; separate function-control means for each of said elements including a plurality of pre-settable portions, each adapted independently to operate selected of said element-moving control means, and to effect the operation of said member-rotating control means; additional sources of power, independent of the force encountered in moving said elements, for operating said function-control means; an electric circuit for each of said elements including a plurality of means, one for each of said pre-settable portions; means responsive to the movement of each of said elements for actuating its corresponding plurality of means for operating its electric circuit to render effective its source of power; and means associated with each said function-control means adapted selectively to actuate the other.

26. Apparatus comprising in combination, a member adapted to be rotated at a plurality of speeds; means for rotating said member; a control for said member-rotating means adapted upon operation to cause said member to be rotated at any one of a plurality of speeds; a plurality of elements each adapted to be moved in either direction along a plurality of paths at a plurality of speeds; means for moving said elements; means adapted selectively to be operated for controlling said element-moving means; separate means for each of said elements including a plurality of function-control portions adapted independently to operate selected of its element-moving control means, and to effect the operation of said member-rotating control means; means responsive to the movement of each element; motion-control means for each element, each including a plurality of portions, one for each of its function-control portions; and adjustable means on each of said motion-control portions adapted to cooperate with its corresponding movement-responsive means in either direction of its motion for operating its function-control means.

27. Apparatus comprising in combination, a member adapted to be rotated at a plurality of speeds; means for rotating said member; a control for said member-rotating means adapted upon operation to cause said member to be rotated at any one of a plurality of speeds; a plurality of elements adapted to be moved in either direction along separate paths at a plurality of speeds; means for moving said elements; means adapted selectively to be operated for controlling said element-moving means; separate function-control means for each of said elements adapted independently to operate selected of said element-moving control means, each of said function-control means being adapted selectively to effect the operation of said member-rotating control means; means for indexing said function-control means; separate means responsive to the movement of said elements for determining when the function-control means for said element is adapted to be indexed; means for indexing said movement-responsive means simultaneously with the indexing of said function-control means; and means associated with each function-control means adapted selectively to actuate the other.

28. Apparatus comprising in combination, a member; a plurality of elements; means for providing relative rotation between said member and elements at a plurality of speeds; a control for said relative rotation-providing means adapted upon operation to effect said relative rotation at any one of a plurality of speeds; means for providing relative rectilinear movement between said elements and between each element and said member along a plurality of paths at a plurality of speeds; means adapted selectively to be operated for controlling said relative rectilinear-movement providing means; separate function-control means for each of said elements adapted independently to operate selected of said rectilinear movement-providing means, each of said function-control means being adapted selectively to effect the operation of the control for said relative rotation-providing means; and means for operating each of said function-control means.

29. Apparatus comprising in combination, a member; a plurality of elements; means for providing relative rotation between said member and elements at a plurality of speeds; a control for said relative rotation-providing means adapted upon operation to effect said relative rotation at ony one of a plurality of speeds; means for providing relative rectilinear movement between said elements and between each element and said member along a plurality of paths at a plurality of speeds; means adapted selectively to be operated for controlling said relative rectilinear-movement providing means; separate function-control means for each of said elements adapted independently to be indexed from station to station for operating selected of said rectilinear movement-providing means, each of said function-control means being adapted selectively to effect the operation of the control for said relative rotation-providing means; a source of power for indexing said function-control means and separate means for each path of said relative rectilinear movement for determining when said source of power for each of said function-control means is to be rendered effective.

30. Apparatus comprising in combination, a member; a plurality of elements; means for providing relative rotation between said member and elements at a plurality of speeds; a control for said relative rotation-providing means adapted upon operation to effect said relative rotation at any one of a plurality of speeds; means for providing relative rectilinear movement between said elements and between each element and said member along a plurality of paths at a plurality of speeds; means adapted selectively to be operated for controlling the relative rectilinear movement-providing means for each element; separate function-control means for each of said elements adapted independently to be indexed from station to station for operating selected of the rectilinear movement-providing means for its element, each of said function-control means being adapted selectively to effect the operation of the control for said relative rotation-providing means; a source of power for indexing said function-control means; separate means for each path of said relative rectilinear movement for determining when its corresponding source of power for each of said function-control means is to be rendered effective; and means for indexing said separate means simultaneously with the indexing of its corresponding function-control means.

31. Apparatus comprising in combination, a member; a plurality of elements; means for providing relative rotation between said member and elements at a plurality of speeds; a control for said relative rotation-providing means adapted upon operation to effect said relative rotation at any one of a plurality of speeds; means for providing relative rectilinear movement between said elements and between each element and said member along a plurality of paths at a plurality of speeds; separate function-control means for each of said elements adapted to be pre-set and successively to be moved from position to position for selectively effecting the operation of said relative rotation-providing control means and for controlling the movement of each of said elements; and means for determining when each of said function-control means is to be moved including a means engageable with a device movable with its corresponding element and adapted instantly upon such engagement to be moved out of cooperative position relatively thereto.

32. Apparatus comprising in combination, a member; a plurality of elements; means for providing relative rotation between said member and elements at a plurality of speeds; a control for said relative rotation-providing means adapted upon operation to effect said relative rotation at any one of a plurality of speeds; means for providing relative rectilinear movement between said elements and between each element and said member along a plurality of paths at a plurality of speeds; means adapted selectively to be operated for controlling said relative rectilinear movement-providing means; separate function-control drums for each of said elements adapted to be pre-set and successively to be indexed from station to station for controlling the movement of said elements; separate means movable in proportion to the movement of each of said elements; means for determining when said control drums are to be indexed including a motion-control drum for each path along which each of said elements is adapted to be moved; devices adapted adjustably to be mounted on each of said motion-control drums and engageable with its proportional movable means and adapted instantly upon such engagement to be moved out of cooperative position relatively thereto; and means for simultaneously indexing the function and motion control drums for each element.

33. In a machine tool, a work support; a plurality of tool supports; a transmission for providing relative rotation between said work and tool supports at a plurality of speeds; a plurality of gear combinations within said transmission; means adapted to be operated for establishing various gear combinations within said transmission; a power-operated control adapted to perform successive cycles of operation, in each cycle of which any of said means is adapted to be operated; means for providing relative rectilinear movement between said tool supports and between each tool support and said work support along a plurality of paths at a plurality of speeds; means adapted selectively to be operated for controlling said relative rectilinear movement-providing means; separate pre-settable means for each of said tool supports for operating selected of said rectilinear movement control means, each of said pre-settable means being adapted selectively to initiate the activity of said power-operated control; and means responsive to the relative rectilinear movement of each of said elements for operating the pre-settable means associated therewith.

34. In a machine tool, a work support; a plurality of tool supports; a transmission for providing relative rotation between said work and tool supports at a plurality of speeds; a plurality of gear combinations within said transmission; fluid-actuated means adapted to be operated for establishing various gear combinations within said transmission; a power-operated control adapted to perform successive cycles of operation, in each cycle of which any of said means is adapted to be operated; means for providing relative rectilinear movement between said tool supports and between each of said tool supports and said work support along a plurality of paths at a plurality of speeds; means adapted selectively to be operated for controlling said relative rectilinear movement-providing means; pre-settable means for each of said tool supports adapted to operate selected of the rectilinear movement control means for each of said tool supports, each of said pre-settable means being adapted selectively to initiate the activity of said power-operated control; a source of power for operating each pre-settable means; and means responsive to the relative rectilinear movement of each of said tool supports for determining when the source of power for its pre-settable means is to be rendered effective.

35. In a machine tool, a work support; a plurality of tool supports; a transmission for providing relative rotation between said tool supports and said work support at a plurality of speeds; a plurality of gear combinations within said transmission; a clutch; means adapted to be operated for establishing various gear combinations within said transmission; a control adapted to perform successive cycles of operation, said control including means adapted during each cycle of operation successively to neutralize said clutch, to operate any of said gear combination establishing means and to engage said clutch; means for providing relative rectilinear movement between said tool supports and between each of said tool supports and said work support along a plurality of paths at a plurality of speeds; means adapted selectively to be operated for controlling said relative rectilinear movement-providing means; separate pre-settable means for each of said tool supports adapted selectively to operate selected of the rectilinear movement control means for each tool support, each of said pre-settable means being adapted selectively to render said cycle control effective; and means responsive to the relative rectilinear movement of each of said tool supports for operating its pre-settable means.

36. In a machine tool, a work support; a plurality of tool supports; a transmission for providing relative rotation between said tool and work supports at a plurality of speeds; a plurality of gear combinations within said transmission; a clutch; a brake; means adapted to be operated for establishing various gear combinations within said transmission; a control adapted to perform successive cycles of operation, said control including means adapted during each cycle of operation successively to neutralize said clutch and engage said brake, to operate any one of said gear combination establishing means at a substantial time interval after said brake is engaged, and to disengage said brake and engage said clutch; means for providing relative rectilinear movement between said tool supports and between each of said tool supports and said work support along a plurality of paths at a plurality of speeds; means adapted selectively to be operated for controlling the relative rectilinear movement-providing means for each of said tool supports; separate pre-settable means for each of said tool supports adapted selectively to operate selected of the rectilinear movement control means for its tool support, each of said pre-settable means being adapted selectively to render effective said cycle control means and means responsive to the relative rectilinear movement of each of said tool supports for operating its pre-settable means.

37. In a machine tool, a work support; a plurality of tool supports; a headstock transmission for providing relative rotation between said tool and work supports at a plurality of speeds; a plurality of gear combinations within said headstock transmission; means adapted to be operated for establishing various gear combinations within said headstock transmission; a control adapted to perform successive cycles of operation, in each cycle of which any of said means is adapted to be operated; a separate feedworks transmission for providing relative rectilinear movement between said tool supports and between each of said tool supports and said work support along a plurality of paths at a plurality of speeds; means adapted selectively to be operated for controlling each of said feedworks transmissions; separate pre-settable means for each of said feedworks transmissions adapted automatically to be moved from position to position for actuating selected of said feedworks transmission control means for each tool support, each of said pre-settable means being adapted selectively to render said cycle control effective; and means for manually controlling the operation of all of said transmissions without affecting the setting of the cycle control means or either of the pre-settable means.

38. In a machine tool, a work support; a plurality of tool supports; a headstock transmission for providing relative rotation between said tool and work supports at a plurality of speeds; a plurality of gear combinations within said headstock transmission; fluid-actuated means adapted to be operated for establishing various gear combinations within said headstock transmission; a control adapted to perform successive cycles of operation, in each cycle of which any of said fluid-actuated means is adapted to be operated; separate feedworks transmissions for providing relative rectilinear movement between said tool supports and between each of said tool supports and said work support along a plurality of paths at a plurality of speeds; fluid-actuated means adapted selectively to be operated for controlling each of said feedworks transmissions; separate pre-settable means for each of said tool supports adapted automatically to be moved from position to position in response to the relative rectilinear movement between its tool support and said work support for operating selected of the fluid-actuated means for controlling said feedworks transmission, each of said pre-settable means being adapted selectively to render effective the cycle control for said headstock transmission; and means adapted to cooperate with all of said fluid-actuated means for manually controlling all of said transmission without affecting the setting of their respective automatic control means.

39. In a machine tool, a work support; a plurality of tool supports; a headstock transmission for providing relative rotation between said tool and work supports at a plurality of speeds; a clutch; a brake; means adapted to be operated for establishing various gear combinations within said transmission; a control adapted to perform successive cycles of operation, said control including means adapted during each cycle of operation successively to neutralize said clutch and engage said brake, to operate any one of said gear combination establishing means at a substantial time interval after said brake is engaged, and to disengage said brake and engage said clutch; separate feedworks transmissions for each of said tool supports adapted to provide relative rectilinear movement between said supports and between each of said supports and said work support along a plurality of paths at a plurality of speeds; means adapted selectively to be operated for controlling each of said feedworks transmissions; separate pre-settable means for each of said tool supports adapted selectively to operate selected of its feedworks control means, each of said pre-settable means being adapted selectively to render effective said cycle control for said headstock transmission; manually operable means for shifting said clutch and brake; and manual means for operating all of said transmissions without disturbing the setting of the cycle control means and the separate pre-settable means.

40. In a machine tool, a work support; a tool support including a rotatable turret; means for providing relative rectilinear movement between said supports along a plurality of paths at a plurality of speeds; power-operated means for indexing said turret from station to station; function-control means adapted to be moved from position to position, each position setting up the same or a different condition in said relative rectilinear movement - providing means; motion - control means for each path along which said tool support is adapted to be moved, said means being adapted to be indexed from position to position simultaneously with said function-control means; and means associated with said function-control means, adapted selectively to render effective said power-operated indexing means.

41. In a machine tool, a work support; a tool support including a rotatable turret; means for providing relative rectilinear movement between said supports along a plurality of paths at a plurality of speeds; power-operated means for indexing said turret from station to station; function-control means adapted to be moved from position to position, each position setting up the same or a different condition in said relative rectilinear movement-providing means; a source of power for operating said function-control means; motion-control means for each path along which said tool support is adapted to be moved, each including a plurality of means, one for each position to which said function-control means is adapted to be moved; means responsive to said relative rectilinear movement for cooperating with selected of said plurality of means for determining when said source of power is to be rendered effective; and means associated with said function-control means, adapted selectively to render effective said power-operated indexing means.

42. In a machine tool, a work support; a tool support including a rotatable turret; means for providing relative rectilinear movement between said supports along a plurality of paths at a plurality of speeds; power-operated means for indexing said turret from station to station; function-control means adapted to be moved from position to position, each position setting up the same or a different condition in said relative rectilinear movement-providing means; a source of power for operating said function-control means; electrical circuit motion-control means for each path along which said tool support is adapted to be moved, each including a plurality of means, one for each position to which said function-control means is moved; separate means responsive to said relative rectilinear movement along each path for actuating selected of the corresponding plurality of means for operating said electric circuit to render effective said source of power; and means associated with said function-control means, adapted selectively to render effective said power-operated indexing means.

43. In a machine tool, a work support; a tool support including a rotatable turret; means for providing relative rectilinear movement between said supports along a plurality of paths at a plurality of speeds; power-operated means for indexing said turret from station to station; function-control means adapted to be moved from position to position, each position setting up the same or a different condition in said relative rectilinear movement-providing means; means for each path along which said tool support is adapted to be moved and movable in proportion thereto; separate means for each of said paths for determining when said function-control means is to be moved, each of said separate determining means including elements engageable with said proportionately movable means and adapted instantly upon such engagement to be moved out of cooperative position relatively to said movable means; and means associated with said function-control means, adapted selectively to render effective said power-operated indexing means.

44. In a machine tool, a tool head including a rotatable turret; means for moving said tool head in either direction along a path; function-control means adapted to be moved from position to position and to be pre-set for controlling the movement of said tool head; power-operated means for indexing said turret through successive single cycles of operation; means adapted to be pre-set on said function-control means for selectively initiating the activity of said power-operated means when said function-control means is moved to a predetermined position; and means associated with said power-operated means for effecting the movement of said function-control means away from said predetermined position near the end of each cycle of operation of said power-operated means, but effecting continued operation of the latter for a short time interval thereafter.

45. In a machine tool, a tool head including a rotatable turret; means for moving said tool head in either direction along a path; function-control means adapted to be moved from position to position and to be pre-set for controlling the movement of said tool head; power-operated means for indexing said turret through successive single cycles of operation; means adapted to be pre-set on said function-control means for selectively initiating the activity of said power-operated means when said function-control means is moved to a predetermined position; means responsive to the movement of said tool head for effecting the movement of said function-control means to said predetermined position; and means associated with said power-operated means for effecting the movement of said function-control means away from said predetermined position near the end of each cycle of operation of said power-operated means, but effecting continued operation of the latter for a short time interval thereafter.

46. In a machine tool, a tool head including a rotatable turret; means for moving said tool head in either direction along a plurality of paths at a plurality of speeds; function-control means adapted to be moved from position to position and to be preset for controlling the movement of said tool head along said plurality of paths; separate means for each path along which said tool head is adapted to be moved for effecting the movement of said function-control means in response to the movement of said tool head along either of said paths; power-operated means for indexing said turret through successive cycles of operation; means adapted to be pre-set on said function-control means for selectively initiating the activity of said power-operated means when said function-control means is moved to a predetermined position; and means associated with said power-operated means for effecting the movement of said function-control means away from said predetermined position near the end of each cycle of operation of said power-operated means, but effecting continued operation of the latter for a short time interval thereafter.

47. In a machine tool, a tool head including a rotatable turret; means for moving said tool head in either direction along a path; function-control means adapted to be moved from position to position and to be pre-set for controlling the movement of said tool head; power-operated means for indexing said turret through successive single cycles of operation; means adapted to be pre-set on said function-control means for selectively initiating the activity of said power-operated means when said function-control means is moved to a predetermined position; means associated with said power-operated means for effecting the movement of said function-control means away from said predetermined position near the end of each cycle of operation of said power-operated means, but effecting continued operation of the latter for a short time interval thereafter; and separate means for manually initiating the activity of said power-operated means independently of said function-control means.

48. In a machine tool, a plurality of tool supports; a turret associated with each tool support; separate power-operated means for indexing each of said turrets from station to station; separate means for moving said tool supports in either direction along separate paths at any one of a plurality of speeds; separate function-control means for the respective tool supports adapted upon actuation to select the direction and speed of movement of the respective tool supports; means for actuating the respective function-control means in response to the movement of the respective tool supports; means associated with each of said function-control means for selectively rendering effective the power-operated turret-indexing means for the respective turrets; and means associated with each function-control means adapted selectively to actuate the other.

49. In a machine tool, a plurality of tool supports; a turret associated with each tool support; separate power-operated means for indexing each of said turrets from station to station; separate means for moving each tool support in either direction along intersecting paths at any one of a plurality of speeds; separate function-control means for the respective tool supports adapted upon actuation to select the path, direction and speed of movement thereof; means associated with each of said tool supports for effecting the actuation of its function-control means in response to the movement of said tool support; means associated with each of said function-control means for selectively rendering effective the power-operated turret indexing means for the turret associated with said function-control means; and means associated with each function-control means adapted selectively to actuate the other.

50. In a machine tool, a plurality of tool supports; a turret associated with each tool support; separate power-operated means for indexing each of said turrets from station to station; separate means for moving said tool supports in either direction along separate paths at any one of a plurality of speeds; separate function-control means for the respective tool supports adapted upon actuation to select the direction and speed of movement thereof; motion-control means for each path along which the respective tool supports are adapted to be moved and responsive to their movement for effecting the actuation of the respective function-control means; means associated with each of said function-control means for selectively rendering effective the power-operated turret indexing means for the turret associated with said function-control means; and means associated with each function-control means adapted selectively to actuate the other.

51. In a machine tool, a plurality of tool supports; a turret associated with each tool support; separate power-operated means for indexing each of said turrets from station to station; separate means for moving said tool supports in either direction along separate paths at any one of a plurality of speeds; separate function-control means for the respective tool supports adapted to be indexed from station to station for selecting the direction and speed of movement of the respective tool supports; indexable motion-control means associated with each path along which said tool supports are adapted to be moved each including a plurality of adjustable means, one for each station to which the function-control means is indexed; means responsive to the movement of each tool support and adapted to cooperate with selected of its adjustable means for effecting the indexing of its function-control means; means associated with each of said function-control means for selectively rendering effective the power-operated turret-indexing means for the turret associated with said function-control means; means for simultaneously indexing the function and motion-control means for each of said tool supports; and means associated with each function-control means adapted selectively to actuate the other.

52. In a machine tool, a plurality of tool supports; a turret associated with each tool support; separate power-operated means for indexing each of said turrets from station to station; separate means for moving each tool support in either direction along intersecting paths at any one of a plurality of speeds; separate function-control means for the respective tool supports adapted to be indexed from station to station to select the path, direction and speed of movement of the respective tool supports; motion-control means for each path along which said tool supports are adapted to be moved, and responsive to their movement for effecting the indexing of the respective function-control means; means associated with each of said function-control means for selectively rendering effective the power-operated turret-indexing means associated with said function-control means; and means associated with each function-control means adapted selectively to actuate the other.

53. In a machine tool, a plurality of tool supports; a turret associated with each tool support; separate power-operated means for indexing each of said turrets from station to station; separate means for moving each tool support in either direction along intersecting paths at any one of a plurality of speeds; separate function-control means for the respective tool supports adapted to be indexed from station to station to select the path, direction and speed of movement of the respective tool supports; motion-control means for each path along which said tool supports are adapted to be moved, and responsive to their movement for effecting the indexing of the respective function-control means; means associated with each of said function-control means for selectively rendering effective the power-operated turret-indexing means associated with said function-control means; means for simultaneously indexing the function and motion-control means for each of said tool supports; and means associated with each function-control means adapted selectively to actuate the other.

54. In a machine tool, a plurality of tool supports; a turret associated with each tool support; separate power-operated means for indexing each of said turrets from station to station; separate means for moving said tool supports in either direction along separate paths at any one of a plurality of speeds; separate function-control means for the respective tool supports adapted upon actuation to select the direction and speed of movement of the respective tool supports; means associated with each of said function-control means for selectively rendering effective the power-operated turret-indexing means for the turret associated with said function-control means; a source of power for actuating the respective function-control means; means responsive to the movement of the respective tool supports for determining when said source of power will be rendered effective; and means associated with each function-control means adapted selectively to actuate the other.

55. In a machine tool, a work support; a tool support; a turret mounted on said tool support; power-operated means for indexing said turret from station to station; means for providing relative rotation between said supports; means for providing relative rectilinear movement between said supports along intersecting paths; a control for said relative rotation-providing means adapted to be pre-set for selectively establishing different rates of relative rotation between said supports; function-control means adapted upon actuation to select the path, direction and speed of said relative rectilinear movement and to selectively initiate the activity of said relative rotation-providing control and said power-operated turret-indexing means; and motion-control means along each of said intersecting paths for determining the movement of said tool support therealong.

56. In a machine tool, a work support; a tool support; a turret mounted on said tool support; power-operated means for indexing said turret from station to station; means for providing relative rotation between said supports; means for providing relative rectilinear movement between said supports along intersecting paths; a control for said relative rotation-providing means adapted to be pre-set for selectively establishing different rates of relative rotation between said supports; function-control means adapted upon actuation to select the path, direction and speed of said relative rectilinear movement and for selectively initiating the activity of said relative rotation-providing control and said power-operated turret-indexing means; a source of power for actuating said function-control means; and motion-control means along each of said intersecting paths, each including a plurality of adjustable means; means responsive to the movement of said tool support along each of its paths and cooperable with selected of the adjustable means for said path for determining when said source of power will be rendered effective.

57. In a machine tool, a work support; a tool support including a rotatable turret; means for providing relative rectilinear movement between said supports; power-operated means of indexing said turret from station to station; a function-control including means adapted intermittently to be moved from position to position independently of the indexing of said turret, each position setting up the same or a different condition in said relative rectilinear movement-providing means and for rendering effective said power-operated indexing means; motion-control means including separate means adjustable throughout the extent of said relative rectilinear movement for each position to which said function-control means is moved; and means responsive to either direction of said relative rectilinear movement for cooperating with said separate means for moving said function-control means from one position to another.

58. In a machine tool, a work support; a tool support including a rotatable turret; means for providing relative rectilinear movement between said supports; power-operated means for indexing said turret from station to station; a function-control drum adapted to be indexed from station to station independently of the indexing of said turret, each station setting up the same or a different condition in said relative rectilinear movement-providing means; a motion-control drum including separate means, adjustable throughout the extent of said relative rectilinear movement, for each station to which said function-control drum is indexed; means responsive to said relative rectilinear movement for cooperating with said separate means for indexing said function-control drum from one station to another; and means operated by said function-control means selectively for rendering effective said power-operated indexing means.

59. In a machine tool, a work support; a tool support including a rotatable turret; means for providing relative rectilinear movement between said supports; power-operated means for indexing said turret from station to station; function-control means adapted to be moved from position to position independently of the indexing of said turret, each position setting up the same or a different condition in said relative rectilinear movement-providing means; a source of power for operating said function-control means; an electrical circuit including separate means, adjustable throughout the extent of said relative rectilinear movement, for each position to which said function-control means is adapted to be moved; means responsive to said relative rectilinear movement for cooperating with said separate means for operating said electric circuit to render effective said source of power, said separate means being adapted to be moved out of cooperating relation relatively to said movement-responsive means upon cooperation therewith; and means adapted selectively to be operated by said function-control means for rendering effective said power-operated indexing means.

60. In a machine tool, a work support; a tool support including a rotatable turret; means for providing relative rectilinear movement between said supports; power-operated means for indexing said turret from station to station; function-control means adapted to be moved from position to position independently of the indexing of said turret, each position setting up the same or a different condition in said relative rectilinear movement-providing means; means for determining when said function-control means is to be moved including a separate element, adjustable throughout the extent of said relative rectilinear movement, for each position to which said function-control means is adapted to be moved; a device movable with said tool support adapted to engage each of said elements; means adapted instantly upon the engagement between said device and selected of said elements for rendering ineffective the relation therebetween; and means adapted selectively to be operated by said function-control means for rendering effective said power-operated turret indexing means.

61. In a machine tool, a work support; means for rotating said work support at a plurality of speeds; a tool support adapted to be moved in either direction along a path at any one of a plurality of speeds; a tool mounted in said tool support; means for repeatedly moving said tool support along said path with said tool in fixed angular relation relatively to said work support; a control member including specific portions adapted adjustably to support means for selectively controlling said tool-support moving means and for selecting the rotary speed of said work support; means separate from said control member for intermittently moving said control member from position to position; motion-control means including a portion for each specific portion of said control member adapted adjustably to support means for controlling said control member; a device responsive to the movement of said tool support and adapted to cooperate with the adjustable means on the portions of said motion-control means for moving said control member from one position to another; and means for maintaining said portions in exact phase relation at all times.

62. In a machine tool, a tool turret adapted to be moved in either direction along a path at any one of a plurality of speeds; power-operated means for indexing said tool turret from station to station; means for repeatedly moving said tool turret along said path within a cycle of operation; a control member adapted to be indexed from position to position independently of the indexing of said tool turret including a plurality of portions, each adapted selectively to be set for controlling said tool turret moving means; means for controlling the starting, stopping and extent of motion of said tool turret including a plurality of motion-control portions, one for each of said control-member portions; adjustable means on said motion-control portions; a device responsive to the movement of said tool turret and adapted to cooperate with the adjustable means on said motion-control portions for moving said control member from one position to another; and means for maintaining all of said portions in exact phase relation at all times.

63. In a machine tool, a work support; a tool support; means for providing relative rectilinear movement between said supports along a plurality of paths at a plurality of speeds; means for providing a plurality of relative rotary movements between said supports; means for selecting any of said relative rotary movements; a control member for said tool support including a plurality of portions, each adapted selectively to be set for controlling said relative rectilinear moving means and said rotary-movement selecting means; separate means for each path along which said tool support is adapted to be moved for controlling the starting, stopping and extent of motion of said tool support along said path, each of said separate means including a plurality of portions, one for each of said control-member portions; and means for maintaining all of said portions in exact phase relation at all times.

EDWARD P. BULLARD, III.
LEROY E. ALVEY.
EDWARD N. COWELL.
PAUL H. LANGE.
FRANK H. MUSSLER.